(12) United States Patent
Suwa et al.

(10) Patent No.: US 9,146,425 B2
(45) Date of Patent: Sep. 29, 2015

(54) LIQUID CRYSTAL DISPLAY AND METHOD OF MANUFACTURING THE SAME

(75) Inventors: Shunichi Suwa, Kanagawa (JP); Seiji Shibahara, Chiba (JP); Masashi Miyakawa, Kanagawa (JP); Masahiko Nakamura, Kanagawa (JP); Tadaaki Isozaki, Kanagawa (JP)

(73) Assignee: SONY CORPORATION (JP)

( * ) Notice: Subject to any disclaimer, the term of this patent is extended or adjusted under 35 U.S.C. 154(b) by 15 days.

(21) Appl. No.: 13/527,738

(22) Filed: Jun. 20, 2012

(65) Prior Publication Data

US 2013/0010244 A1    Jan. 10, 2013

(30) Foreign Application Priority Data

Jun. 29, 2011 (JP) ................................. 2011-144650

(51) Int. Cl.
| | |
|---|---|
| C09K 19/00 | (2006.01) |
| G02F 1/1337 | (2006.01) |
| C09K 19/56 | (2006.01) |
| C09K 19/10 | (2006.01) |
| C09K 19/30 | (2006.01) |
| G02F 1/137 | (2006.01) |

(52) U.S. Cl.
CPC .......... *G02F 1/133711* (2013.01); *C09K 19/56* (2013.01); *G02F 1/133707* (2013.01); *G02F 1/133753* (2013.01); *G02F 1/133788* (2013.01); C09K 19/10 (2013.01); C09K 19/3001 (2013.01); G02F 1/133703 (2013.01); G02F 1/133723 (2013.01); G02F 2001/13712 (2013.01); G02F 2001/133726 (2013.01); G02F 2001/133742 (2013.01); G02F 2001/133757 (2013.01); Y10T 428/10 (2015.01); Y10T 428/1005 (2015.01)

(58) Field of Classification Search
CPC .... C09K 19/56; C09K 19/10; C09K 19/3001; G02F 1/1337; G02F 1/133711; G02F 1/133707; G02F 1/133735; G02F 1/133788; G02F 1/133723; G02F 2001/13712; G02F 2001/133726; G02F 2001/133742; Y10T 428/10; Y10T 428/1005; Y10T 428/1023
USPC .......... 428/1.1, 1.2, 1.25, 1.26; 349/186, 123, 349/130, 134, 136, 127; 252/299.01, 252/299.61, 299.62, 299.63, 299.64, 252/299.65, 299, 66, 67, 68
See application file for complete search history.

(56) References Cited

U.S. PATENT DOCUMENTS

| | | | | |
|---|---|---|---|---|
| 2009/0244452 | A1* | 10/2009 | Yoshihara et al. | 349/115 |
| 2011/0134382 | A1* | 6/2011 | Miyakawa et al. | 349/139 |
| 2011/0141418 | A1* | 6/2011 | Ennis et al. | 349/123 |

FOREIGN PATENT DOCUMENTS

| | | |
|---|---|---|
| JP | 10-073821 | 3/1998 |
| JP | 10-087859 | 4/1998 |

(Continued)

*Primary Examiner* — Ruiyun Zhang
(74) *Attorney, Agent, or Firm* — Sheridan Ross P.C.

(57) ABSTRACT

Disclosed herein is a liquid crystal display having a liquid crystal display element, the liquid crystal display element including: a pair of alignment films provided on mutually facing sides of a pair of substrates; and a liquid crystal layer which is provided between the pair of alignment films and contains a liquid crystal molecule having a negative dielectric anisotropy, wherein at least one of the pair of alignment films contains a cross-linked compound obtained by cross-linking a polymer compound having a cross-linkable functional group as a side chain, the liquid crystal layer further contains a molecule which has a ring structure and a spacer linking the ring structure, and the liquid crystal molecule is given a pre-tilt by the cross-linked compound.

2 Claims, 12 Drawing Sheets

(56) References Cited

FOREIGN PATENT DOCUMENTS

| JP | 10-232400 | 9/1998 |
| JP | 10-252646 | 9/1998 |
| JP | 11-326638 | 11/1999 |
| JP | 2002-082336 | 3/2002 |
| JP | 2011-095696 | 5/2011 |

* cited by examiner

F I G . 4
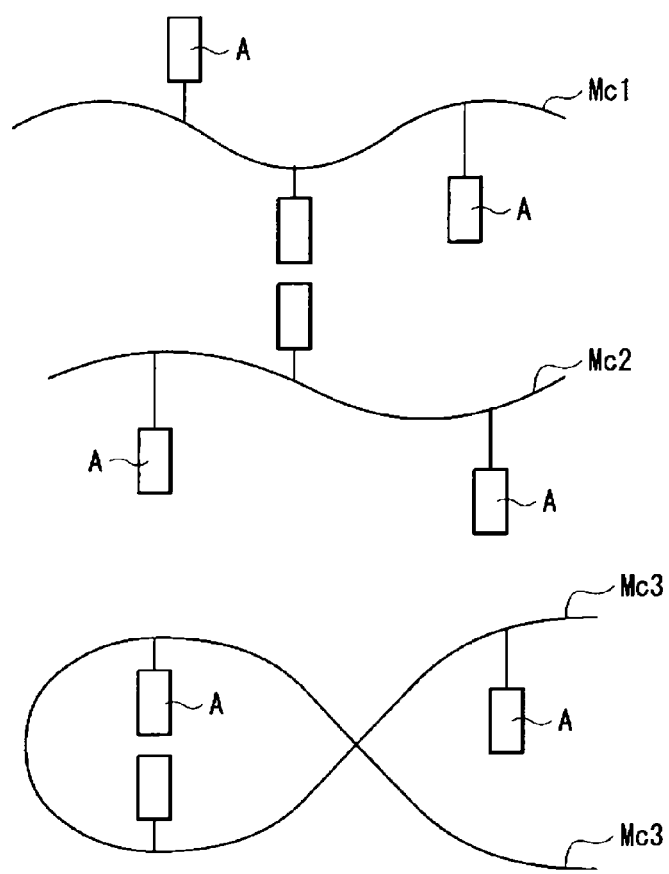
F I G . 5
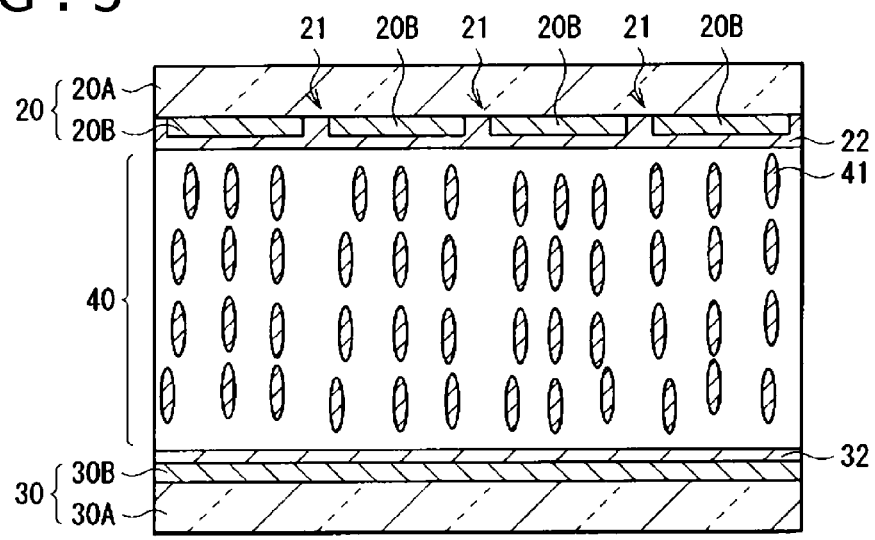

LIQUID CRYSTAL DISPLAY AND METHOD OF MANUFACTURING THE SAME

BACKGROUND

The present disclosure relates to a liquid crystal display including a liquid crystal display element having a liquid crystal layer formed in a sealed-off state between a pair of substrates provided with alignment films on mutually facing sides thereof, and to a method of manufacturing the liquid crystal display.

In recent years, liquid crystal displays (LCDs) have been frequently used as display monitors in liquid crystal TV sets, notebook-sized personal computers, car navigation systems, etc. The liquid crystal displays are classified into a variety of display modes (systems) according to the molecular alignment (orientation) of liquid crystal molecules contained in a liquid crystal layer sandwiched between substrates. As one of the display modes, for example, a TN (Twisted Nematic) mode is well known in which the liquid crystal molecules are aligned (oriented) in a twisted state in the condition where no voltage is impressed thereon. In the TN mode, the liquid crystal molecules have a positive dielectric anisotropy, i.e., a property such that the dielectric constant in the major axis direction of the liquid crystal molecule is greater than the dielectric constant in the minor axis direction. As a result of this, the liquid crystal molecules are arranged in a line in the direction perpendicular to the substrate surface while the oriented azimuths of the liquid crystal molecules are sequentially rotated in planes parallel to the substrate surface.

On the other hand, an increasing attention has been paid to a VA (Vertical Alignment) mode in which liquid crystal molecules are oriented (aligned) vertically to the substrate plane in the condition where no voltage is impressed thereon. In the VA mode, the liquid crystal molecules have a negative dielectric anisotropy, i.e., a property such that the dielectric constant in the major axis direction of the liquid crystal molecule is lower than the dielectric constant in the minor axis direction. Consequently, a wider viewing angle can be realized in the VA mode as compared with the TN mode.

In a liquid crystal display in such a VA mode, when a voltage is impressed thereon, the liquid crystal molecules of a negative dielectric anisotropy having been aligned in the direction vertical to the substrates respond to the voltage in the manner of falling down to be parallel to the substrates, thereby permitting transmission of light therethrough. However, the liquid crystal molecules having been aligned vertically to the substrates are tilted in arbitrary directions. Upon application of a voltage, therefore, the alignment of the liquid crystal molecules is disturbed. This has been a cause of worsening the response characteristic to voltage.

In view of this, in order to enhance the response characteristic, technologies for regulating the direction in which the liquid crystal molecules fall down in response to a voltage have been investigated. A specific example of the technologies is a technique (light alignment film technique or photo-alignment technique) in which a pre-tilt is given to liquid crystal molecules by use of an alignment film formed by irradiation with linearly polarized UV light or irradiation with UV light from an oblique direction relative to the substrate plane. As the light alignment film technique, there has been known, for example, a technique in which a film formed from a polymer including a chalcone structure is irradiated with linearly polarized UV light or irradiated with UV light from an oblique direction relative to the substrate plane, whereby double bond portions in the chalcone structures are cross-linked to form an alignment film (refer to Japanese Patent Laid-open No. Hei 10-087859, Japanese Patent Laid-open No. Hei 10-252646, and Japanese Patent Laid-open No. 2002-082336). In addition, there has also been known a technique in which an alignment film is formed by use of a mixture of a vinyl cinnamate derivative polymer and a polyimide (see Japanese Patent Laid-open No. Hei 10-232400). Further, there has been known, for example, a technique in which a film containing a polyimide is irradiated with linearly polarized light having a wavelength of 254 nm to decompose a portion of the polyimide, thereby forming an alignment film (see Japanese Patent Laid-open No. Hei 10-073821). Besides, as a peripheral technique of the light alignment film technique, there has been known a technique in which a film of a liquid-crystalline polymer compound is formed on a film of a polymer containing a dichromatic photo-reactive building block such as an azobenzene derivative which film has been irradiated with linearly polarized light or irradiated with oblique light, thereby forming a liquid-crystalline alignment film (see Japanese Patent Laid-open No. Hei 11-326638).

In addition, there has been known, from Japanese Patent Laid-open No. 2011-095696, a liquid crystal display having a liquid crystal display element including a pair of alignment films provided on mutually facing sides of a pair of substrates, and a liquid crystal layer containing liquid crystal molecules having a negative dielectric anisotropy, wherein at least one of the pair of alignment films contains a cross-linked or deformed compound obtained by cross-linking or deforming a polymer compound having a cross-linkable functional group as a side chain, and the liquid crystal molecules are given a pre-tilt by the cross-linked or deformed compound.

SUMMARY

While the above-mentioned light alignment film technique is effective in enhancing the response characteristic, however, the technique needs a large type light irradiation apparatus such as an apparatus for irradiation with linearly polarized light or an apparatus for irradiation with light from an oblique direction relative to the substrate plane, in forming the alignment films. Besides, in order to manufacture a liquid crystal display having a multi-domain structure in which orientation (alignment) of liquid crystal molecules is divided by providing a plurality of sub-pixels in each pixel, for the purpose of realizing a wider viewing angle, a more larger type apparatus is needed and the manufacturing process is complicated. Specifically, in a liquid crystal display involving the multi-domain structure, the alignment films are so formed that the pre-tilt differs from sub-pixel to sub-pixel. In the case of using the above-mentioned light alignment film technique in the manufacture of the liquid crystal display involving the multi-domain structure, therefore, irradiation with light is conducted on a sub-pixel basis, so that mask patterns are needed on a sub-pixel basis, and a further larger type light irradiation system has to be prepared. In addition, the technique disclosed in Japanese Patent Laid-open No. 2011-095696 promises an enhanced response characteristic, but the technique is not yet satisfactory. In manufacturing a liquid crystal display by this technique, a voltage is impressed between pixel electrodes and a counter electrode provided in the liquid crystal display so as to give a pre-tilt to liquid crystal molecules, and, and in this connection, there is a request for a further lowering in the voltage impressed in this case.

Thus, there is a need for a liquid crystal display including a liquid crystal display element in which response characteristic can be easily enhanced without using a large type manufacturing equipment and in which the voltage to be impressed at the time of giving a pre-tilt to liquid crystal molecules can be further lowered. Also, there is a need for a method of manufacturing the liquid crystal display as just-mentioned.

According to a first embodiment of the present disclosure, there is provided a liquid crystal display having a liquid crystal display element, the liquid crystal display element including:

a pair of alignment films provided on mutually facing sides of a pair of substrates; and a liquid crystal layer which is provided between the pair of alignment films and contains a liquid crystal molecule having a negative dielectric anisotropy, wherein at least one of the pair of alignment films contains a cross-linked compound obtained by cross-linking a polymer compound having a cross-linkable functional group as a side chain (the cross-linked compound will be referred to as "post-alignment compound," meaning a post-aligning-treatment compound, or a compound after an aligning treatment, for convenience of description), the liquid crystal layer further contains a molecule which has a ring structure and a spacer linking the ring structure, and the liquid crystal molecule is given a pre-tilt by the cross-linked compound (the post-alignment compound). In addition, according to the first embodiment of the present disclosure, there is provided a liquid crystal display element which has the liquid crystal display element in the liquid crystal display according to the first embodiment of the present disclosure. Here, the "cross-linkable functional group" means a group capable of forming a cross-linked structure.

According to a second embodiment of the present disclosure, there is provided a liquid crystal display having a liquid crystal display element, the liquid crystal display element including:

a pair of alignment films provided on mutually facing sides of a pair of substrates; and a liquid crystal layer which is provided between the pair of alignment films and contains a liquid crystal molecule having a negative dielectric anisotropy, wherein at least one of the pair of alignment films contains a deformed compound obtained by deforming a polymer compound having a photo-sensitive functional group as a side chain (the deformed compound will be referred to as "post-alignment compound," meaning a post-aligning-treatment compound, or a compound after an aligning treatment, for convenience of description), the liquid crystal layer further contains a molecule which has a ring structure and a spacer linking the ring structure, and the liquid crystal molecule is given a pre-tilt by the deformed compound (the post-alignment compound). In addition, according to the second embodiment of the present disclosure, there is provided a liquid crystal display element which has the liquid crystal display element in the liquid crystal display according to the second embodiment of the present disclosure. Here, the "photo-reactive functional group" means a group capable of absorbing energy rays.

According to a first embodiment of the present disclosure, there is provided a method of manufacturing a liquid crystal display (or a method of manufacturing a liquid crystal display element), including forming on one of a pair of substrates a first alignment film which includes a polymer compound having a cross-linkable functional group as a side chain (the polymer compound will be referred to as "pre-alignment compound," meaning a pre-aligning-treatment compound, or a compound before an aligning treatment, for convenience of description);

forming a second alignment film on the other of the pair of substrates;

disposing the pair of substrates so that the first alignment film and the second alignment film face each other, and forming, in a sealed-off state between the first alignment film and the second alignment film, a liquid crystal layer which contains a liquid crystal molecule having a negative dielectric anisotropy and a molecule having a ring structure and a spacer linking the ring structure; and after the formation of the liquid crystal layer in the sealed-off state, cross-linking the polymer compound (the pre-alignment compound) so as to give a pre-tilt to the liquid crystal molecule.

Here, in the method of manufacturing a liquid crystal display (or the method of manufacturing a liquid crystal display element) according to the first embodiment of the present disclosure, a configuration may be adopted in which the side chains of the polymer compound (the pre-alignment compound) are cross-linked by irradiation with UV rays while aligning (orienting) the liquid crystal molecules by applying a predetermined electric field to the liquid crystal layer.

In this case, preferably, the irradiation with UV rays is conducted while applying the electric field to the liquid crystal layer in such a manner as to align (orient) the liquid crystal molecules into an oblique direction relative to the surface of at least one of the pair of substrates. Further preferably, the pair of substrates have a substrate provided with pixel electrodes and a substrate provided with a counter electrode, and the UV rays are cast for irradiation from the side of the substrate provided with the pixel electrodes. In general, a color filter is formed on the side of the substrate provided with the counter electrode, and the color filter would absorb UV rays, whereby it may be made difficult for the reaction of the cross-linkable functional groups in the alignment film material to take place. Therefore, it is further preferable to cast the UV rays for irradiation from the side of the substrate which is provided with the pixel electrodes and on which the color filter is not formed. In the case where the color filter is formed on the side of the substrate provided with the pixel electrodes, it is preferable to cast the UV rays for irradiation from the side of the substrate provided with the counter electrode. Basically, the azimuth angle (deflection angle) of the liquid crystal molecules when given the pre-tilt is determined by the direction of the electric field, and the polar angle (zenith angle) is determined by the intensity of the electric field. The same applies also in the methods of manufacturing a liquid crystal display according to second and third embodiments of the present disclosure which will be described later.

According to a second embodiment of the present disclosure, there is provided a method of manufacturing a liquid crystal display (or a method of manufacturing a liquid crystal display element), including:

forming on one of a pair of substrates a first alignment film which includes a polymer compound having a photo-sensitive functional group as a side chain (the polymer compound will be referred to as "pre-alignment compound," meaning a pre-aligning-treatment compound, or a compound before an aligning treatment, for convenience of description);

forming a second alignment film on the other of the pair of substrates;

disposing the pair of substrates so that the first alignment film and the second alignment film face each other, and forming, in a sealed-off state between the first alignment film and the second alignment film, a liquid crystal layer which contains a liquid crystal molecule having a negative dielectric anisotropy and a molecule having a ring structure and a spacer linking the ring structure; and after the formation of the liquid crystal layer in the sealed-off state, deforming the polymer compound (the pre-alignment compound) so as to give a pre-tilt to the liquid crystal molecule.

Here, in the method of manufacturing a liquid crystal display (or the method of manufacturing a liquid crystal display element) according to the second embodiment of the present disclosure, a configuration may be adopted in which the side chains of the polymer compound (the pre-alignment compound) are deformed by irradiation with UV rays while aligning (orienting) the liquid crystal molecules by applying a predetermined electric field to the liquid crystal layer.

According to a third embodiment of the present disclosure, there is provided a method of manufacturing a liquid crystal display (or a method of manufacturing a liquid crystal display element), including:

forming on one of a pair of substrates a first alignment film which includes a polymer compound having a cross-linkable functional group or a photo-sensitive functional group as a side chain (the polymer compound will be referred to as "pre-alignment compound," meaning a pre-aligning-treatment compound, or a compound before an aligning treatment, for convenience of description);

forming a second alignment film on the other of the pair of substrates;

disposing the pair of substrates so that the first alignment film and the second alignment film face each other, and forming, in a sealed-off state between the first alignment film and the second alignment film, a liquid crystal layer which contains a liquid crystal molecule having a negative dielectric anisotropy and a molecule having a ring structure and a spacer linking the ring structure; and after the formation of the liquid crystal layer in the sealed-off state, irradiating the polymer compound (the pre-alignment compound) with energy rays so as to give a pre-tilt to the liquid crystal molecule. Here, examples of the energy rays include UV rays, X-rays, and electron rays.

In the method of manufacturing a liquid crystal display (or the method of manufacturing a liquid crystal display element) according to the third embodiment of the present disclosure, a mode can be adopted in which the polymer compound is irradiated with UV rays used as the energy rays while aligning (orienting) the liquid crystal molecules by applying a predetermined electric field to the liquid crystal layer.

The liquid crystal display according to the first embodiment of the present disclosure, or the method of manufacturing a liquid crystal display according to the first embodiment of the present disclosure inclusive of the above-mentioned preferable modes, will in some cases be generically referred to simply as "the first embodiment of the present disclosure"; the liquid crystal display according to the second embodiment of the present disclosure, or the method of manufacturing a liquid crystal display according to the second embodiment of the present disclosure inclusive of the above-mentioned preferable mode, will in some cases be generically referred to simply as "the second embodiment of the present disclosure"; and the method of manufacturing a liquid crystal display according to the third embodiment of the present disclosure inclusive of the above-mentioned preferable modes will in some cases be generically referred to simply as "the third embodiment of the present disclosure."

Specific examples of the molecule which has a ring structure and a spacer linking the ring structure, in the first embodiment, the second embodiment or the third embodiment of the present disclosure, include nematic liquid-crystalline materials and low-molecular materials which have a negative or neutral dielectric anisotropy and contain at least one compound represented by the following formula:

R1-A1-X1-A2-R2.

Here, A1 and A2 each correspond to the ring structure, and X1 correspond to the spacer. Hereafter, "the molecule which has the ring structure and the spacer linking the ring structure" will in sometimes be referred to as "the molecule having the spacer," for convenience of description.

In the above formula,

R1 and R2 are each an alkyl group of 1 to 10 carbon atoms or an alkenyl group of 2 to 10 carbon atoms, wherein one $CH_2$ group or non-adjacent two or more $CH_2$ groups in the alkyl or alkenyl group may be replaced by an oxygen atom and/or a sulfur atom, and at least one hydrogen atom in the alkyl or alkenyl group may be replaced by a fluorine atom or a chlorine atom;

A1 and A2 are each independently trans-1,4-cyclohexylene group (wherein one $CH_2$ group or non-adjacent two $CH_2$ groups may be replaced by an oxygen atom or a sulfur atom), or 1,4-phenylene group (wherein one or more CH groups may be replaced by a nitrogen atom), or a group selected from the group including 1,4-cyclohexenylene group, 1,4-bicyclo[2,2,2]octylene group, pyperidin-1,4-diyl group, naphthalen-2,6-diyl group, decahydronaphthalen-2,6-diyl group, and 1,2,3,4-tetrahydronaphthalen-2,6-diyl group, provided that hydrogen atoms in A1 and A2 may be replaced by CN or halogen; and X1 is —$CH_2CH_2$—, —CH=CH—, —$CH(CH_3)CH_2$—, —$CH_2CH(CH_3)$—, —$CH(CH_3)CH(CH_3)$—, —$CF_2CF_2$—, —CF=CF—, —$CH_2O$—, —$OCH_2$—, —$OCH(CH_3)$—, —$CH(CH_3)$ O—, —$(CH_2)_4$—, —$(CH_2)_3O$—, —$O(CH_2)_3$—, —C≡C—, —$CF_2O$—, —$OCF_2$—, —COO—, —COO—, —COS—, —SCO—, —O—, or —C—.

Incidentally, the molecule having the spacer as above-mentioned may be a liquid crystal molecule or may not be a liquid crystal molecule (in other words, may not exhibit liquid crystallinity). In the case where the molecule having the spacer is a liquid crystal molecule, the molecule having the spacer may be a liquid crystal molecule having a negative dielectric anisotropy or may be a liquid crystal molecule not having a negative dielectric anisotropy. Specific examples of the molecule having the spacer include a biphenyl structure and a phenylbenzoate structure, and, further, include the molecules that have the following structural formulas.

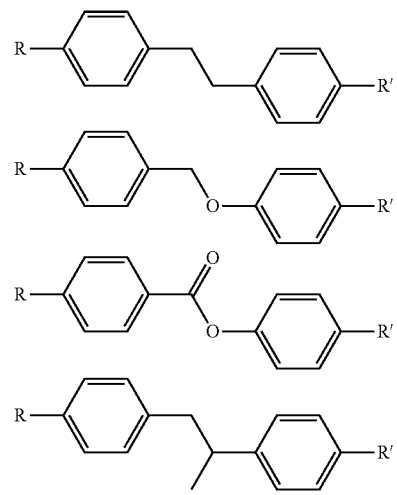

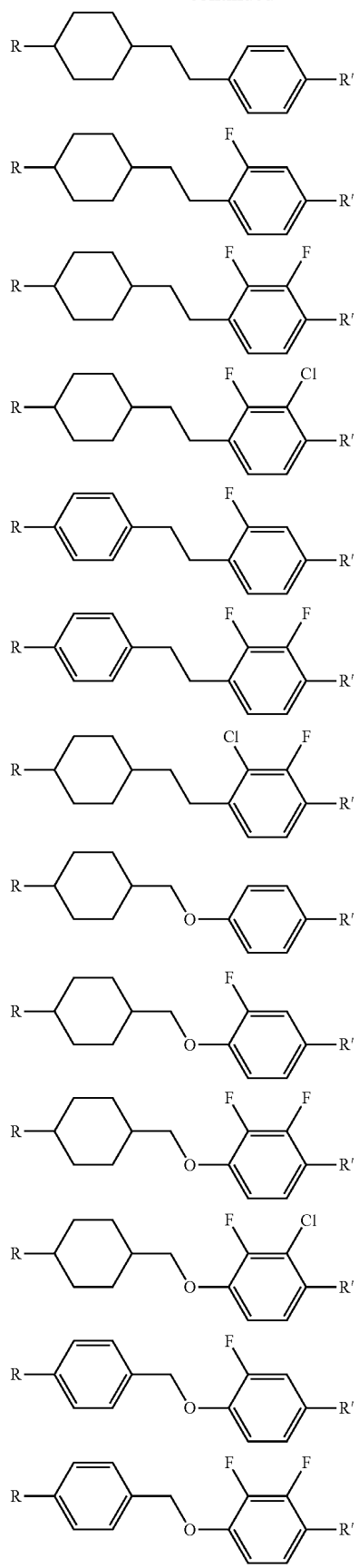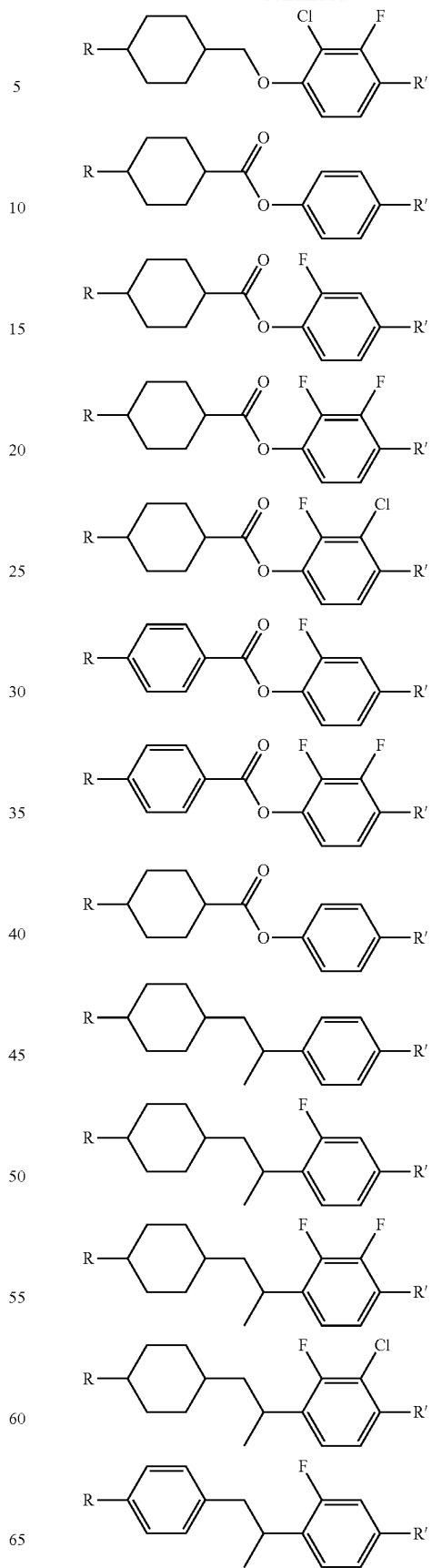

-continued

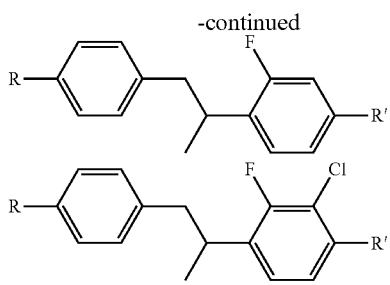

Besides, in general, the liquid crystal layer includes a plurality of liquid crystal molecules, and at least one kind of liquid crystal molecules are liquid crystal molecules that have a negative dielectric anisotropy.

Furthermore, in the first embodiment, the second embodiment or the third embodiment of the present disclosure inclusive of the above-described preferable modes, the mass ratio of the molecule which has the ring structure and the spacer linking the ring structure (the molecule having the ring structure) to the total mass of the liquid crystal molecule and the molecule which has the ring structure and the spacer linking the ring structure (the molecule having the ring structure) may be in the range of 1 to 50% by mass.

In the first embodiment, second embodiment or third embodiment of the present disclosure inclusive of the above-described preferable modes, a configuration may be adopted wherein the polymer compound (the pre-alignment compound) or the compound constituting at least one of the pair of alignment films (the post-alignment compound) includes a compound which further has, as a side chain, a group represented by the formula (1). Incidentally, such a configuration will be referred to as "Configuration 1A of the present disclosure, Configuration 2A of the present disclosure, Configuration 3A of the present disclosure," for convenience of description.

where R1 is a straight chain or branched bivalent organic group of at least 3 carbon atoms and is linked to a main chain of the polymer compound or the cross-linked compound (the pre-alignment compound or the post-alignment compound), R2 is a bivalent organic group including a plurality of ring structures, wherein one of the atoms constituting the ring structures is linked to R1, and R3 is a hydrogen atom, a halogen atom, an alkyl group, an alkoxy group, a univalent group having a carbonate group, or a derivative thereof.

Or, in the first embodiment, second embodiment or third embodiment of the present disclosure, a configuration may be adopted in which the polymer compound (the pre-alignment compound) or the compound constituting at least one of the pair of alignment films (the post-alignment compound) includes a compound which has, as a side chain, a group represented by the formula (2). Incidentally, such a configuration will be referred to as "Configuration 1B of the present disclosure, Configuration 2B of the present disclosure, Configuration 3B of the present disclosure," for convenience of description.

where R11 is a straight chain or branched bivalent organic group of 1 to 20 carbon atoms, preferably 3 to 12 carbon atoms, which may include an ether group or an ester group and which is linked to a main chain of the polymer compound or the cross-linked compound (the pre-alignment compound or the post-alignment compound), or R11 is an ether group or an ester group and is linked to the main chain of the polymer compound or the cross-linked compound (the pre-alignment compound or the post-alignment compound), R12 is an ethynylene group or a bivalent group including one type of structure selected from among chalcone, cyannamate, cyannamoyl, coumarin, maleimide, benzophenone, norbornene, oryzanol, and chitosan, R13 is a bivalent organic group including a plurality of ring structures, and R14 is a hydrogen atom, a halogen atom, an alkyl group, an alkoxy group, a univalent group having a carbonate group, or a derivative thereof.

Or, in the first embodiment of the present disclosure, a configuration may be adopted wherein the cross-linked compound (the post-alignment compound) obtained by cross-linking the polymer compound (the pre-alignment compound) includes a side chain, and a main chain supporting the side chain on the substrate; the side chain includes a cross-linked portion which is linked to the main chain and in which the side chain is partly cross-linked, and a terminal structure portion linked to the cross-linked portion; and the liquid crystal molecule is given the pre-tilt by being set along the terminal structure portion or being clamped by the terminal structure portion. Or, in the second embodiment of the present disclosure, a configuration may be adopted wherein the deformed compound (the post-alignment compound) obtained by deforming the polymer compound (the pre-alignment compound) includes a side chain, and a main chain supporting the side chain on the substrate; the side chain includes a deformed portion which is linked to the main chain and in which the side chain is partly deformed, and a terminal structure portion linked to the deformed portion; and the liquid crystal molecule is given the pre-tilt by being set along the terminal structure portion or being clamped by the terminal structure portion. Or, in the third embodiment of the present disclosure, a configuration may be adopted wherein the compound obtained by irradiating the polymer compound with energy rays includes a side chain, and a main chain supporting the side chain on the substrate; the side chain includes a cross-linked/deformed portion which is linked to the main chain and in which the side chain is partly cross-linked or deformed, and a terminal structure portion linked to the cross-linked/deformed portion; and the liquid crystal molecule is given the pre-tilt by being set along the terminal structure portion or being clamped by the terminal structure portion. Incidentally, such configurations will be referred to as "Configuration 1C of the present disclosure, Configuration 2C of the present disclosure, Configuration 3C of the present disclosure," for convenience of description. In Configuration 1C of the present disclosure, Configuration 2C of the present disclosure, and Configuration 3C of the present disclosure, the terminal structure portion may have a mesogenic group.

Or, in the first embodiment of the present disclosure, a configuration may be adopted wherein the cross-linked compound (the post-alignment compound) obtained by cross-linking the polymer compound (the pre-alignment compound) includes a side chain, and a main chain supporting the side chain on the substrate; and the side chain includes a cross-linked portion which is linked to the main chain and in which the side chain is partly cross-linked, and a terminal structure portion which is linked to the cross-linked portion and has a mesogenic group. Incidentally, such a configuration will be referred to as "Configuration 1D of the present disclosure," for convenience of description. Further, in Configuration 1D, the main chain and the cross-linked portion may be linked to each other by a covalent bond, and the cross-linked portion and the terminal structure portion may be linked to each other by a covalent bond. Or, in the second embodiment of the present disclosure, a configuration may be adopted wherein the deformed compound (the post-alignment compound) obtained by deforming the polymer compound (the pre-alignment compound) includes a side chain, and a main chain supporting the side chain on the substrate; and the side chain includes a deformed portion which is linked to the main chain and in which the side chain is partly deformed, and a terminal structure portion which is linked to the deformed portion and has a mesogenic group. Incidentally, such a configuration will be referred to as "Configuration 2D of the present disclosure," for convenience of description. Or, in the third embodiment of the present disclosure, a configuration may be adopted wherein the compound (the post-alignment compound) obtained by irradiating the polymer compound (the pre-alignment compound) with energy rays includes a side chain, and a main chain supporting the side chain on the substrate; and the side chain includes a cross-linked/deformed portion which is linked to the main chain and in which the side chain is partly cross-linked or deformed, and a terminal structure portion which is linked to the cross-linked/deformed portion and has a mesogenic group. Incidentally, such a portion will be referred to as "Configuration 3D of the present disclosure," for convenience of description.

In the first embodiment of the present disclosure inclusive of Configurations 1A to 1D of the present disclosure, the side chain (more specifically, the cross-linked portion) may have a photodimerizable photo-sensitive group.

Further, in the first to third embodiments of the present disclosure inclusive of the above-described preferable configurations and modes, a configuration may be adopted wherein the first alignment film has a surface roughness Ra of not more than 1 nm, or at least one of the pair of alignment films has a surface roughness Ra of not more than 1 nm. Incidentally, such a configuration will be referred to as "Configuration 1E of the present disclosure, Configuration 2E of the present disclosure, Configuration 3E of the present disclosure," for convenience of description. Here, the surface roughness Ra is as defined in JIS B 0601:2001.

Furthermore, in the first to third embodiments of the present disclosure inclusive of the above-described preferable configurations and modes, a mode may be adopted wherein the second alignment film includes the polymer compound (the pre-alignment compound) constituting the first alignment film, or the pair of alignment films have the same composition. It is to be noted here, however, the pair of alignment films may have different compositions, and the second alignment film may include a polymer compound (a pre-alignment compound) different from the polymer compound (the pre-alignment compound) constituting the first alignment film, insofar as the pair of alignment films include the polymer compound (the pre-alignment compound) specified in the first to third embodiments of the present disclosure Further, in the first to third embodiments of the present disclosure inclusive of the above-described preferable configurations and modes, a configuration may be adopted wherein the liquid crystal display is provided with an orientation-regulating portion which includes a slit formed in an electrode or an orientation-regulating portion which includes a projection provided on the substrate.

In the first to third embodiments of the present disclosure inclusive of the above-described preferable configurations and modes, a configuration may be adopted wherein the main chain includes an imide bond in a repeating unit. Besides, a mode may be adopted wherein the polymer compound (the post-alignment compound) includes a structure by which the liquid crystal molecules are aligned (oriented) in a predetermined direction relative to the pair of substrates. Furthermore, a mode may be adopted wherein the pair of substrates include a substrate provided with pixel electrodes and a substrate provided with a counter electrode.

In the first to third embodiments of the present disclosure, the liquid crystal layer includes the molecules which have the ring structures and the spacer linking the ring structures (the molecules having the spacer) in addition to the liquid crystal molecules. This makes it possible to further lower the voltage to be impressed at the time of giving the pre-tilt to the liquid crystal molecules, in manufacturing the liquid crystal display. Moreover, it is possible to moderate the strains in the liquid crystal molecules at the alignment (orientation) interface in giving the pre-tilt. As a result, it is possible to stabilize the value of pre-tilt and to further enhance the response speed.

Moreover, in the liquid crystal display according to the first embodiment of the present disclosure, at least one of the pair of alignment films includes the cross-linked compound obtained by cross-linking the polymer compound having the cross-linkable functional group as a side chain, so that a pre-tilt is given to the liquid crystal molecules by the cross-linked compound. When an electric field is impressed between the pixel electrode and the counter electrode, therefore, the major axis direction of the liquid crystal molecule is put into a predetermined direction relative to the substrate plane in response to the electric field, whereby good display characteristics are secured. In addition, since the pre-tilt is given to the liquid crystal molecules by the cross-linked compound, the response speed according to the electric field between the electrodes is enhanced, as compared with the case where the pre-tilt is not given to the liquid crystal molecules. Besides, good display characteristics can be maintained more easily, as compared with the case where a pre-tilt is given to the liquid crystal molecules without using the cross-linked compound.

In the method of manufacturing a liquid crystal display according to the first embodiment of the present disclosure, the first alignment film including the polymer compound having the cross-linkable functional group as a side chain is formed, before forming the liquid crystal layer in a sealed-off state between the first alignment film and the second alignment film. Here, the first alignment film and the second alignment film ensure that the liquid crystal molecules in the liquid crystal layer are, as a whole, aligned (oriented) in a predetermined direction (for example, a horizontal direction, a vertical direction or an oblique direction) relative to the surfaces of the first alignment film and the second alignment film. Next, while applying an electric field, the cross-linkable functional groups are brought into reaction, whereby the polymer compound is cross-linked. As a result, a pre-tilt can be given to the liquid crystal molecules present in the vicinity of the cross-linked compound. In short, by cross-linking the polymer compound in the condition where the liquid crystal molecules are aligned (oriented), the pre-tilt can be given to the liquid crystal molecules, without irradiating the alignment films with linearly polarized light or oblique light before forming the liquid crystal layer in the sealed-off state, and without using large type equipment. Consequently, the response speed is enhanced, as compared with the case where a pre-tilt is not given to the liquid crystal molecules.

In the liquid crystal display according to the second embodiment of the present disclosure, at least one of the pair of alignment films includes the deformed compound obtained by deforming the polymer compound having the photo-sensitive functional group as a side chain, so that a pre-tilt is given to the liquid crystal molecules by the deformed compound. When an electric field is impressed between the pixel electrode and the counter electrode, therefore, the major axis direction of the liquid crystal molecule is put into a predetermined direction relative to the substrate plane in response to the electric field, whereby good display characteristics are secured. In addition, since the pre-tilt is given to the liquid crystal molecules by the deformed compound, the response speed according to the electric field between the electrodes is enhanced, as compared with the case where the pre-tilt is not given to the liquid crystal molecules. Besides, good display characteristics can be maintained more easily, as compared with the case where a pre-tilt is given to the liquid crystal molecules without using the deformed compound.

In the method of manufacturing a liquid crystal display according to the second embodiment of the present disclosure, the first alignment film including the polymer compound having the photo-sensitive functional group as a side chain is formed, before forming the liquid crystal layer in a sealed-off state between the first alignment film and the second alignment film. Here, the first alignment film and the second alignment film ensure that the liquid crystal molecules in the liquid crystal layer are, as a whole, aligned (oriented) in a predetermined direction (for example, a horizontal direction, a vertical direction or an oblique direction) relative to the surfaces of the first alignment film and the second alignment film. Next, the polymer compound is deformed while applying an electric field. By this, a pre-tilt can be given to the liquid crystal molecules in the vicinity of the deformed compound. In short, by deforming the polymer compound in the condition where the liquid crystal molecules are aligned (oriented), the pre-tilt can be given to the liquid crystal molecules, without irradiating the alignment films with linearly polarized light or oblique light before forming the liquid crystal layer in the sealed-off state, and without using large type equipment. As a result, the response speed is enhanced, as compared with the case where a pre-tilt is not given to the liquid crystal molecules.

In the method of manufacturing a liquid crystal display according to the third embodiment of the present disclosure, the polymer compound (the pre-alignment compound) is irradiated with energy rays, whereby a pre-tilt is given to the liquid crystal molecules. In short, by cross-linking or deforming the side chains of the polymer compound in the condition where the liquid crystal molecules are aligned (oriented), the pre-tilt can be given to the liquid crystal molecules, without irradiating the alignment films with linearly polarized light or oblique light before forming the liquid crystal layer in the sealed-off state, and without using large type equipment. Accordingly, the response speed is enhanced, as compared with the case where a pre-tilt is not given to the liquid crystal molecules.

BRIEF DESCRIPTION OF THE DRAWINGS

FIG. 4 is a schematic illustration of the state of a polymer compound (a pre-alignment compound) in an alignment film for illustrating the method of manufacturing the liquid crystal display shown in FIG. 1;

FIG. 5 is a schematic partial sectional view of substrates, etc. for illustrating the method of manufacturing the liquid crystal display shown in FIG. 1;

DETAILED DESCRIPTION OF THE PREFERRED EMBODIMENTS

Figure 1:
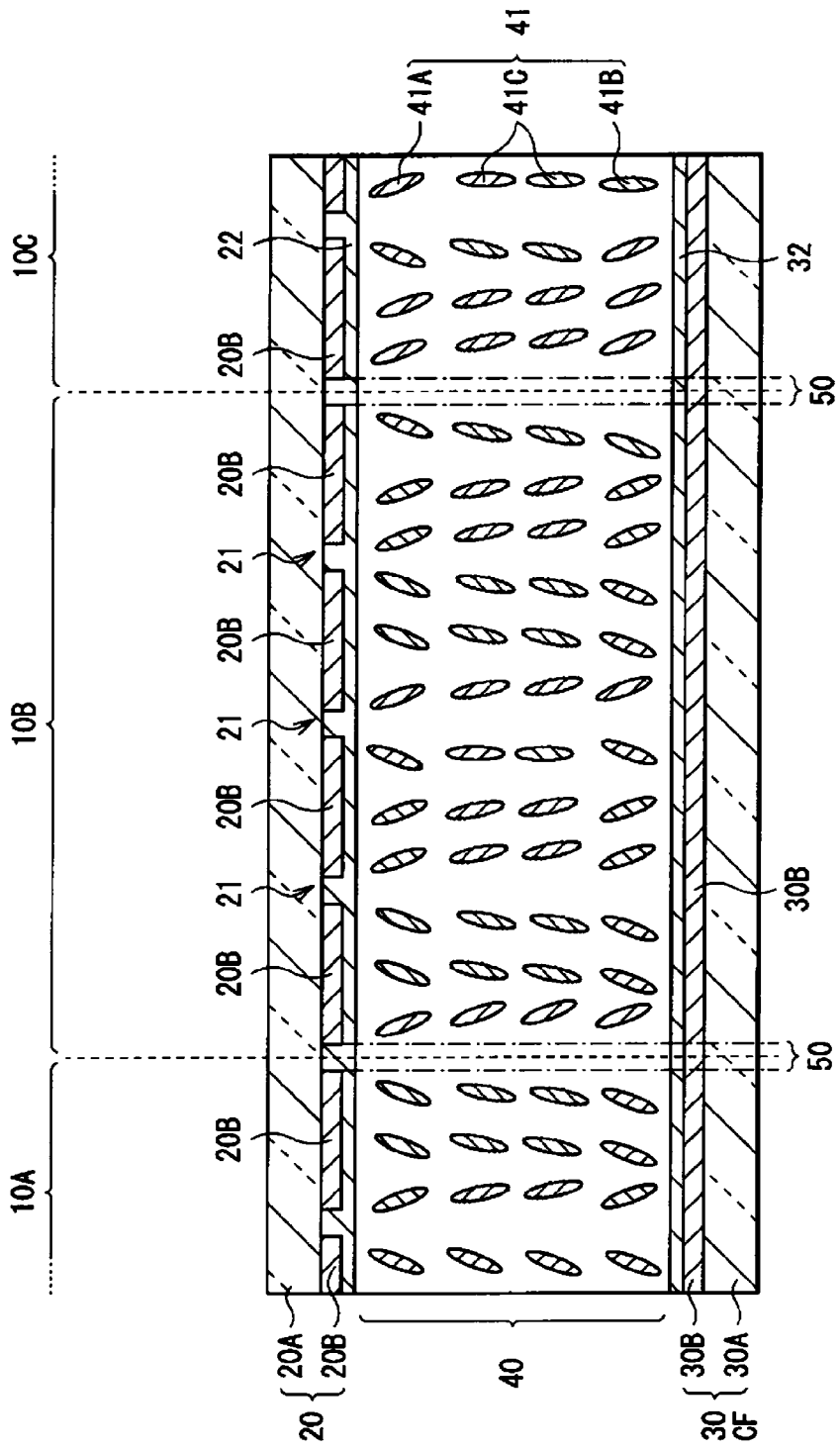
FIG. 1 is a schematic partial sectional view of a liquid crystal display according to an embodiment of the present disclosure.

Now, the present disclosure will be described below on the basis of carrying-out modes and Examples of the present disclosure, referring to the drawings, but the present disclosure is not limited to the carrying-out modes and Examples. Various numerical values and materials in the carrying-out modes and Examples are mere examples. Description will be made in the following order.

1. Description of common configurations and structures in liquid crystal displays according to embodiments of the present disclosure 2. Description of liquid crystal displays and manufacturing methods therefor according to embodiments of the present disclosure, based on modes for carrying out the present disclosure 3. Description of liquid crystal displays and manufacturing methods therefor, etc. according to embodiments of the present disclosure, based on Examples [Description of common configurations and structures in liquid crystal displays (liquid crystal display elements) according to embodiments of the present disclosure]

A schematic partial sectional view of a liquid crystal display (liquid crystal display element) according to each of the first to third embodiments of the present disclosure is shown in FIG. 1. This liquid crystal display has a plurality of pixels 10 (10A, 10B, 10C . . . ). In the liquid crystal display (liquid crystal display element), a liquid crystal layer 40 containing liquid crystal molecules 41 having a negative dielectric anisotropy is provided between a TFT (Thin Film Transistor) substrate 20 and a CF (Color Filter) substrate 30, with alignment films 22 and 32. The liquid crystal layer 40 further contains molecules each of which has ring structures and a spacer linking the ring structures to each other (these molecules will be referred to as "the molecules having the spacer"). Thus, the liquid crystal layer 40 is a system in which the liquid crystal molecules 41 having a negative dielectric anisotropy and the molecules having the spacer are mixed with each other. Incidentally, the liquid crystal molecules 41 each generally have a mesogenic skeleton. The liquid crystal display (liquid crystal display element) is of a so-called transmission type and its display mode is a vertical alignment (VA) mode. FIG. 1 shows a non-driving state in which a driving voltage is not impressed.

The TFT substrate 20 has a structure in which a plurality of pixel electrodes 20B are, for example, arranged in a matrix pattern on that surface of a glass substrate 20A which faces the CF substrate 30. Further, the TFT substrate 20 is provided also with TFT switching elements each of which has a gate, a source, a drain and the like and by which the plurality of pixel electrodes 20B are driven, and gate lines and source lines and the like (not shown) connected to these TFT switching elements. The pixel electrodes 20B are provided on the basis of each of pixels electrically separated by pixel separation sections 50 on the glass substrate 20A, and are formed of a transparent material, for example, ITO (indium tin oxide). The pixel electrode 20B in each pixel is provided with slit portions 21 (portions where the electrode is not formed) in a striped pattern or a V-shaped pattern, for example. This ensures that when a driving voltage is impressed, electric fields in oblique directions relative to the major axes of the liquid crystal molecules 41 are applied, whereby regions different in alignment (orientation) direction are formed in each pixel (division of alignment (orientation)), so that viewing angle characteristic is enhanced. In other words, the slit portions 21 are an orientation-regulating portion for regulating the orientation (alignment) of the whole part of the liquid crystal molecules 41 in the liquid crystal layer 40; here, the orientation direction of the liquid crystal molecules 41 upon application of the driving voltage is regulated by the slit portions 21. Fundamentally, the azimuth angle of the liquid crystal molecule when the pre-tilt is given thereto is determined by the direction of the electric field, as above-mentioned, and the direction of the electric field is determined by the orientation-regulating portion. Incidentally, the same pre-tilt as that for the liquid crystal molecule 41 is given to the molecule having the spacer.

The CF substrate 30 has a structure in which a color filter (not shown) including striped filters for red (R), green (G) and blue (B), for example, and a counter electrode 30B are disposed on that surface of the glass substrate 30A which faces the TFT substrate 20, over substantially the whole area of an effective display region. The counter electrode 30B is formed of a transparent material, such as ITO, like the pixel electrodes 20B.

The alignment film 22 is provided on the surface, on the liquid crystal layer 40 side, of the TFT substrate 20 in such a manner as to cover the pixel electrode 20B and the slit portions 21. The alignment film 32 is provided on the surface, on the liquid crystal layer 40 side, of the CF substrate 30 in such a manner as to cover the counter electrode 30B. The alignment films 22 and 32 are for regulating the alignment (orientation) of the liquid crystal molecules 41; here, the alignment films 22 and 32 have the function of aligning the liquid crystal molecules 41 in the vertical direction relative to the substrate planes and the function of giving a pre-tilt to the liquid crystal molecules 41 (41A, 41B) in the vicinity of the substrates and, further, to the molecules having the spacer. Incidentally, in the liquid crystal display (liquid crystal display element) shown in FIG. 1, the slit portions are not provided on the side of the CF substrate 30.

Figure 8:
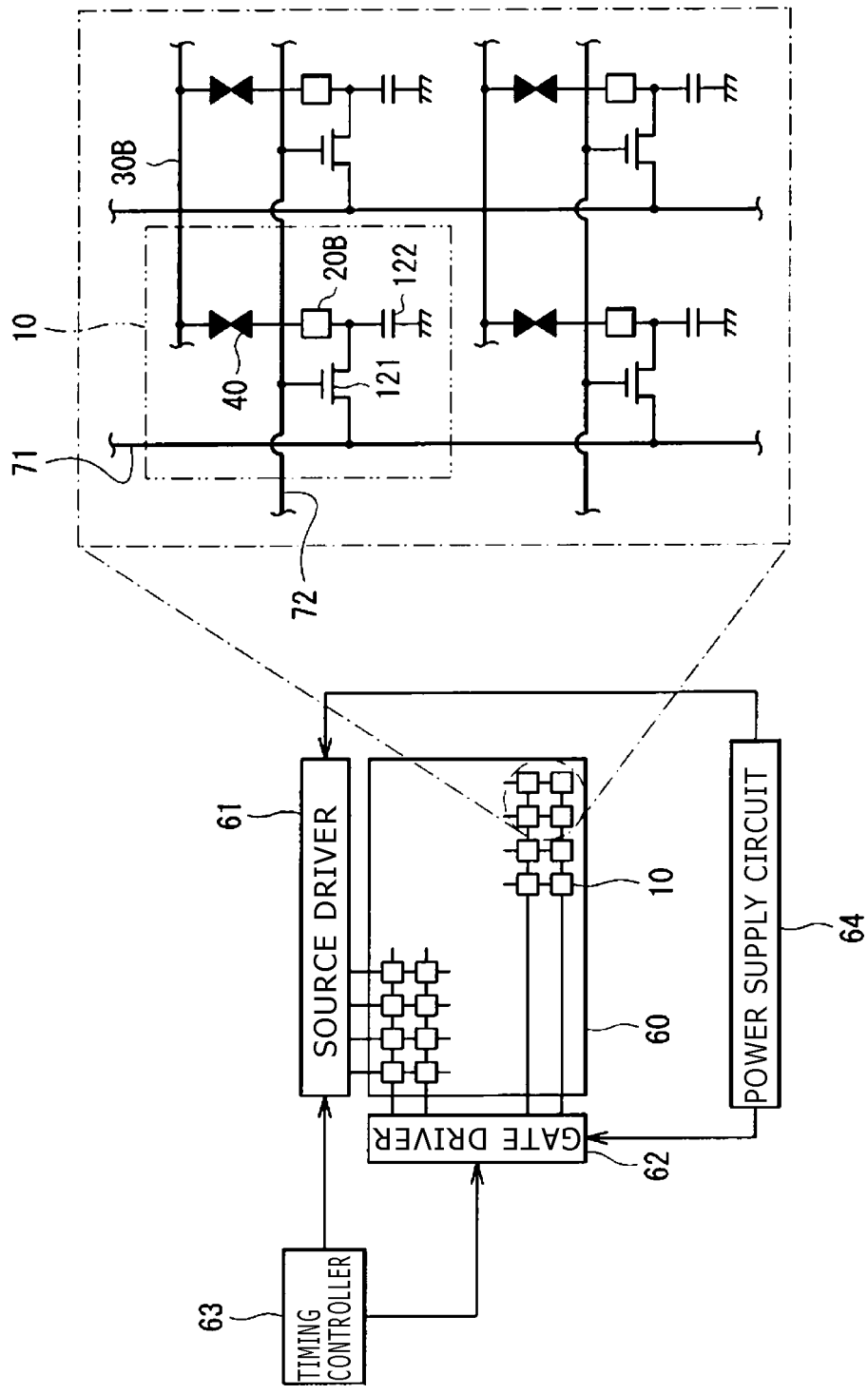
FIG. 8 is a circuit diagram of the liquid crystal display shown in FIG. 1.

FIG. 8 illustrates the circuit configuration in the liquid crystal display shown in FIG. 1.

As shown in FIG. 8, the liquid crystal display includes a liquid crystal display element which has a plurality of pixels 10 provided within a display region 60. The liquid crystal display is provided, in the surroundings of the display region 60, with a source driver 61 and a gate driver 62, a timing controller 63 by which the source driver 61 and the gate driver 62 are controlled, and a power supply circuit 64 by which electric power is supplied to the source driver 61 and the gate driver 62.

The display region 60, as a region in which to display a video image, has a configuration wherein the plurality of pixels 10 are arranged in a matrix pattern so that a video image can be displayed. In FIG. 8, in addition to the illustration of the display region 60 including the plurality of pixels 10, an enlarged illustration of a region corresponding to four of the pixels 10 is presented separately.

In the display region 60, a plurality of source lines 71 are arrayed in a row direction, a plurality of gate lines 72 are arrayed in a column direction, and the pixels 10 are disposed respectively at the positions where the source line 71 and the gate lines 72 intersect. Each of the pixels 10 includes a transistor 121 and a capacitor 122, in addition to the pixel electrode 20B and the liquid crystal layer 40. Of each transistor 121, a source electrode is connected to the source line 71, a gate electrode is connected to the gate line 72, and a drain electrode is connected to the capacitor 122 and the pixel electrode 20B. Each of the source lines 71 is connected to the source driver 61, and is supplied with an image signal from the source driver 61. Each of the gate lines 72 is connected to the gate driver 62, and is supplied with a scanning signal from the gate driver 62 in a sequential manner.

The source driver 61 and the gate driver 62 select a specified pixel or pixels 10 from among the plurality of pixels 10.

The timing controller 63 outputs, for example, the image signal (e.g., RGB video signals corresponding to red, green and blue) and a source driver control signal for controlling the operation of the source driver 61, to the source driver 61. Besides, the timing controller 63 outputs, for example, a gate driver control signal for controlling the operation of the gate driver 62, to the gate driver 62. The source driver control signal includes, for example, a horizontal scanning signal, a starting pulse signal, and a source-driver clock signal. The gate driver control signal includes, for example, a vertical scanning signal and a gate-driver clock signal.

In the liquid crystal display, a video image is displayed by impressing the driving voltages between the pixel electrodes 20B and the counter electrode 30B in the following manner. Specifically, in response to the source driver control signal inputted from the timing controller 63, the source driver 61 supplies individual image signals to predetermined source lines 71 on the basis of the image signals which are also inputted from the timing controller 63. Concurrently, in response to the gate driver control signal inputted from the timing controller 63, the gate driver 62 supplies the scanning signals sequentially to the gate lines 72 at predetermined timings. As a result, the pixels 10 located at the intersections of the source lines 71 supplied with the image signals and the gate lines 72 supplied with the scanning signals are selected, and a driving voltage is impressed on each of the pixels 10 thus selected.

Now, the present disclosure will be described below, based on modes for carrying out the present disclosure (referred to simply as "Modes") and Examples.

[Mode 1]

Mode 1 relates to a liquid crystal display (or liquid crystal display element) in the VA mode according to the first embodiment of the present disclosure, and the method of manufacturing a liquid crystal display (or liquid crystal display element) according to the first and third embodiments of the present disclosure. In Mode 1, the alignment films 22 and 32 are configured to include at least one polymer compound (post-alignment compound) having a cross-linked portion as a side chain. The liquid crystal molecules 41 and, further, the molecules having the spacer are given a pre-tilt by the cross-linked compound. Incidentally, the system in which the liquid crystal molecules 41 given the pre-tilt and the molecules having the spacer given the pre-tilt are mixed will in some cases be generically referred to as "the liquid crystal molecules 41 etc.," "the liquid crystal molecules 41A etc.," "the liquid crystal molecules 42B etc.," "the liquid crystal molecules 41A, 41B etc.," or "the liquid crystal molecules 41C etc." Here, the post-alignment compound is formed by a method wherein the alignment films 22 and 32 are formed in the state of containing at least one polymer compound having a main chain and a side chain (pre-alignment compound), thereafter the liquid crystal layer 40 is provided, and then the polymer compound is cross-linked or is irradiated with energy rays, more specifically, the cross-linkable functional groups contained in the side chains are put into reaction while applying an electric field or a magnetic field. In addition, the post-alignment compound includes a structure by which the liquid crystal molecules 41 etc. are aligned in a predetermined direction (specifically, an oblique direction) relative to the pair of substrates (specifically, the TFT substrate 20 and the CF substrate 30). Thus, the polymer compound is cross-linked or irradiated with energy rays to cause the post-alignment compound to be contained in the alignment films 22 and 32, whereby the pre-tilt can be given to the liquid crystal molecules 41 etc. in the vicinity of the alignment films 22 and 32. As a result of this, response speed is enhanced, and display characteristics are enhanced.

The pre-alignment compound preferably includes a highly heat-resistant structure as a main chain. This ensures that even when the liquid crystal display (liquid crystal display element) is exposed to a high-temperature environment, the post-alignment compound in the alignment films 22 and 32 maintains the orientation-regulating ability for the liquid crystal molecules 41 etc., so that display characteristics such as contrast are maintained at high level together with response characteristic, and reliability is secured. Here, the main chain preferably contains an imide bond in the repeating unit. Examples of a pre-alignment compound containing the imide bonds in the main chain include polymer compounds including a polyimide structure represented by the formula (3). The polymer compound including the polyimide structure represented by the formula (3) may be composed of one type of the polyimide structure of the formula (3), or may include a plurality of types of the polyimide structures of the formula (3) interconnected at random, or may include other structure(s) in addition to the structure of the formula (3).

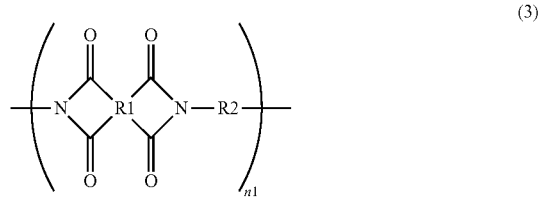

(3)

where R1 is a tetravalent organic group, R2 is a bivalent organic group, and n1 is an integer of not less than 1.

R1 and R2 in the formula (3) may be any tetravalent or bivalent group that includes carbon, but it is preferable that at least one of R1 and R2 includes a cross-linkable functional group as a side chain. This ensures that in the post-alignment compound, a sufficient orientation-regulating ability can be easily obtained.

In the pre-alignment compound, a plurality of side chains may be linked to the main chain, and it suffices that at least one of the plurality of side chains includes a cross-linkable functional group. In other words, the pre-alignment compound may include a side chain or chains which are not cross-linkable, in addition to the cross-linkable side chain(s). The number of kinds of the side chains including a cross-linkable group may be one or may be more than one. The cross-linkable group may be an arbitrary functional group insofar as it is capable of a cross-linking reaction after the formation of the liquid crystal layer 40. The cross-linkable functional group may be a group which forms a cross-linked structure through a photo-reaction, or may be a group which forms a cross-linked structure through a thermal reaction; among these groups, preferred is a photo-reactive cross-linkable functional group (a photo-sensitive group) which forms a cross-linked structure through a photo-reaction. Such a photo-reactive cross-linkable functional group makes it easy to regulate the alignment (orientation) of the liquid crystal molecules 41 etc. into a predetermined direction, enhances response characteristic, and makes it easy to manufacture a liquid crystal display (liquid crystal display element) having good display characteristics.

Examples of the photo-reactive cross-linkable functional group (a photo-sensitive group, e.g., a photo-dimerizable photo-sensitive group) include groups which include one type of structure selected from among chalcone, cyannamate, cyannamoyl, coumarin, maleimide, benzophenone, norbornene, oryzanol, and chitosan structures. Among these groups, examples of a group which includes a chalcone, cyannamate or cyannamoyl structure include a group represented by the formula (41) below. When a pre-alignment compound having a side chain including the group of the formula (41) is cross-linked, for example, a structure represented by the formula (42) below is formed. Specifically, a post-alignment compound formed from a polymer compound including the group of the formula (41) includes the structure represented by the formula (42) which has a cyclobutane skeleton. Incidentally, a photo-reactive cross-linkable functional group such as maleimide, for example, is not only capable of a photo-dimerizing reaction but also capable of a polymerizing reaction. Therefore, "the cross-linkable functional group" include not only cross-linkable functional groups capable of a photo-dimerizing reaction but also cross-linkable functional groups capable of a polymerizing reaction. In other words, in the present disclosure, the concept of "cross-linking" includes not only photo-dimerization reaction but also polymerization reaction.

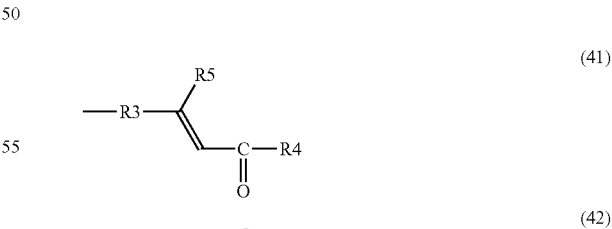

(41)

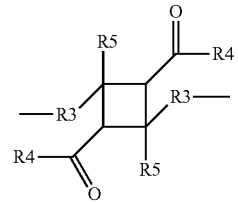

(42)

where R3 is a bivalent group including an aromatic ring, R4 is a univalent group including one or more ring structures, R5 is a hydrogen atom or an alkyl group or a derivative thereof.

R3 in the formula (41) may be any bivalent group that includes an aromatic ring such as benzene ring, and may include a carbonyl group, an ether linkage, an ester linkage or a hydrocarbon group in addition to the aromatic ring. In addition, R4 in the formula (41) may be any univalent group that include one or more ring structures, and may include a carbonyl group, an ether linkage, an ester linkage, a hydrocarbon group or a halogen atom or the like in addition to the ring structure(s). The ring structure possessed by R4 may be any ring that contains carbon as an element constituting the skeleton thereof. Examples of the ring structure include aromatic rings, heterocyclic rings, aliphatic rings, and ring structures obtained by linking or condensing these rings. R5 in the formula (41) is an arbitrary group insofar as it is a hydrogen atom or an alkyl group or a derivative thereof. Here, the "derivative" of an alkyl group means a group obtained by replacing at least one of the hydrogen atoms possessed by the alkyl group with a substituent group such as a halogen atom. Besides, the number of carbon atoms in the alkyl group to be introduced as R5 is not particularly limited. R5 is preferably hydrogen atom or methyl group, which promises good cross-linkability.

The R3 groups in the formula (42) may be identical or different. This applies also to the R4 groups and the R5 groups in the side chains represented by the formula (41). Examples of R3, R4 and R5 in the formula (42) include the same groups as mentioned above for the R3, R4 and R5 in the formula (41).

Examples of the groups represented by the formula (41) include groups represented by the following formulas (41-1) to (41-27). However, the examples are not limited to the groups represented by the formulas (41-1) to (41-27).

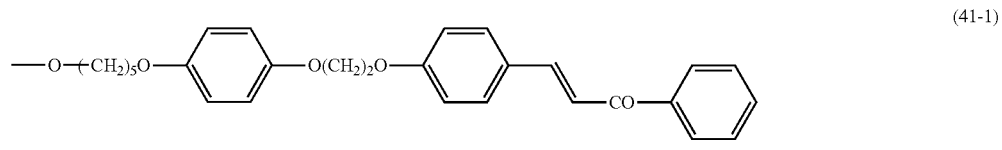

(41-1)

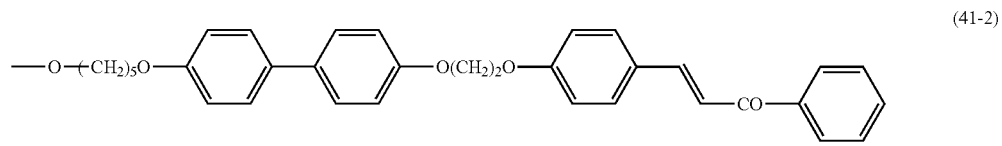

(41-2)

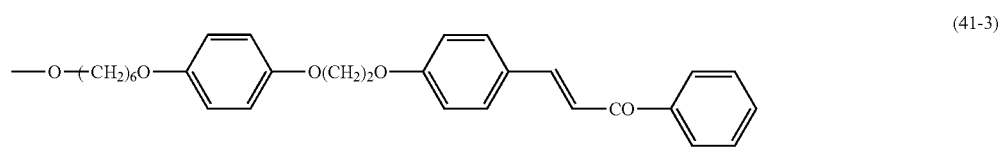

(41-3)

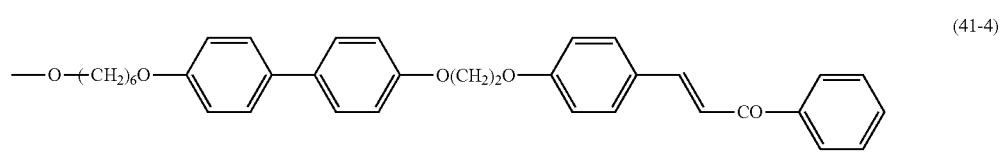

(41-4)

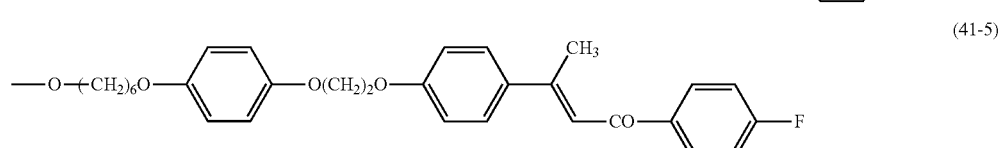

(41-5)

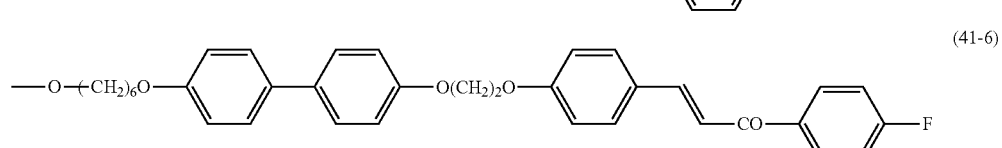

(41-6)

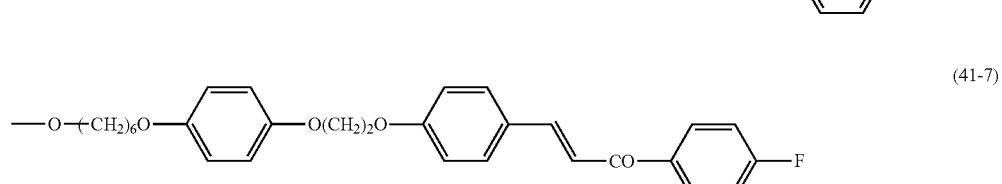

(41-7)

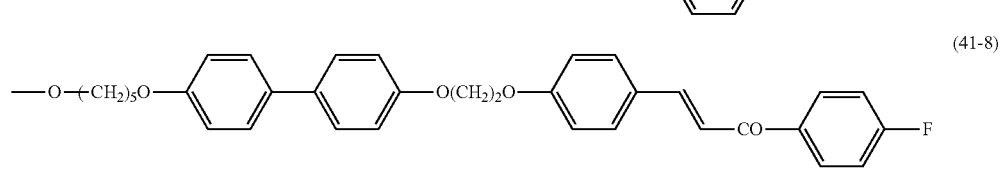

(41-8)

(41-9)
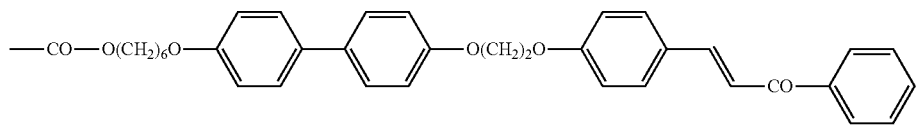
(41-10)
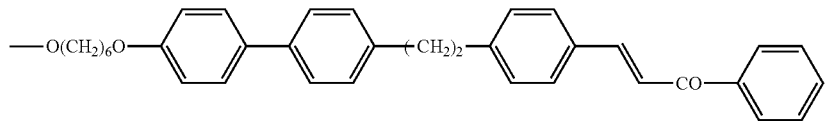
(41-11)
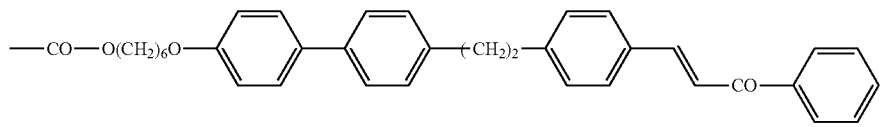
(41-12)
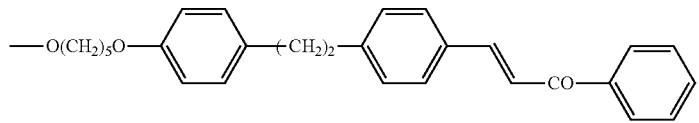
(41-13)
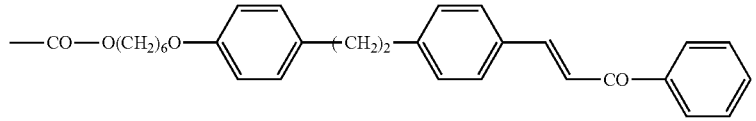
(41-14)
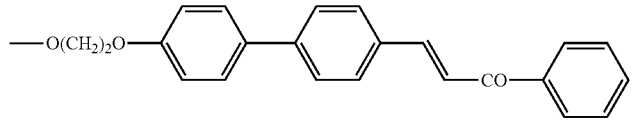
(41-15)
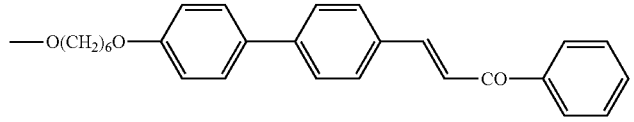
(41-16)
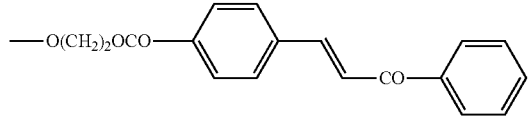
(41-17)
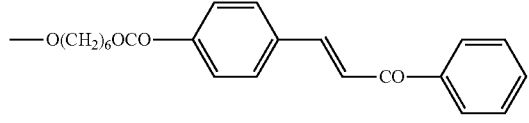
(41-18)
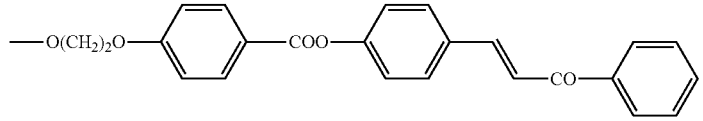
(41-19)
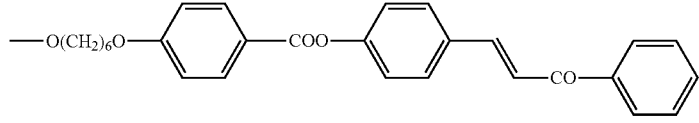
(41-20)
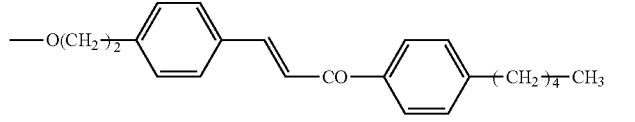

-continued
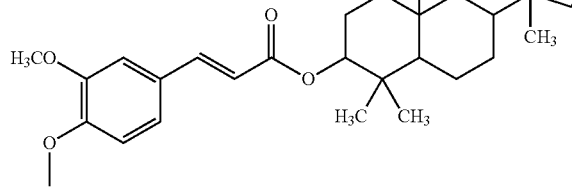
(41-21)
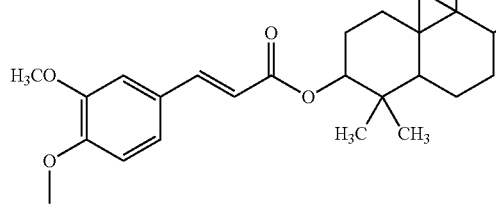
(41-22)
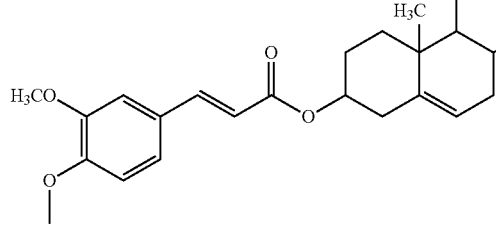
(41-23)
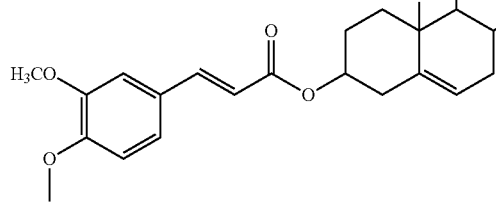
(41-24)

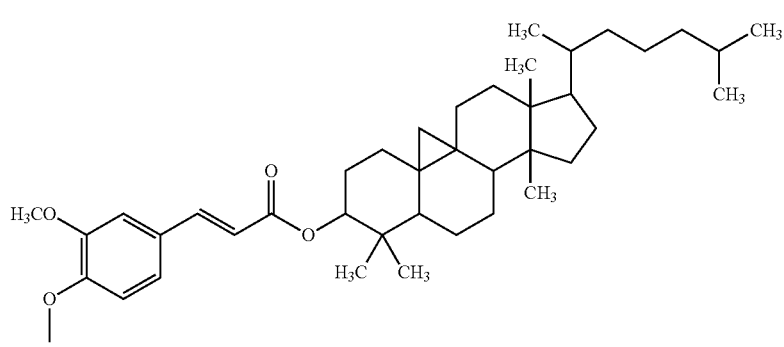

(41-25)

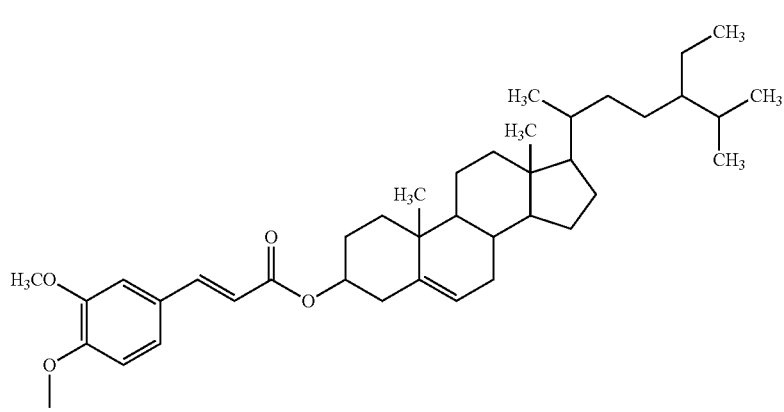

(41-26)

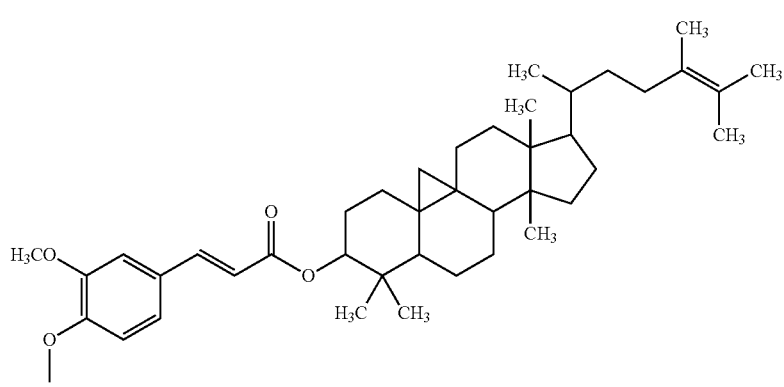

(41-27)

The pre-alignment compound, preferably, includes a structure for aligning (orienting) the liquid crystal molecules 41 etc. in a vertical direction relative to the substrate planes (hereafter, this structure will be referred to as "vertical alignment inducing structure portion"). This ensures that the alignment (orientation) of the liquid crystal molecules 41 etc. as a whole can be regulated, even if the alignment films 22 and 32 do not contain a compound having a vertical alignment inducing structure portion (so-called ordinary vertical alignment agent) separately from the post-alignment compound. Moreover, when the pre-alignment compound includes the vertical alignment inducing structure portion, the alignment films 22 and 32 capable of uniformly exhibiting an orientation-regulating function for the liquid crystal layer 40 can be formed more easily, as compared with the case where a compound having a vertical alignment inducing structure portion is contained separately from the post-alignment compound. In the pre-alignment compound, the vertical alignment inducing structure portion may be included in the main chain, or in the side chain(s), or in both the main chain and the side chain(s). In addition, in the case where the pre-alignment compound includes the polyimide structure represented in the above formula (3), preferably, the pre-alignment compound includes two kinds of structures including a structure (repeating unit) which includes a vertical alignment inducing structure portion as R2 and a structure (repeating unit) which includes a cross-linkable functional group as R2. Incidentally, when the vertical alignment inducing structure portion is contained in the pre-alignment compound, it is also contained in the post-alignment compound.

Examples of the vertical alignment inducing structure portion include alkyl groups of 10 or more carbon atoms, haloalkyl groups of 10 or more carbon atoms, alkoxy groups of 10 or more carbon atoms, haloalkoxy groups of 10 or more carbon atoms, and ring structure-containing organic groups. Specific examples of the structures including the vertical alignment inducing structure portion include structures represented by the following formulas (5-1) to (5-6).

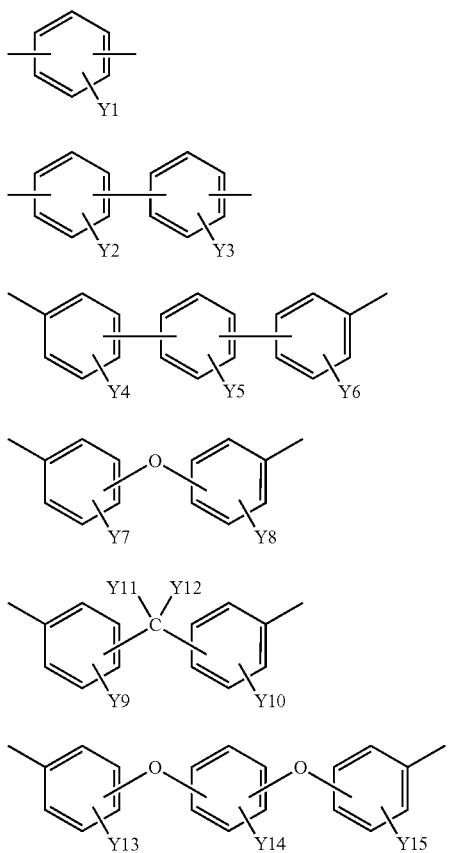

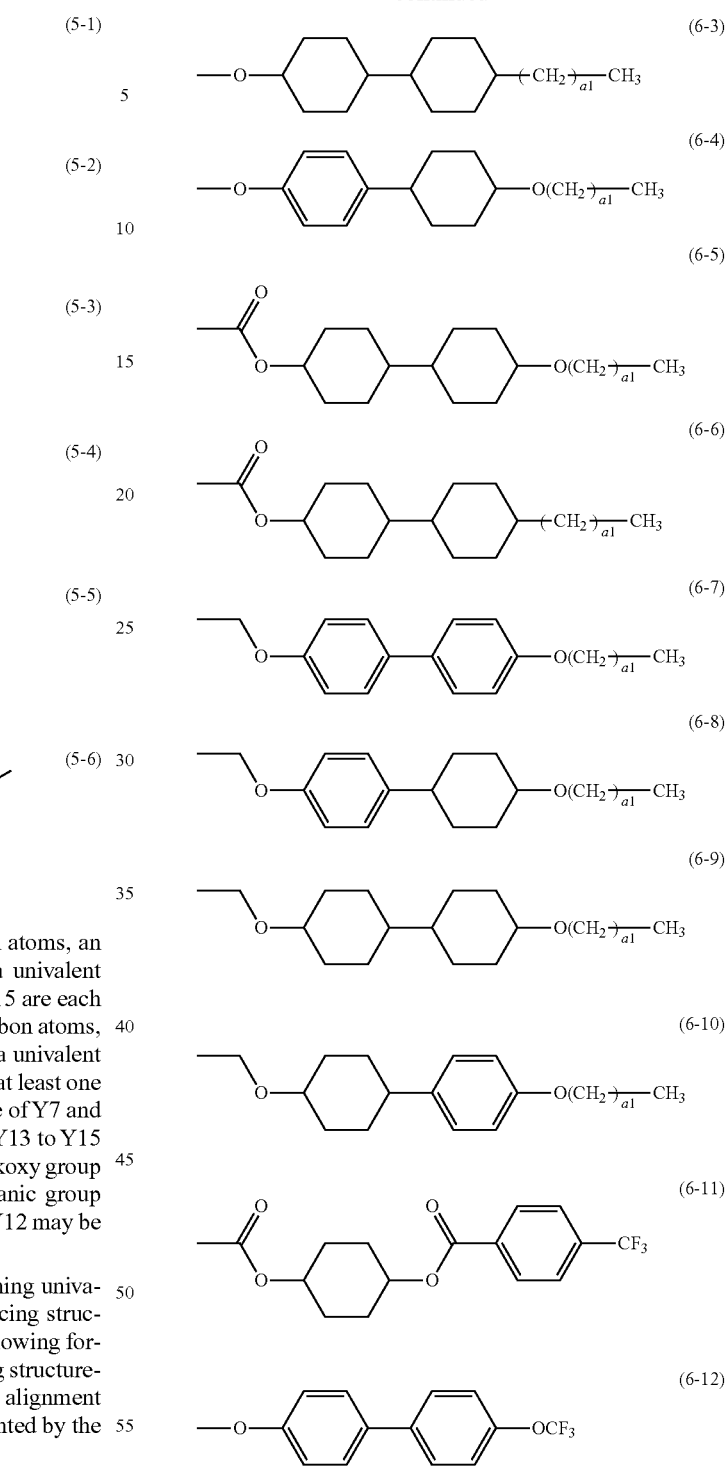

where Y1 is an alkyl group of 10 or more carbon atoms, an alkoxy group of 10 or more carbon atoms, or a univalent organic group including a ring structure; Y2 to Y15 are each a hydrogen atom, an alkyl group of 10 or more carbon atoms, an alkoxy group of 10 or more carbon atoms, or a univalent organic group including a ring structure, wherein at least one of Y2 and Y3, at least one of Y4 to Y6, at least one of Y7 and Y8, at least one of Y9 to Y12, and at least one of Y13 to Y15 is an alkyl group of 10 or more carbon atoms, an alkoxy group of 10 or more carbon atoms, or a univalent organic group including a ring structure, provided that Y11 and Y12 may be linked to each other to form a ring structure.

Besides, examples of the ring structure-containing univalent organic group as the vertical alignment inducing structure portion include groups represented by the following formulas (6-1) to (6-23). In addition, examples of ring structure-containing bivalent organic groups as the vertical alignment inducing structure portion include groups represented by the following formulas (7-1) to (7-7).

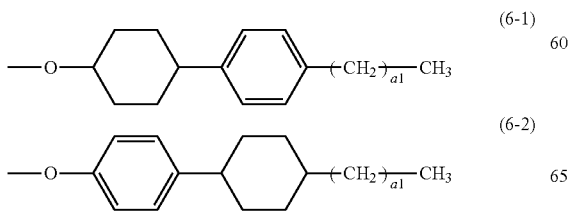

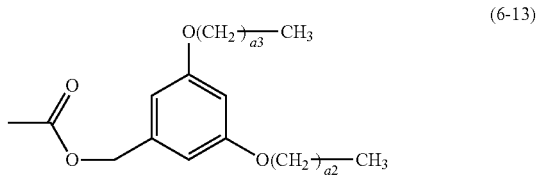

(6-14)
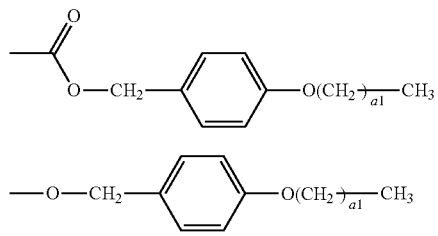
(6-16)
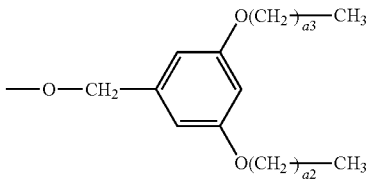
(6-15)
where a1 to a3 are each an integer of 0 to 21.
(6-17)
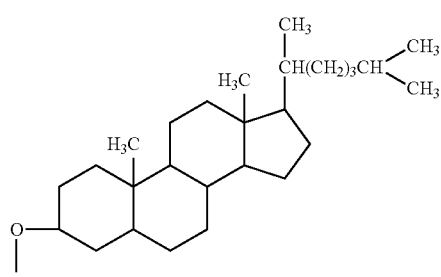
(6-18)
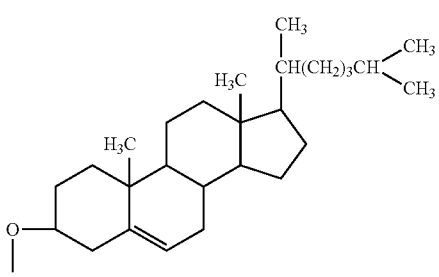
(6-19)
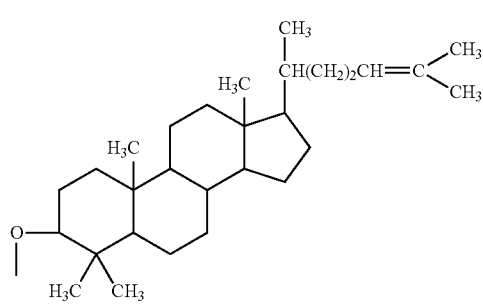
(6-20)
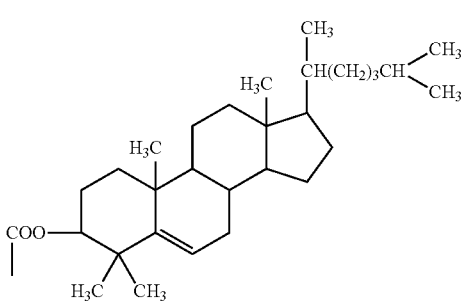
(6-21)
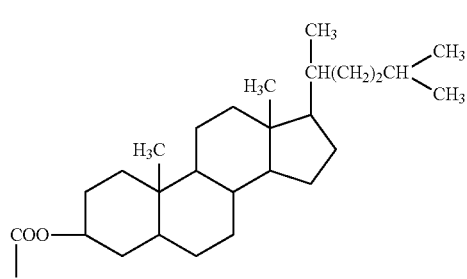
(6-22)
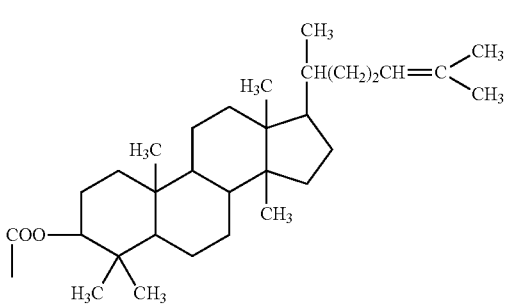
(6-23)
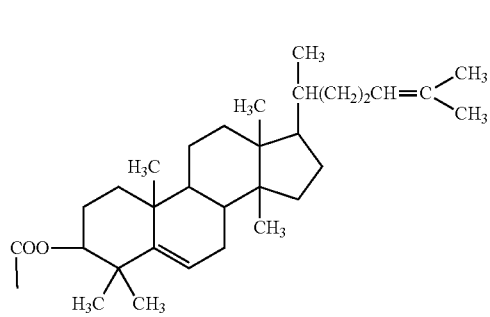
(7-1)
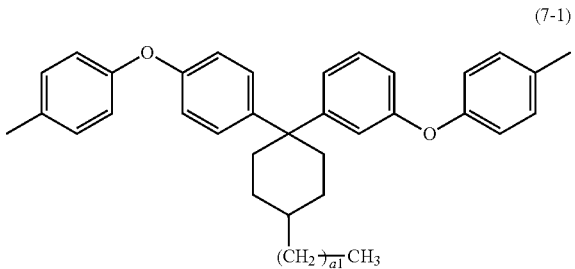

-continued
(7-2)
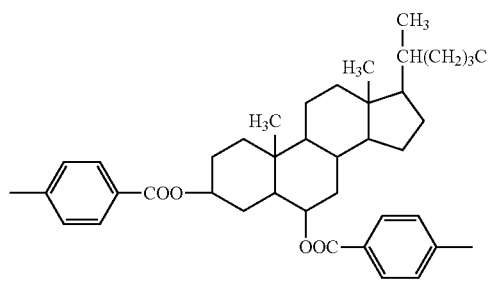
(7-3)
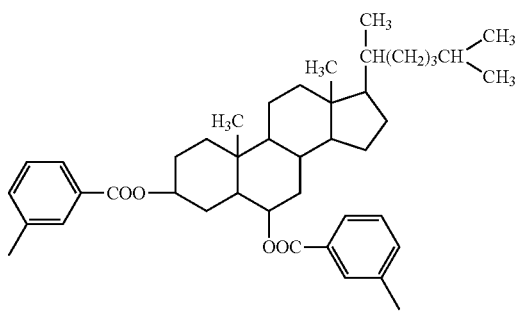
(7-4)
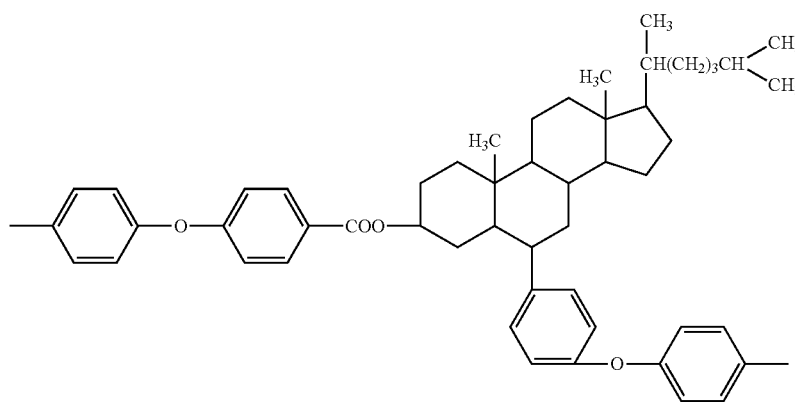
(7-5)
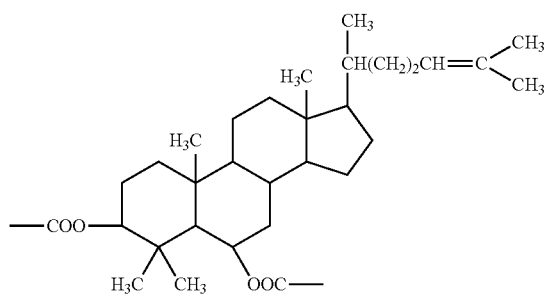
where a1 is an integer of 0 to 21.
(7-6)
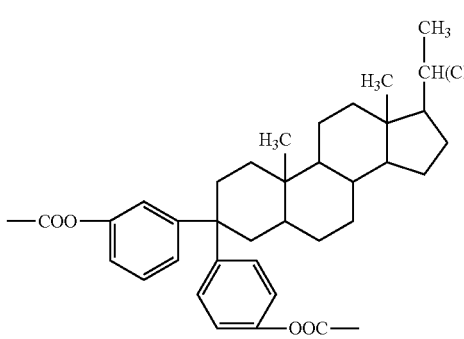
-continued
(7-7)
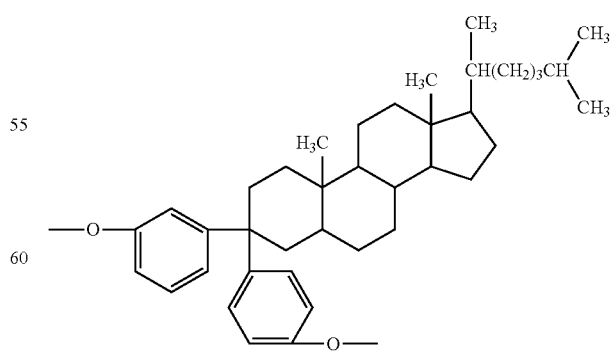
Incidentally, the vertical alignment inducing structure portion is not restricted to the above-mentioned groups, insofar as it includes a structure which functions to align (orient) the liquid crystal molecules 41 etc. in a vertical direction relative to the substrate planes.

In addition, expressing according to Configuration 1A, Configuration 2A (refer to Mode 6 described later) or Configuration 3A, the compound before the cross-linking (the pre-alignment compound) includes a compound which has a group represented by the formula (1) as a side chain, in addition to the cross-linkable functional group. The group represented by the formula (1) is able to move so as to lie along the liquid crystal molecules 41 etc. When the pre-alignment compound is cross-linked, therefore, the group represented by the formula (1) is fixed together with the cross-linkable functional group in the state of lying along the direction of orientation (alignment) of the liquid crystal molecules 41 etc. Then, the group of the formula (1) thus fixed promises easy regulation of the orientation (alignment) of the liquid crystal molecules 41 etc. into a predetermined direction, whereby a liquid crystal display element having good display characteristics can be manufactured more easily.

$$—R1-R2-R3 \quad (1)$$

Here, R1 is a straight chain or branched bivalent organic group of three or more carbon atoms, and is linked to the main chain of the polymer compound before the cross-linking (the pre-alignment compound); R2 is a bivalent organic group including a plurality of ring structures, wherein one of the atoms constituting the ring structures is linked to R1; and R3 is a hydrogen atom, a halogen atom, an alkyl group, an alkoxy group, a univalent group having a carbonate group, or a derivative thereof.

R1 in the formula (1) is a part for fixing R2 and R3 to the main chain and for functioning as a spacer portion for permitting R2 and R3 to move freely so as to lie along the liquid crystal molecules 41 etc. Examples of R1 include alkylene groups. The alkylene group here may have an ether linkage between intermediate carbon atoms thereof, and the ether linkage may be present at one location or at two or more locations. In addition, R1 may have a carbonyl group or a carbonate group. The number of carbon atoms in R1 is preferably six or more. This ensures that, owing to an interaction of the group of the formula (1) with the liquid crystal molecules 41 etc., the group of the formula (1) can lie along the liquid crystal molecules 41 etc. more easily. The number of carbon atoms, preferably, is determined so that the length of R1 will be approximately equal to the length of a terminal chain in the liquid crystal molecule 41.

R2 in the formula (1) is a part which comes to lie along the ring structure (core part) contained in a general nematic liquid crystal molecule. Examples of R2 include groups or skeletons similar to the ring structure contained in the liquid crystal molecule 41, such as 1,4-phenylene group, 1,4-cyclohexylene group, pyrimidin-2,5-diyl group, 1,6-naphthalene group, a steroid skeleton-containing bivalent group, and derivatives thereof. Here, the "derivatives" means groups obtained by introducing one or more substituent groups into the above-mentioned series of groups.

R3 in the formula (1) is a part which comes to lie along a terminal chain of the liquid crystal molecule 41. Examples of R3 include alkylene groups and haloalkylene groups. It suffices for the haloalkylene groups to have a structure in which at least one hydrogen atom of an alkylene group has been substituted by a halogen atom, the kind(s) of the halogen atom(s) being arbitrary. The alkylene group or haloalkylene group may have an ether linkage between intermediate carbon atoms thereof, and the ether linkage may be present in one location or in two or more locations. Besides, R3 may be carbonyl group or carbonate group. The number of carbon atoms in R3 is preferably six or more, for the same reason as in the case of R1.

Specific examples of the group of the above formula (1) include univalent groups represented by the following formulas (1-1) to (1-8).

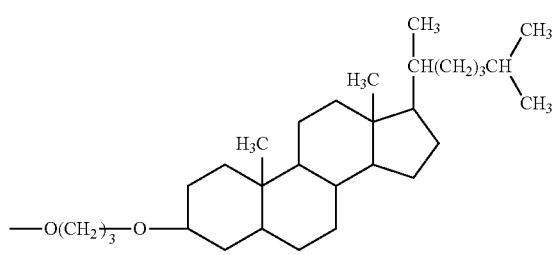

(1-1)

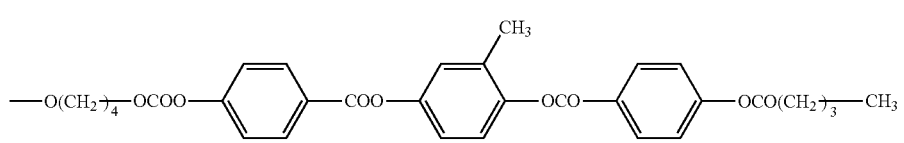

(1-2)

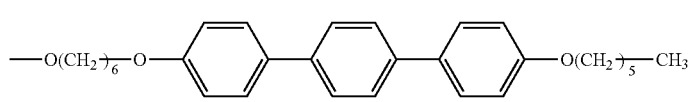

(1-3)

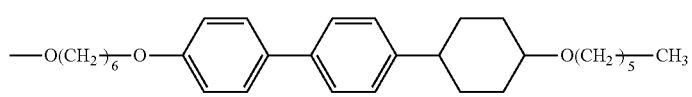

(1-4)

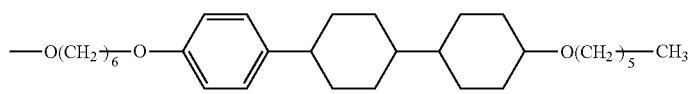

(1-5)

-continued

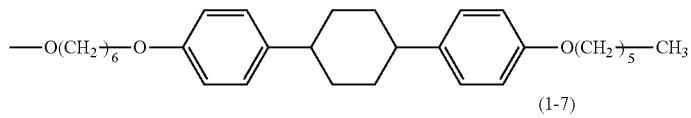
(1-6)

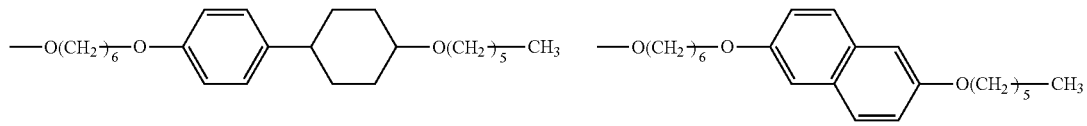
(1-7) (1-8)

Incidentally, the group represented by the formula (1) is not restricted to the above-mentioned groups, insofar as it is able to move so as to lie along the liquid crystal molecules 41 etc.

Or, expressing in accordance with Configuration 1B, Configuration 2B (refer to Mode 6 described later) or Configuration 3B of the present disclosure, the polymer compound before the cross-linking (the pre-alignment compound) includes a compound which has a group represented by the formula (2) as a side chain. This compound has a part which is able to come to lie along the liquid crystal molecules 41 etc. and a part which is able to move freely, in addition to the part for cross-linking, so that the compound can be fixed in the state where the part of the side chain capable of coming to lie along the liquid crystal molecules 41 etc. is lying along the liquid crystal molecules 41 etc. As a result, the orientation (alignment) of the liquid crystal molecules 41 etc. can be easily regulated into a predetermined direction, and, therefore, a liquid crystal display element having good display characteristics can be manufactured more easily.

  (2)

Here, R11 is a straight chain or branched bivalent organic group of 1 to 20 carbon atoms, preferably 3 to 12 carbon atoms, which may include an ether group or ester group, and which is linked to the main chain of the polymer compound or the cross-linked compound (the pre-alignment compound or the post-alignment compound). Or, alternatively, R11 is an ether group or ester group, which is linked to the main chain of the polymer compound or the cross-linked compound (the pre-alignment compound or the post-alignment compound). R12 is either a bivalent group including one type of structure selected from among chalcone, cyannamate, cyannamoyl, coumarin, maleimide, benzophenone, norbornene, oryzanol, and chitosan structures, or an ethynylene group. R13 is a bivalent organic group including a plurality of ring structures. R14 is a hydrogen atom, a halogen atom, an alkyl group, an alkoxy group, a univalent group having a carbonate group, or a derivative thereof.

R11 in the formula (2) is a part which, in the pre-alignment compound, is a part capable of moving freely and which, in the pre-alignment compound, is preferably flexible. Examples of R11 include the groups mentioned above as examples of R1 in the formula (1). In the group represented by the formula (2), the groups R12 to R14 can move easily with R11 as an axis, so that it is easy for R13 and R14 to come to lie along the liquid crystal molecules 41 etc. The number of carbon atoms in R11 is preferably 6 to 10.

R12 in the formula (2) is a part which has a cross-linkable functional group. As above-mentioned, the cross-linkable functional group may be a group which forms a cross-linked structure through a photo-reaction, or may be a group which forms a cross-linked structure through a thermal reaction. Specific examples of R12 include ethynylene group and bivalent groups including one type of structure selected from among chalcone, cyannamate, cyannamoyl, coumarin, maleimide, benzophenone, norbornene, oryzanol, and chitosan structures.

R13 in the formula (2) is a part which is capable of coming to lie along a core part of the liquid crystal molecules 41 etc. Examples of R13 include the groups mentioned above as examples of R2 in the formula (1).

R14 in the formula (2) is a part which comes to lie along a terminal chain of the liquid crystal molecules 41 etc. Examples of R14 include the groups mentioned above as examples of R3 in the formula (1).

Specific examples of the group represented by the formula (2) include univalent groups represented by the following formulas (2-1) to (2-7).

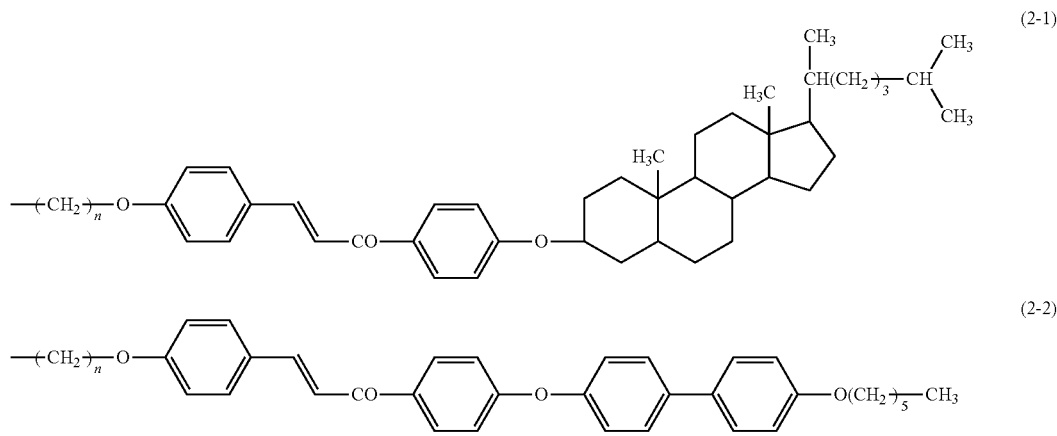
(2-1) (2-2)

-continued

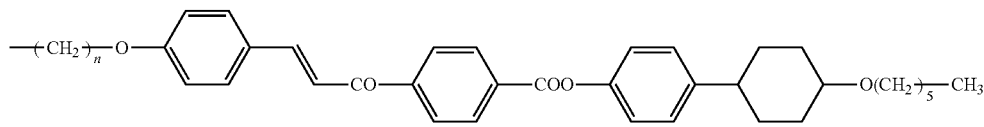
(2-3)

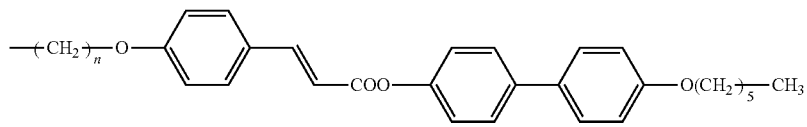
(2-4)

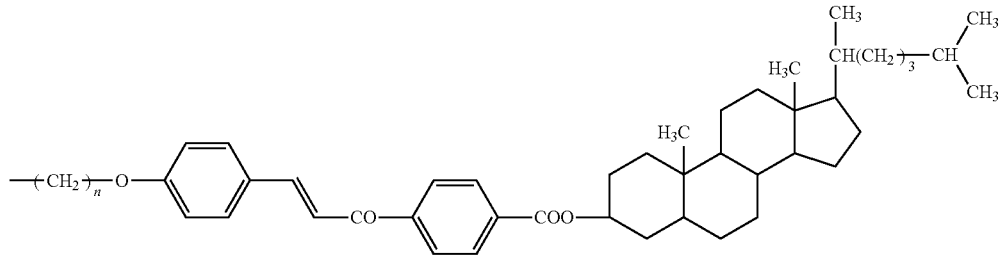
(2-5)

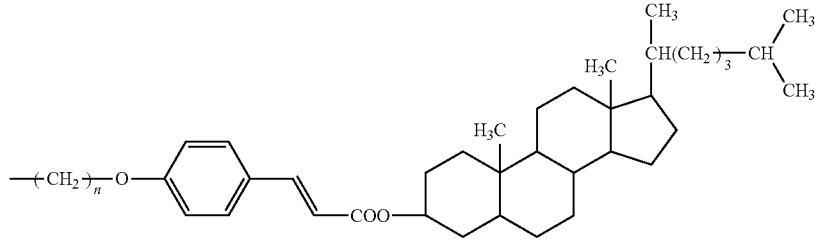
(2-6)

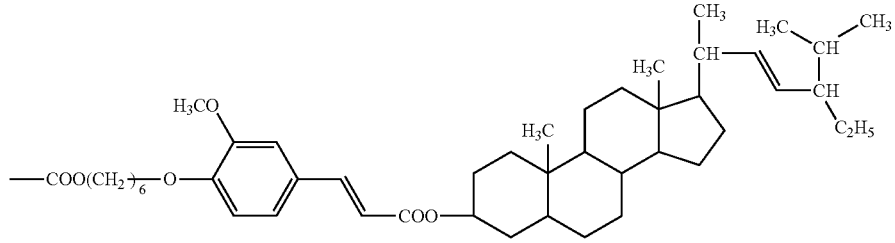
(2-7)

where n is an integer of 3 to 20.

Incidentally, the group represented by the formula (2) is not restricted to the above-mentioned groups, insofar as it has the above-described four parts (R11 to R14).

Or, expressing in accordance with Configuration 1C of the present disclosure, the cross-linked compound (post-alignment compound) obtained by cross-linking the polymer compound (pre-alignment compound) includes a side chain, and a main chain supporting the side chain on the substrate; the side chain includes a cross-linked portion which is linked to the main chain and in which the side chain is partly cross-linked, and a terminal structure portion linked to the cross-linked portion; and the liquid crystal molecules 41 etc. are given a pre-tilt by being set along the terminal structure portion or being clamped by the terminal structure portion. In addition, expressing in accordance with Configuration 2C (refer to Mode 6 described later) of the present disclosure, the deformed compound (post-alignment compound) obtained by deforming the polymer compound (pre-alignment compound) includes a side chain, and a main chain supporting the side chain on the substrate; the side chain includes a deformed portion which is linked to the main chain and in which the side chain is partly deformed, and a terminal structure portion linked to the deformed portion; and the liquid crystal molecules 41 etc. are given a pre-tilt by being set along the terminal structure portion or being clamped by the terminal structure portion. Besides, expressing in accordance with Configuration 3C of the present disclosure, the compound obtained by irradiating the polymer compound with energy rays includes a side chain, and a main chain supporting the side chain on the substrate; the side chain includes a cross-linked/deformed portion which is linked to the main chain and in which the side chain is partly cross-linked or deformed, and a terminal structure portion linked to the cross-linked/deformed portion; and the liquid crystal molecules 41 etc. are given a pre-tilt by being set along the terminal structure portion or being clamped by the terminal structure portion.

Figure 13:
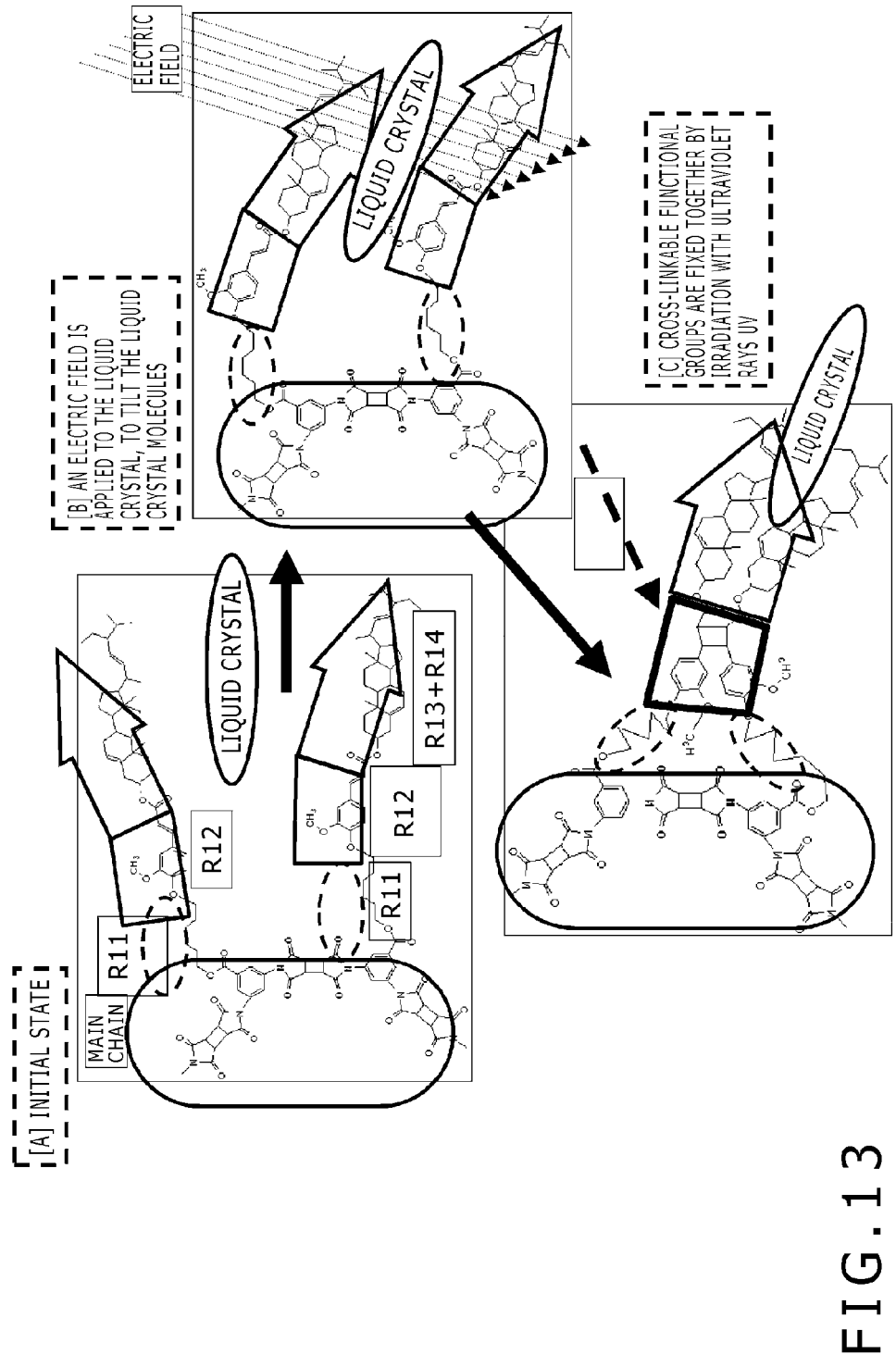
FIG. 13 is a conceptual illustration of the relationship between a cross-linked polymer compound and a liquid crystal molecule.

Here, in Configuration 1C of the present disclosure, the cross-linked portion where the side chain is partly cross-linked is in correspondence with R12 (in the state after cross-linking) in the formula (2). In addition, the terminal structure portion is in correspondence with R13 and R14 in the formula (2). Here, in the post-alignment compound, for example, two side chains extending from the main chain are mutually cross-linked, then a condition as if a part of the liquid crystal molecules 41 etc. where clamped between the terminal structure portion extending from the cross-linked portion on one side and the terminal structure portion extending from the cross-linked portion on the other side, and, moreover, the terminal structure portions are fixed in the state of being set at a predetermined angle relative to the substrate, so that the liquid crystal molecules 41 etc. are given a pre-tilt. Such a state is shown in the conceptual illustration in FIG. 13.

Or, expressing in accordance with Configuration 1D of the present disclosure, the cross-linked compound (post-alignment compound) obtained by cross-linking the polymer compound (pre-alignment compound) includes a side chain, and a main chain supporting the side chain on the substrate; and the side chain includes a cross-linked portion which is linked to the main chain and in which the side chain is partly cross-linked, and a terminal structure portion which is linked to the cross-linked portion and has a mesogenic group. Here, the side chain may have a photo-dimerizable photo-sensitive group. In addition, a mode may be adopted wherein the main chain and the cross-linked portion are linked to each other through a covalent bond, and the cross-linked portion and the terminal structure portion are linked to each other through a covalent bond. Besides, expressing in accordance with Configuration 2D (refer to Mode 6 described later) of the present disclosure, the deformed compound (post-alignment compound) obtained by deforming the polymer compound (pre-alignment compound) includes a side chain, and a main chain supporting the side chain on the substrate; and the side chain includes a deformed portion which is linked to the main chain and in which the side chain is partly deformed, and a terminal structure portion which is linked to the deformed portion and has a mesogenic group. Furthermore, expressing in accordance with Configuration 3D of the present disclosure, the compound (post-alignment compound) obtained by irradiating the polymer compound (pre-alignment compound) with energy rays includes a side chain, and a main chain supporting the side chain on the substrate; and the side chain includes a cross-linked/deformed portion which is linked to the main chain and in which the side chain is partly cross-linked or deformed, and a terminal structure portion which is linked to the cross-linked/deformed portion and has a mesogenic group.

Here, in Configuration 1D of the present disclosure, as above-mentioned, examples of the photo-dimerizable photo-sensitive group as the cross-linkable functional group (photo-sensitive functional group) include groups which include one type of structure selected from among chalcone, cyannamate, cyannamoyl, coumarin, maleimide, benzophenone, norbornene, oryzanol, and chitosan structures. In addition, the mesogenic group (which is stiff) constituting the terminal structure portion may or may not exhibit liquid crystallinity as a side chain. Specific structure examples of the mesogenic group include steroid derivatives, cholesterol derivatives, biphenyl, triphenyl, and naphthalene. Furthermore, examples of the terminal structure portion include R13 and R14 in the formula (2).

Or, expressing in accordance with Configuration 1E, Configuration 2E (refer to Mode 6 described later) or Configuration 3E of the present disclosure, the first alignment film (or the alignment film having the post-alignment compound) has a surface roughness Ra of not more than 1 nm.

The post-alignment compound may contain unreacted cross-linkable functional groups. However, the unreacted cross-linkable functional groups may disturb the orientation (alignment) of the liquid crystal molecules 41 etc. when they react during the driving. Therefore, it is preferable for the post-alignment compound to contain few unreacted cross-linkable functional groups. Whether or not the post-alignment compound contains unreacted cross-linkable functional groups can be examined, for example, by disassembling the liquid crystal display and analyzing the alignment films 22 and 32 by a transmission-type or reflection-type FT-IR (Fourier transform infrared spectrophotometer). Specifically, first, the liquid crystal display is disassembled, and the surfaces of the alignment films 22 and 32 are cleaned with an organic solvent or the like. Thereafter, the alignment films 22 and 32 are analyzed by FT-IR. In this case, for example, when the double bonds for forming the cross-linked structure shown in the formula (41) are remaining in the alignment films 22 and 32, an absorption spectrum arising from the double bonds is obtained. In this manner, the intended examination can be achieved.

Besides, the alignment films 22 and 32 may contain other vertical alignment agent, in addition to the above-mentioned post-alignment compound. Examples of the other vertical alignment agent include polyimides which have a vertical alignment inducing structure portion, and polysiloxanes which have a vertical alignment inducing structure portion.

The liquid crystal layer 40 contains the liquid crystal molecules 41 having a negative dielectric anisotropy. The liquid crystal molecule 41, for example, has a shape of rotational symmetry, with mutually orthogonal major and minor axes as center axes of symmetry, and has a negative dielectric anisotropy.

Figure 2:
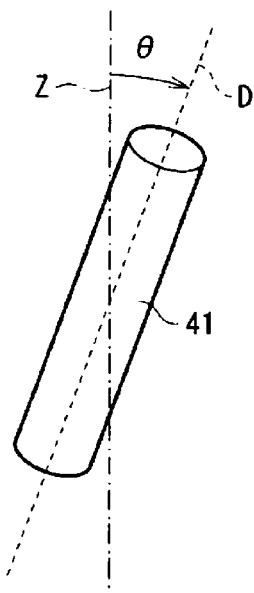
FIG. 2 is a schematic view for illustrating the pre-tilt of a liquid crystal molecule.

The liquid crystal molecules 41 can be classified into liquid crystal molecules 41A held by the alignment film 22 in the vicinity of the interface between the liquid crystal layer 40 and the alignment film 22, liquid crystal molecules 41B held by the alignment film 32 in the vicinity of the interface between the liquid crystal layer 40 and the alignment film 32, and other liquid crystal molecules 41C. The liquid crystal molecules 41C are located in an intermediate region in the thickness direction of the liquid crystal layer 40, and are so arranged that the major axis direction (dillector) of the liquid crystal molecules 41C becomes substantially vertical to the glass substrates 20A and 30A in the condition where the driving voltage is OFF. Here, with the driving voltage turned ON, the liquid crystal molecules 41C are oriented (aligned) inclinedly so that the director of the liquid crystal molecules 41C becomes parallel to the glass substrates 20A and 30A. This behavior arises from the fact that the liquid crystal molecules 41C have a property such that the dielectric constant in the major axis direction thereof is smaller than the dielectric constant in the minor axis direction thereof. Since the liquid crystal molecules 41A and 41B have the same property as the liquid crystal molecules 41C, the liquid crystal molecules 41A and 41B basically show the same behavior as the liquid crystal molecules 41C according to change in the condition where the driving voltage is ON/OFF. It is to be noted here, however, that in the condition where the driving voltage is OFF, the liquid crystal molecules 41A have been given a pre-tilt $\theta 1$ by the alignment film 22, so that their dielector is inclined from the direction normal to the glass substrates 20A and 30A. Similarly, the liquid crystal molecules 41B have been given a pre-tilt $\theta 2$ by the alignment film 32, so that their director is inclined from the direction normal to the glass substrates 20A and 30A. Incidentally, the expression "held" here means that the alignment films 22 and 32 and the liquid crystal molecules 41A and 41C are not firmly attached to each other, but the orientation (alignment) of the liquid crystal molecules 41 is regulated by the alignment films 22 and 32. In addition, as illustrated in FIG. 2, "the pre-tilt $\theta$ ($\theta 1$, $\theta 2$)" refers to the inclination angle of the director D of the liquid crystal molecules 41 (41A, 41B) relative to the Z-direction, which is the direction (normal direction) perpendicular to the surfaces of the glass substrates 20A and 30A, in the condition where the driving voltage is OFF. The molecules having the spacer show a behavior similar to that of the liquid crystal molecules 41.

In the liquid crystal layer 40, both the pre-tilts θ1 and θ2 have values greater than 0°. In this liquid crystal layer 40, the pre-tilts θ1 and θ2 may be equal (θ1=θ2) or may be different (θ1≠θ2); preferably, however, the pre-tilts θ1 and θ2 are different. This ensures that the speed of response to the application of the driving voltage is enhanced as compared with the case where both the pre-tilts θ1 and θ2 are 0°, and that it is possible to obtain a contrast comparable to the contrast obtained in the case where both the pre-tilts θ1 and θ2 are 0°. Therefore, while realizing an enhanced response characteristic, the amount of light transmitted in black display can be reduced, and contrast can be enhanced. In the case where the pre-tilts θ1 and θ2 are different angles, the greater pre-tilt θ of the pre-tilts θ1 and θ2 is desirably in the range of 1° to 4°. With the greater pre-tilt θ set in this range, a particularly high effect can be obtained.

Figure 6:
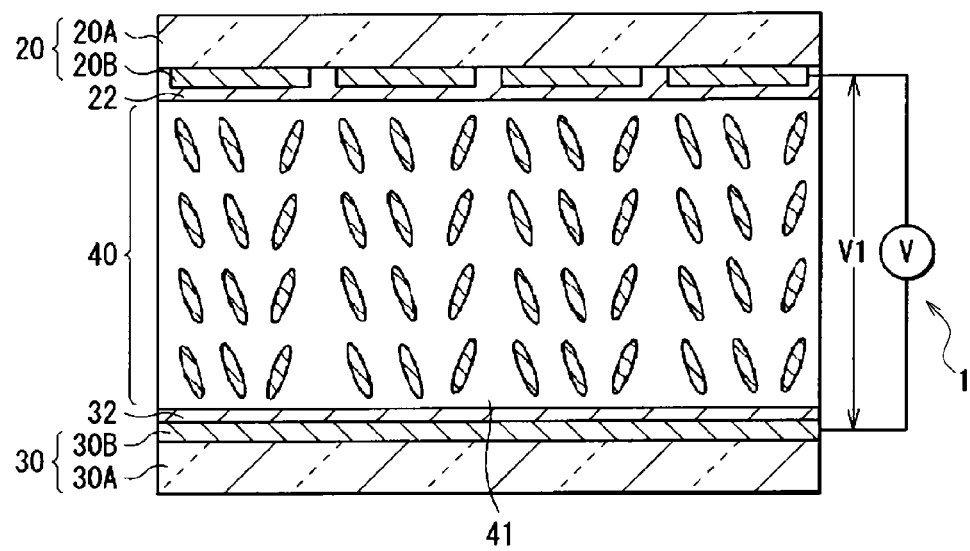
FIG. 6 is a schematic partial sectional view of the substrates, etc. for illustrating a step subsequent to FIG. 5.
Figure 7A:
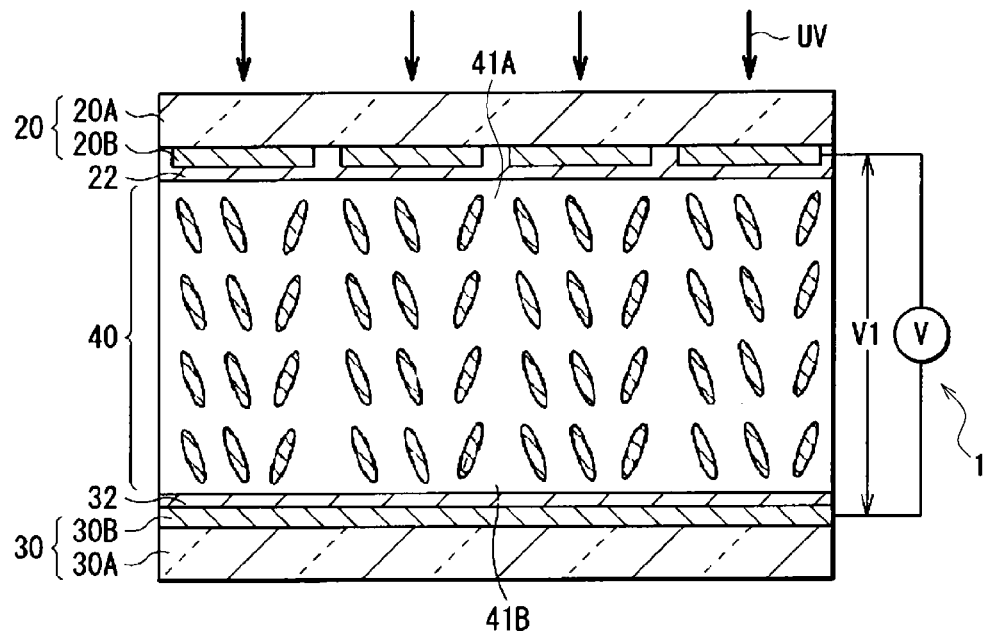
FIG. 7A is a schematic partial sectional view of the substrates, etc. for illustrating a step subsequent to FIG. 6.

Now, a method of manufacturing the above-described liquid crystal display (liquid crystal display element) will be described below, referring to a schematic illustration of the state in the alignment films 22 and 32 shown in FIG. 4, and schematic partial sectional views of the liquid crystal display etc. shown in FIGS. 5, 6 and 7A, together with a flow chart shown in FIG. 3. Incidentally, for simplification, only a part corresponding to one pixel is shown in FIGS. 5, 6 and 7A.

First, an alignment film 22 is formed on a surface of a TFT substrate 20, and an alignment film 32 is formed on a surface of a CF substrate 30 (Step S101).

Specifically, first, pixel electrodes 20B having predetermined slit portions 21 are provided, for example in a matrix pattern, on a surface of a glass substrate 20A, to produce the TFT substrate 20. In addition, a counter electrode 30B is provided on a color filter of a glass substrate 30A formed with the color filter, to produce the CF substrate 30.

On the other hand, for example, a pre-alignment compound or a precursor of a polymer compound as the pre-alignment compound, a solvent and, optionally, a vertical alignment agent are mixed together, to prepare a liquid alignment film material.

Examples of the precursor of the polymer compound as the pre-alignment compound, in the case where for example the polymer compound having a cross-linkable functional group as a side chain includes the polyimide structure represented by the formula (3), include a polyamic acid having a cross-linkable functional group. The polyamic acid as the polymer compound precursor is synthesized, for example, by reacting a diamine compound with a tetracarboxylic acid dianhydride. At least one of the diamine compound and the tetracarboxylic acid dianhydride to be used here has the cross-linkable functional group. Examples of the diamine compound include compounds having a cross-linkable functional group which are represented by the following formulas (A-1) to (A-15). Examples of the tetracarboxylic acid dianhydride include compounds having a cross-linkable functional group represented by the following formulas (a-1) to (a-10). Incidentally, the compounds represented by the formulas (A-9) to (A-15) are compounds which constitute the cross-linked portion and the terminal structure portion of the cross-linked polymer compound in Configuration 1C of the present disclosure. Or, examples of the compound for constituting the cross-linked portion and the terminal structure portion of the cross-linked polymer compound in Configuration 1C of the present disclosure include compounds represented by the following formulas (F-1) to (F-18). In relation to the compounds represented by the formulas (F-1) to (F-18), it is considered that the liquid crystal molecules are given a pre-tilt by being set along the terminal structure portion of each of the compounds represented by the formulas (F-1) to (F-3), the formulas (F-7) to (F-9) and the formulas (F-13) to (F-15). On the other hand, it is considered that the liquid crystal molecules are given a pre-tilt by being clamped by the terminal structure portion of each of the compounds represented by the formulas (F-4) to (F-6), the formulas (F-10) to (F-12) and the formulas (F-16) to (F-18).

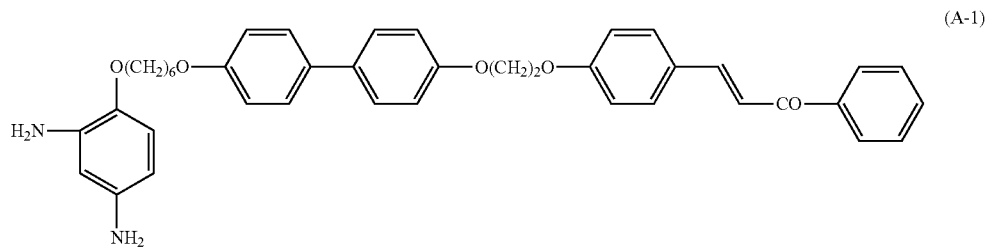

(A-1)

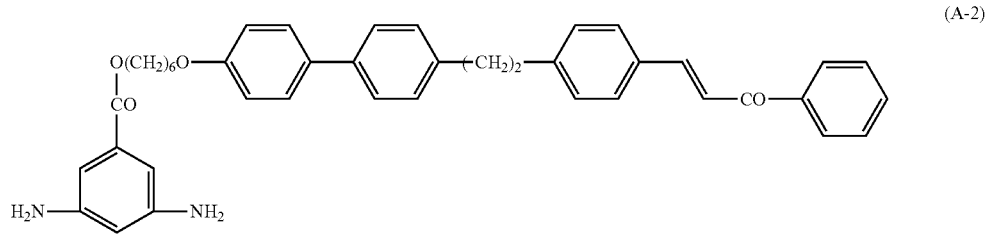

(A-2)

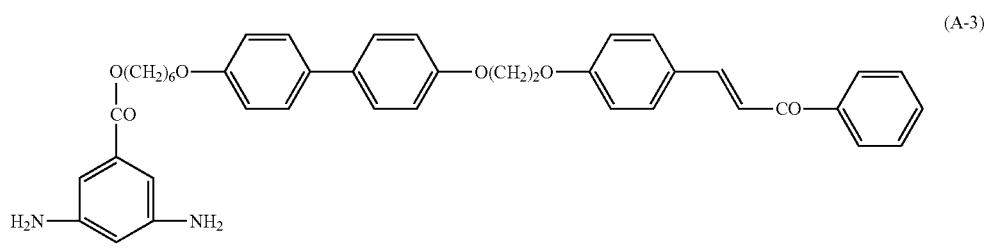
(A-3)
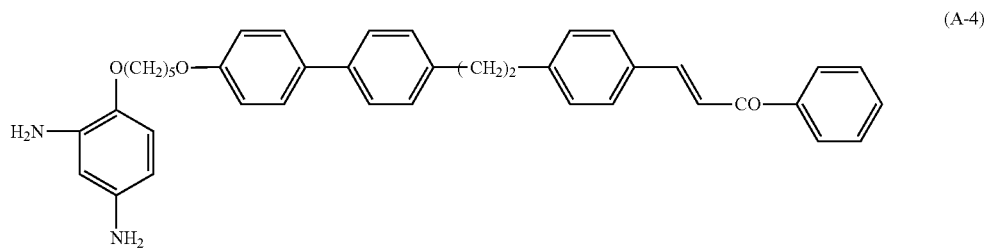
(A-4)
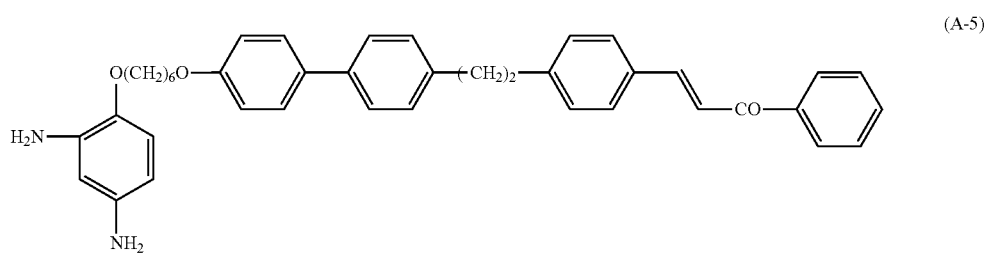
(A-5)
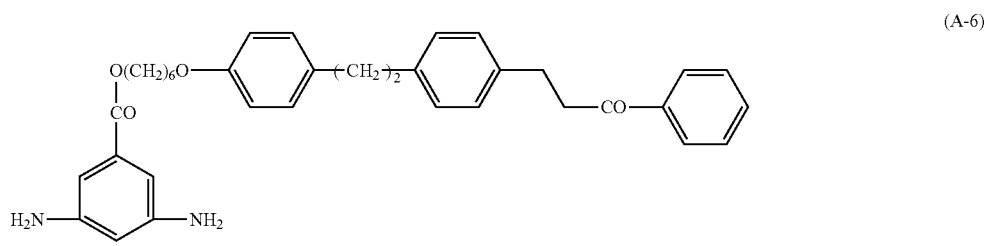
(A-6)
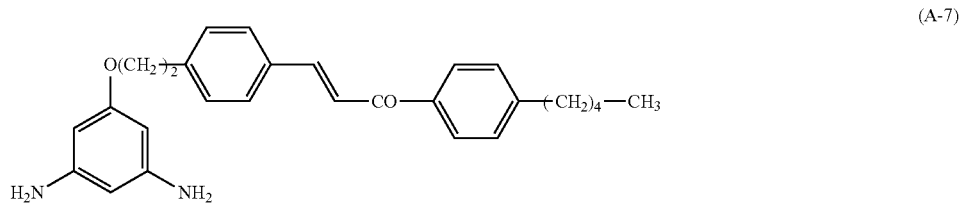
(A-7)
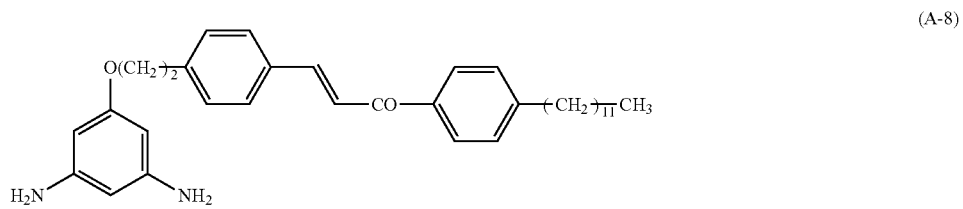
(A-8)

-continued
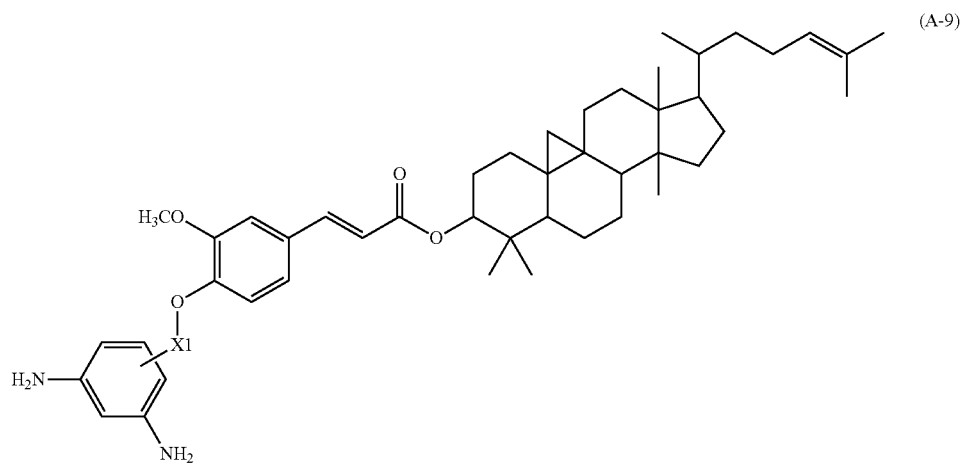
(A-9)
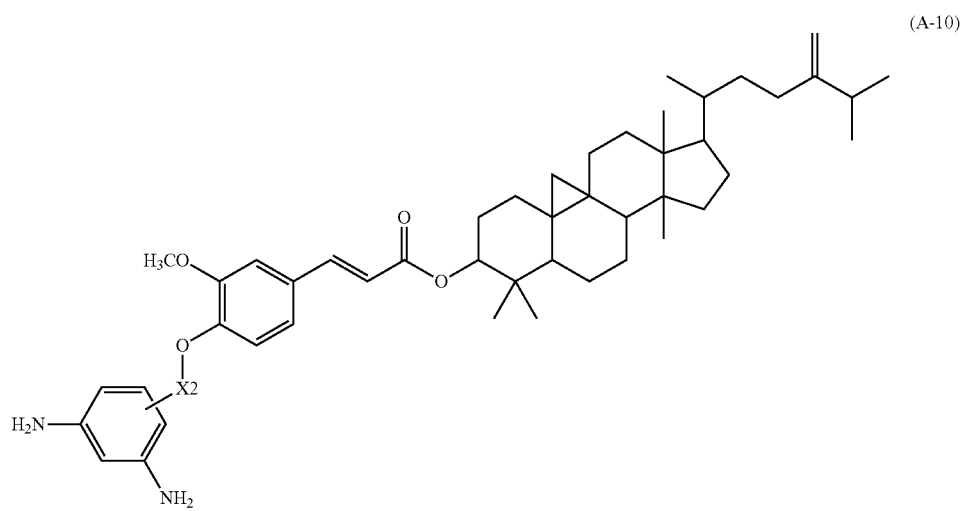
(A-10)
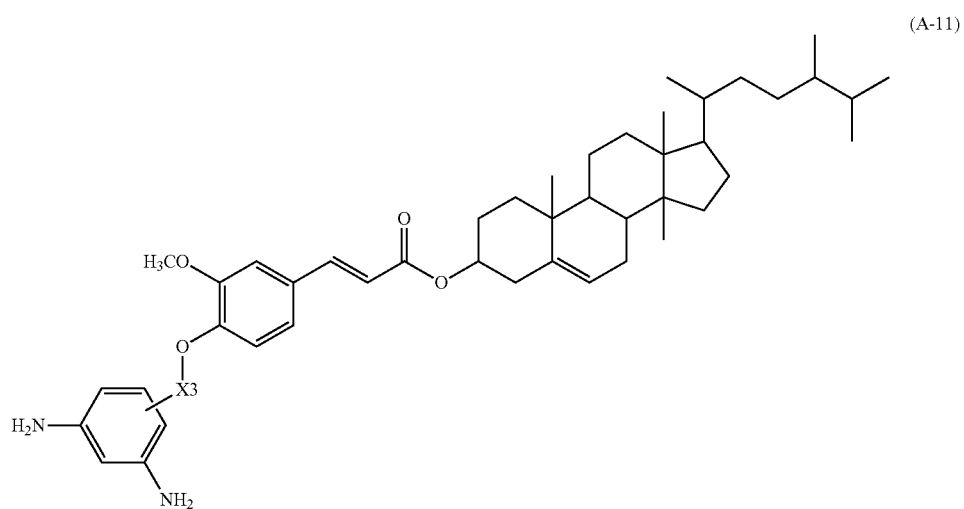
(A-11)

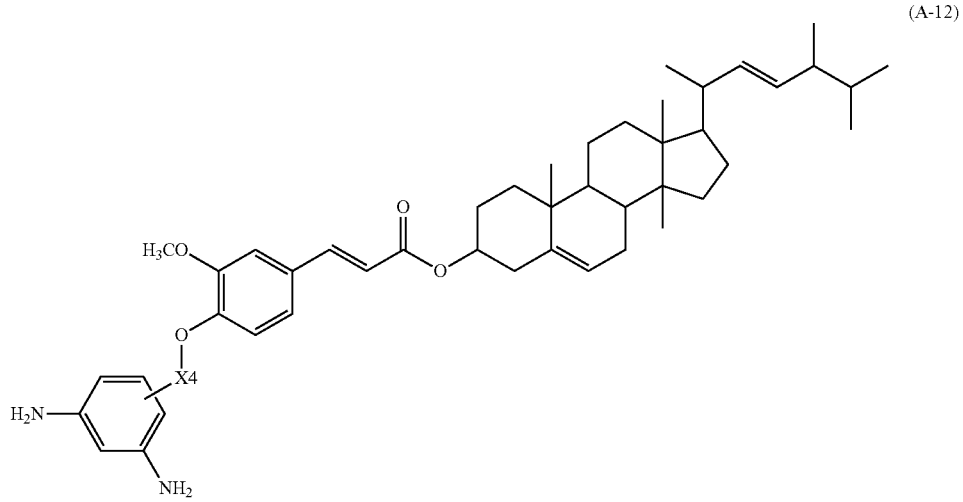
(A-12)
where X1 to X4 are each a single bond or a bivalent organic group.
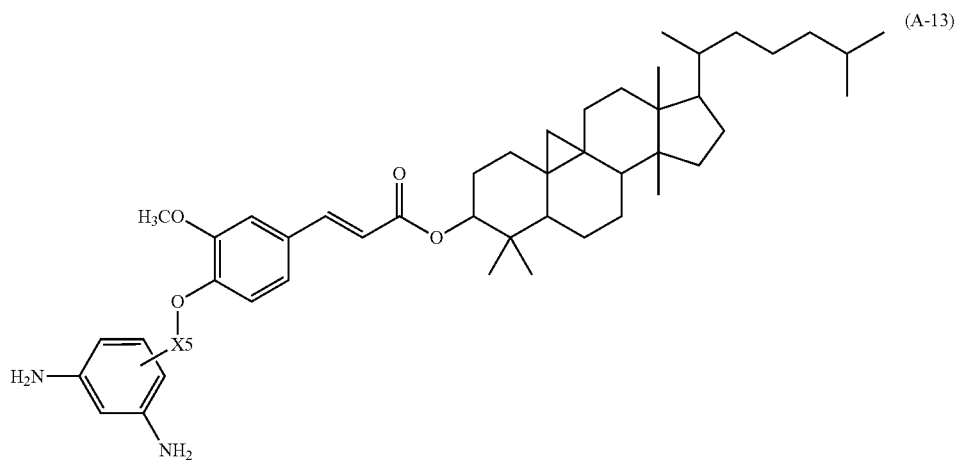
(A-13)
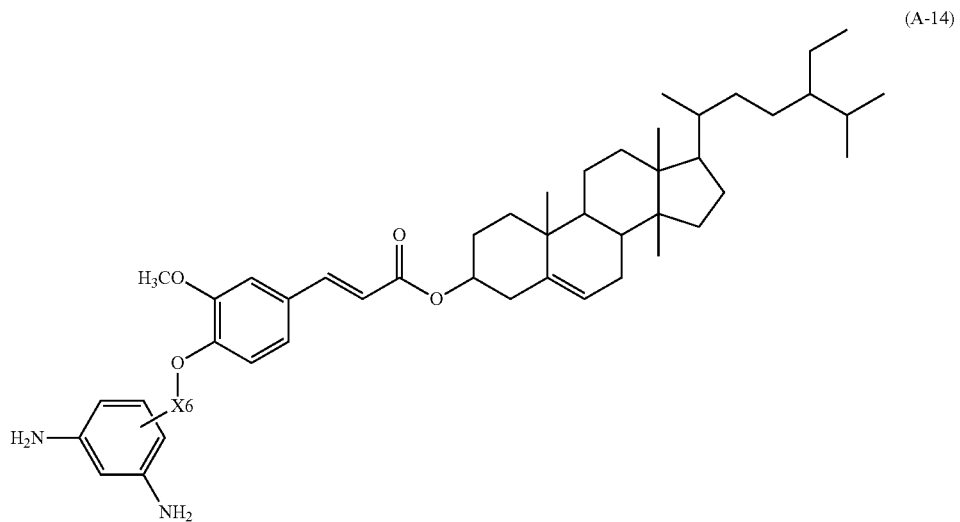
(A-14)

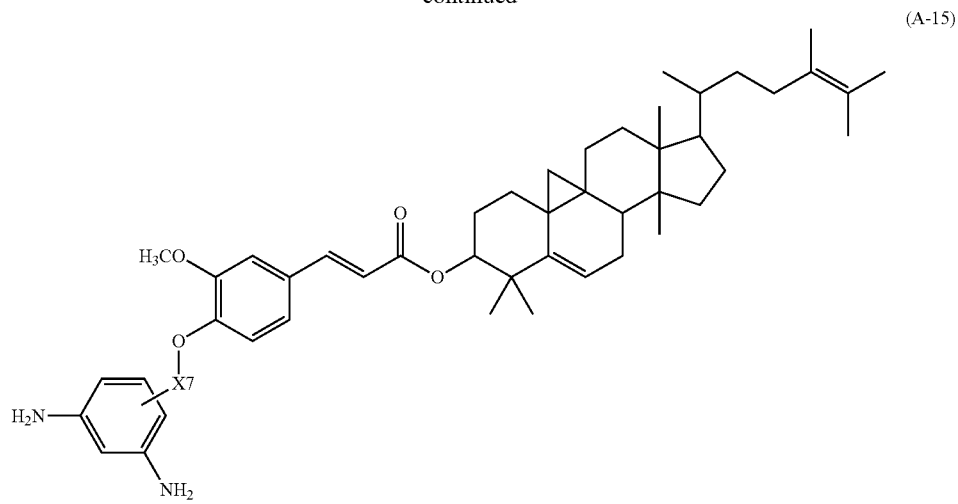
(A-15)
where X5 to X7 are each a single bond or a bivalent organic group.
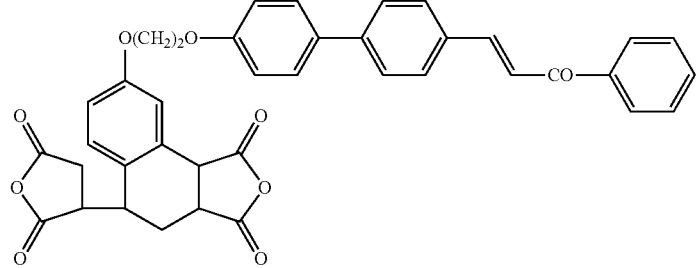
(a-1)
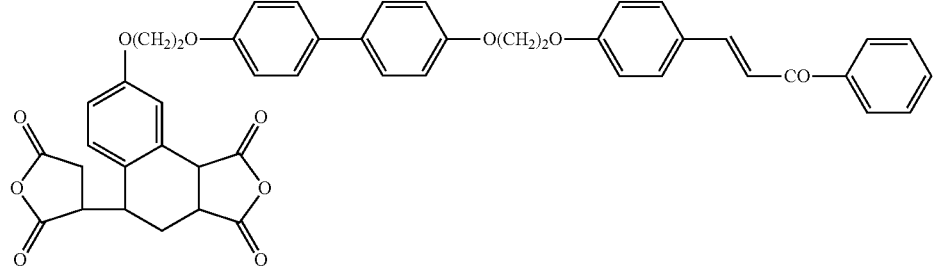
(a-2)
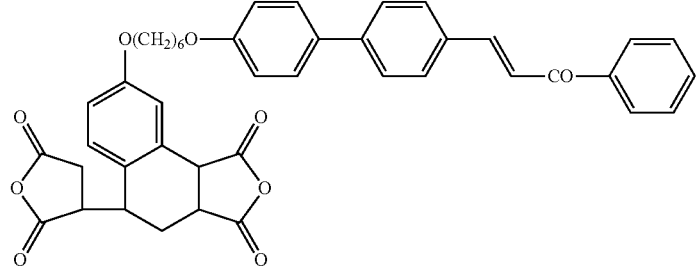
(a-3)

-continued
(a-4)
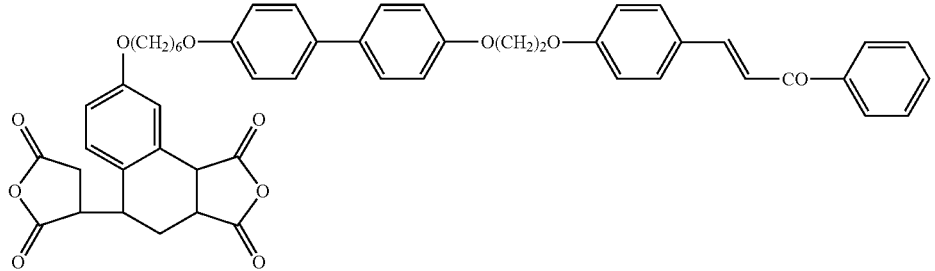
(a-5)
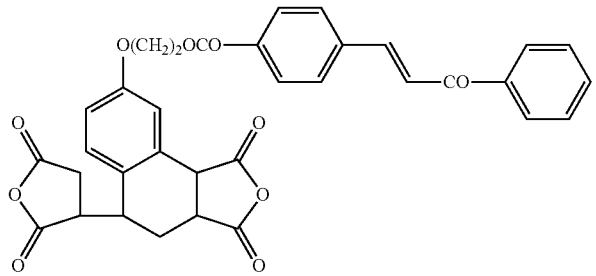
(a-6)
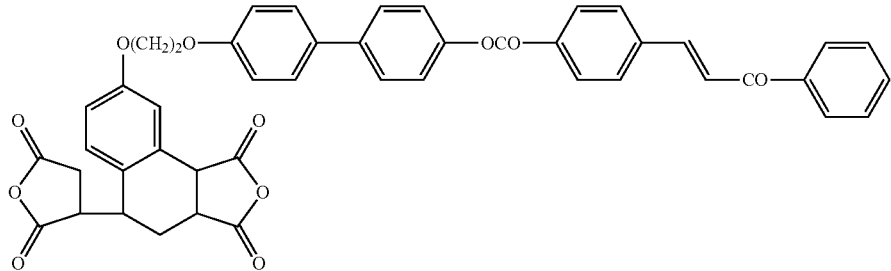
(a-7)
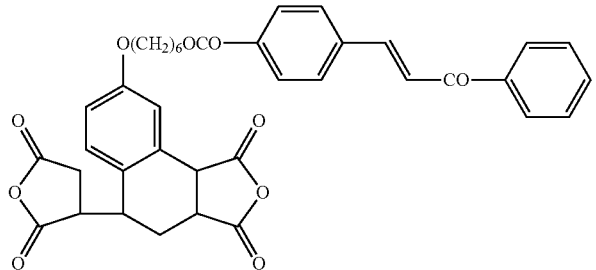
(a-8)
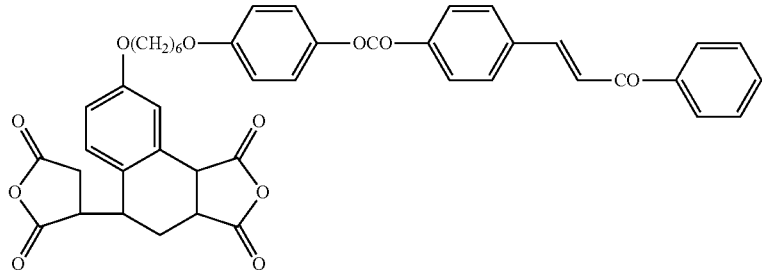

-continued
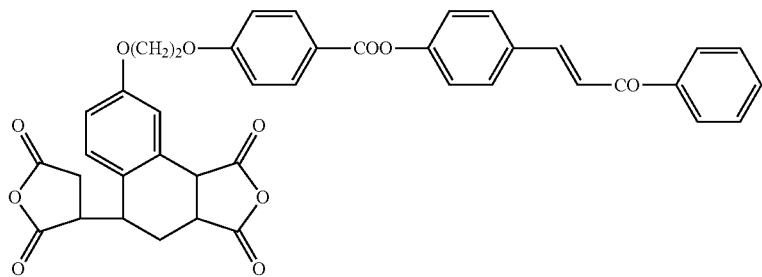
(a-9)
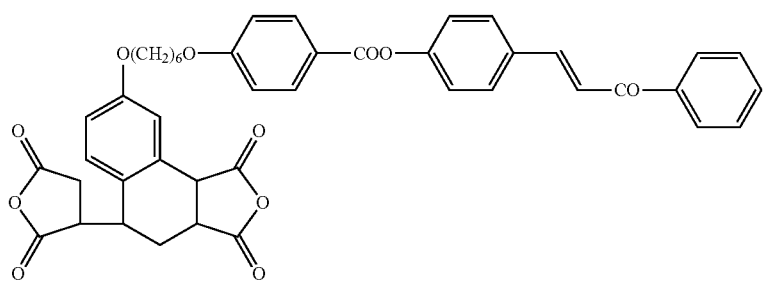
(a-10)
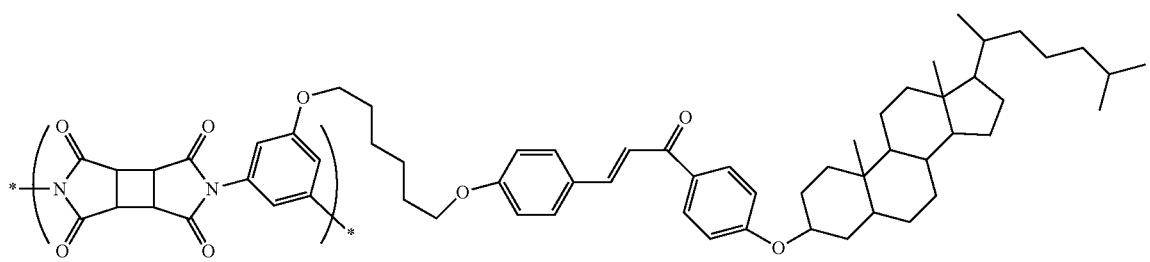
(F-1)
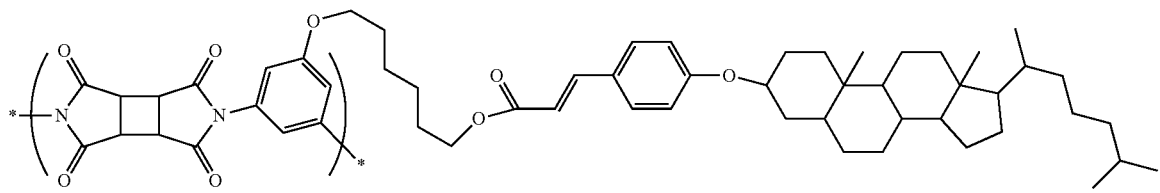
(F-2)
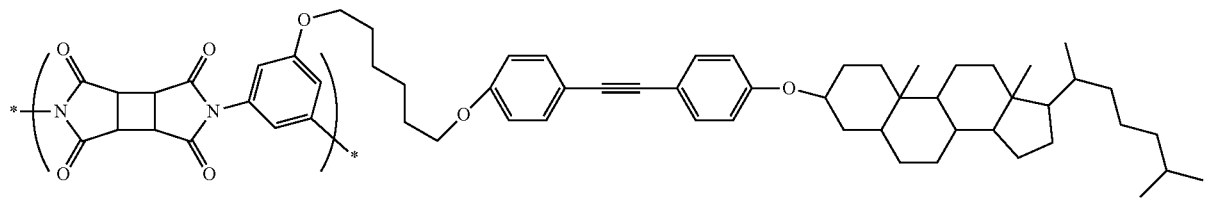
(F-3)
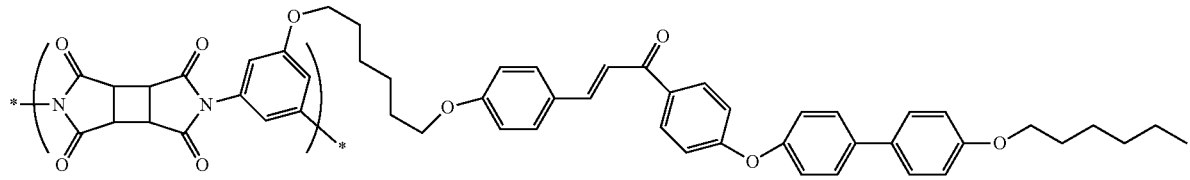
(F-4)

(F-5)
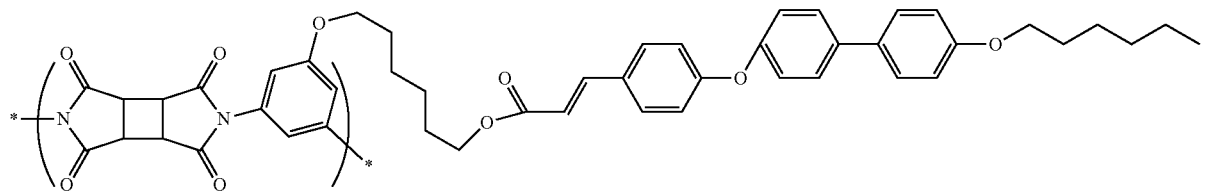
(F-6)
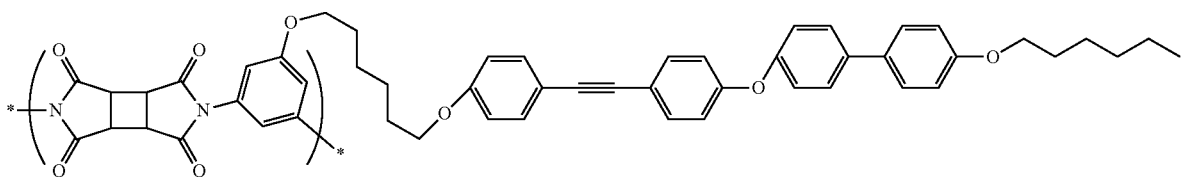
(F-7)
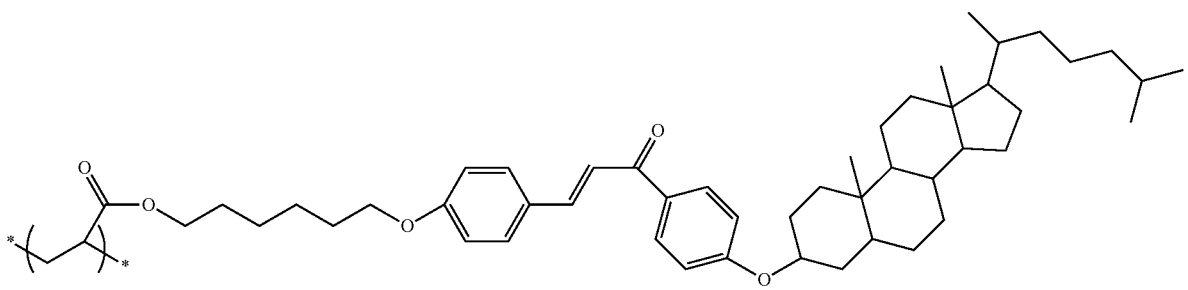
(F-8)
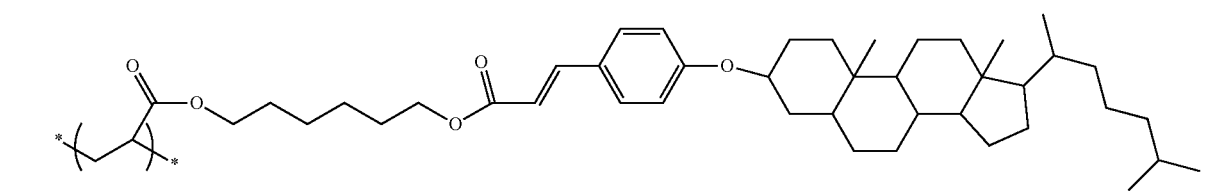
(F-9)
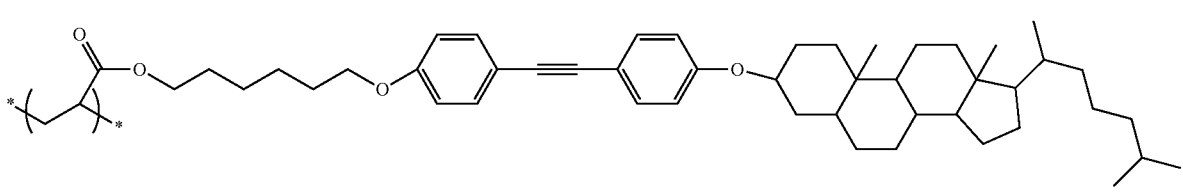
(F-10)
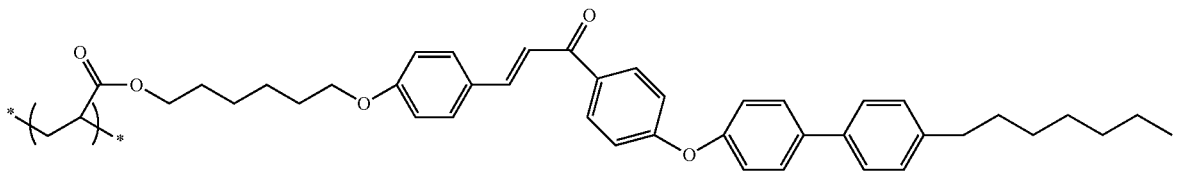
(F-11)
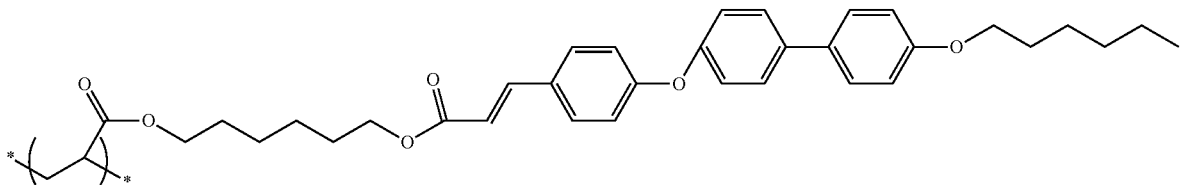

-continued
(F-12)
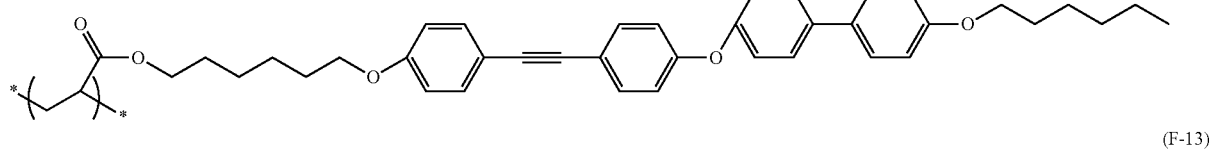
(F-13)
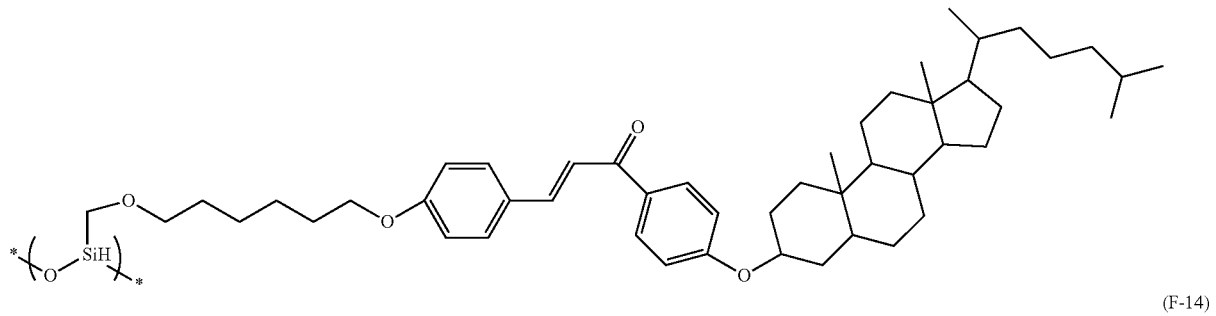
(F-14)
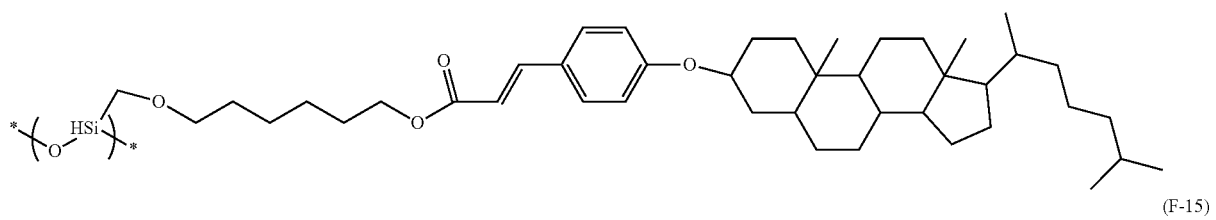
(F-15)
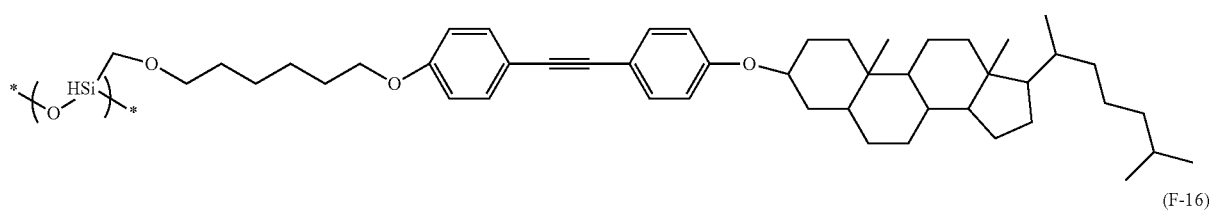
(F-16)
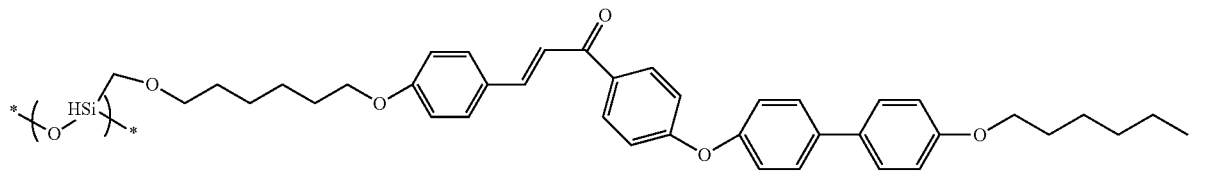
(F-17)
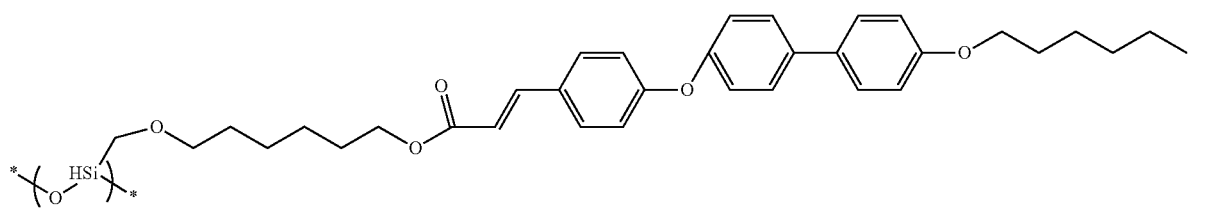
(F-18)
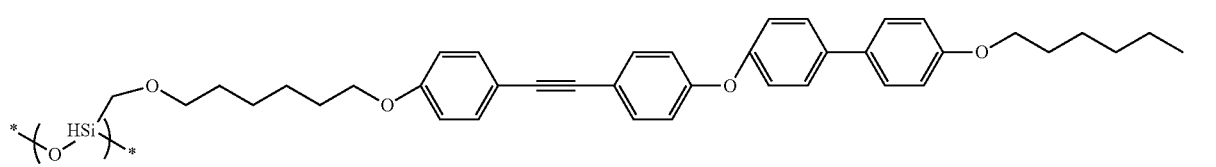

Besides, in the case where the polyamic acid as the polymer compound precursor is synthesized in such a manner that the pre-alignment compound includes a vertical alignment inducing structure portion, there may be used, other than the above-mentioned compounds having a cross-linkable functional group, compounds having a vertical alignment inducing structure portion represented by the following formulas (B-1) to (B-36), as the diamine compounds, and there may be used compounds having a vertical alignment inducing structure portion represented by the following formulas (b-1) to (b-3), as the tetracarboxylic acid dianhydrides.

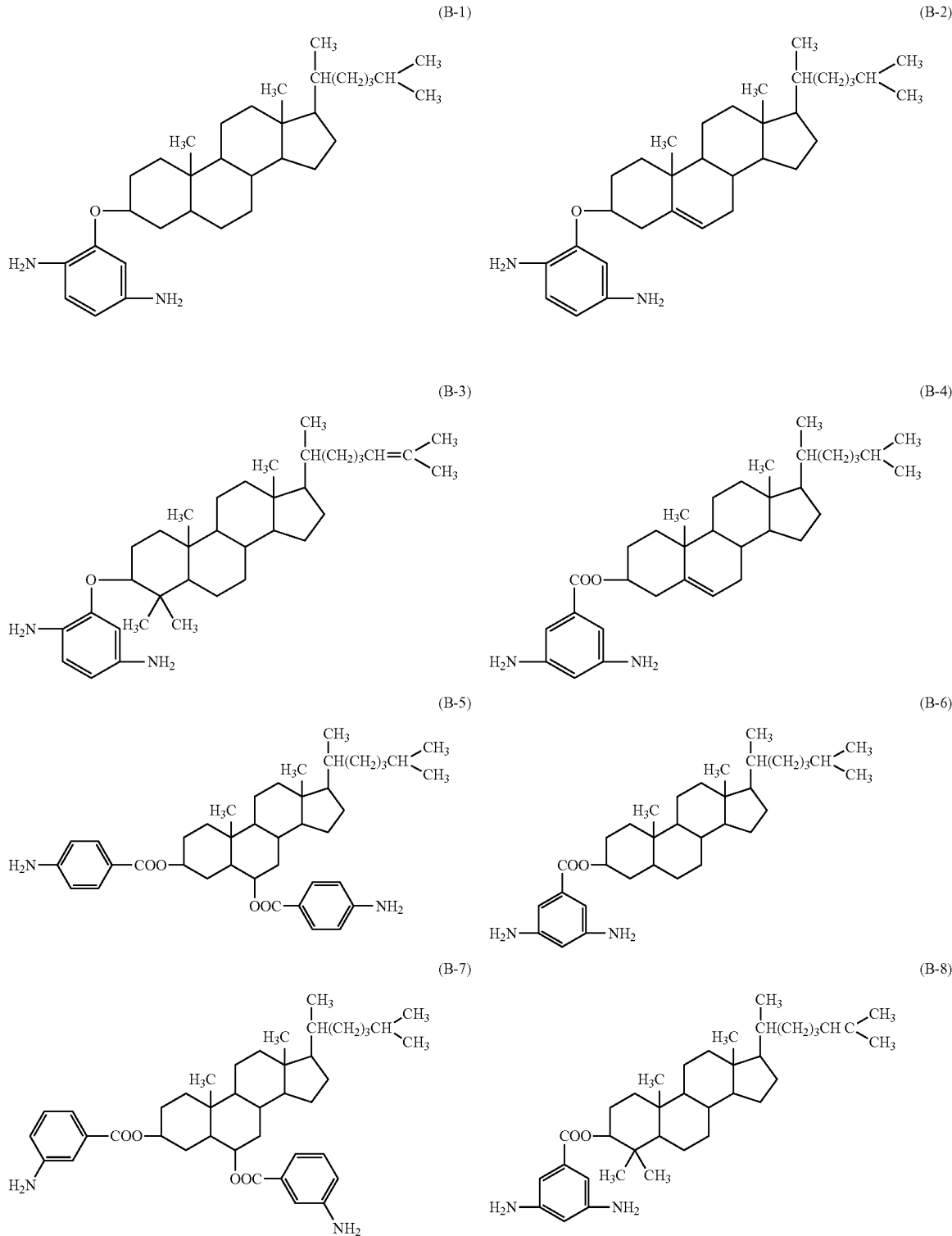

-continued
(B-9)
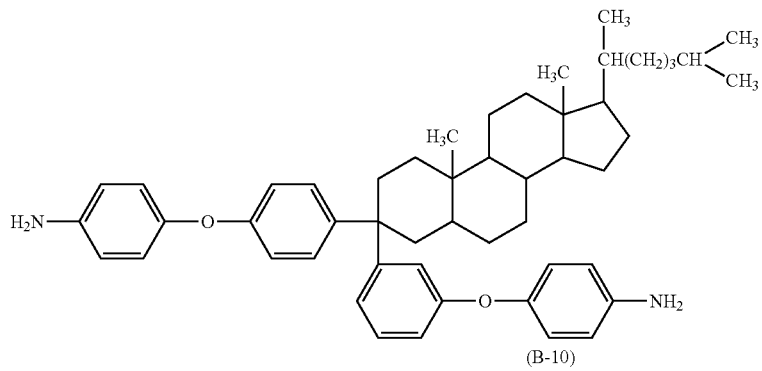
(B-10)
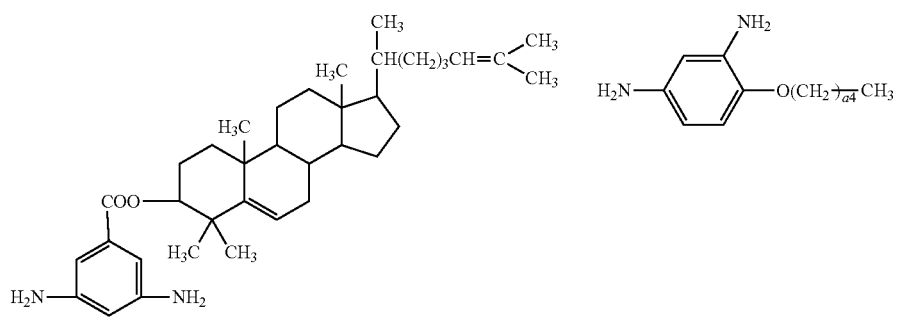
(B-11)
(B-12)
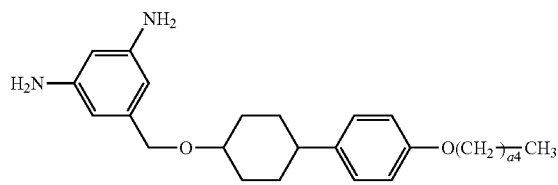
(B-13)
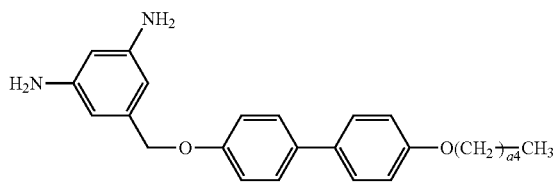
(B-14)
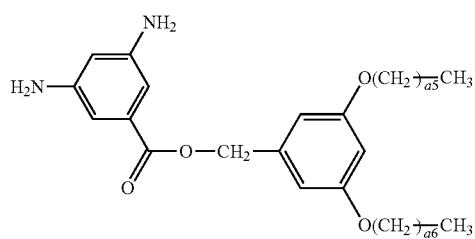
where a4 to a6 are each an integer of 0 to 21.
(B-15)
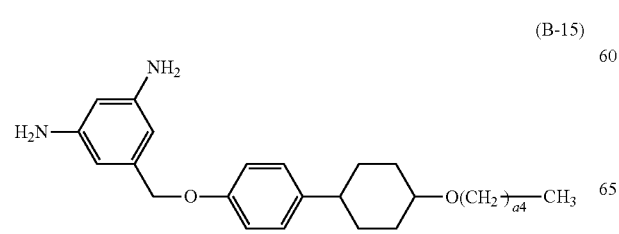
(B-16)
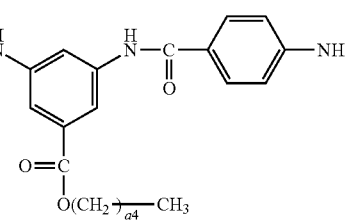

(B-17)
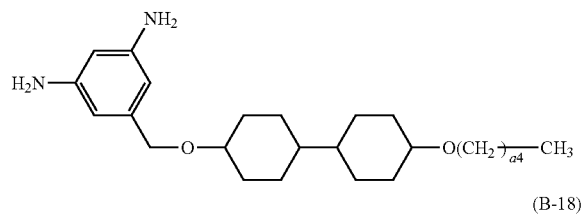
(B-18)
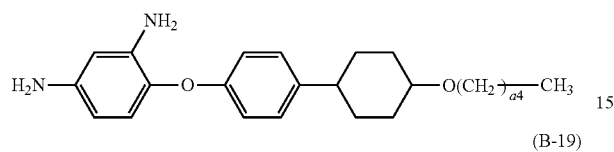
(B-19)
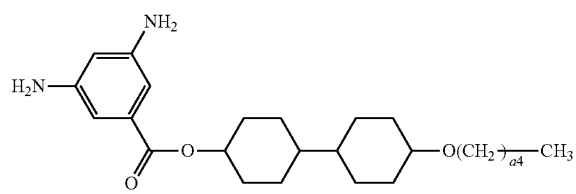
where a4 is an integer of 0 to 21.
(B-20)
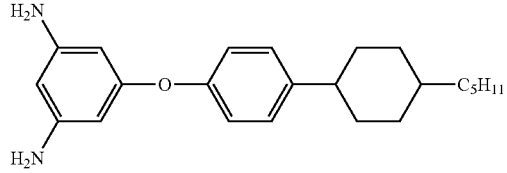
(B-21)
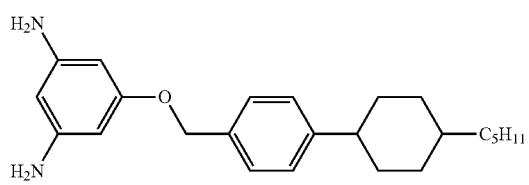
(B-22)
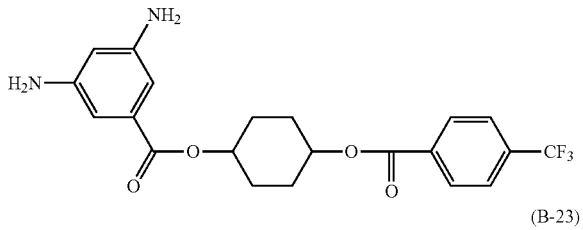
(B-23)
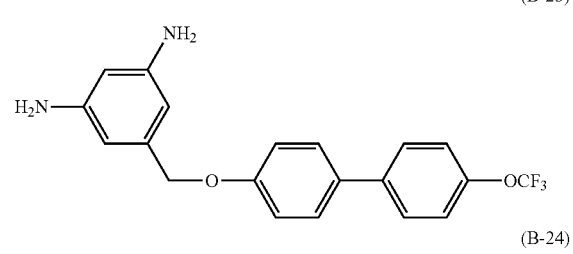
(B-24)
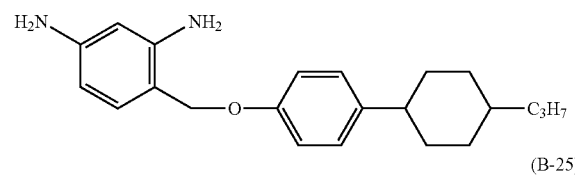
(B-25)
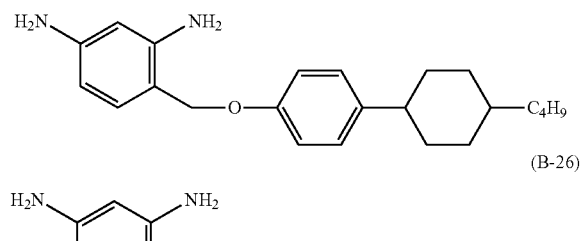
(B-26)
(B-28)
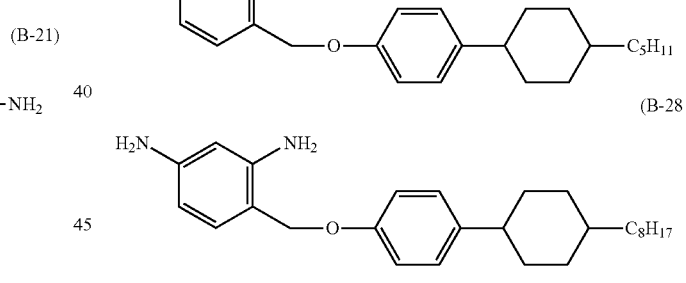
where a4 is an integer of 0 to 21.
(B-29) (B-30)
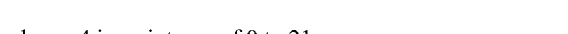
(B-31) (B-32)
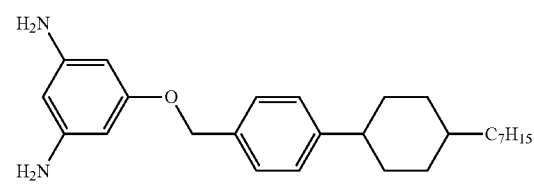

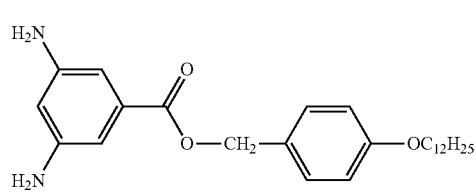 (B-33)
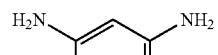 (B-34)
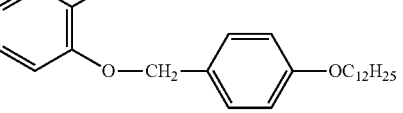
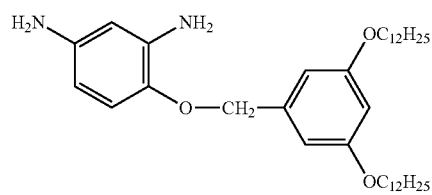 (B-35)
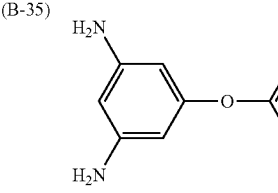 (B-36)
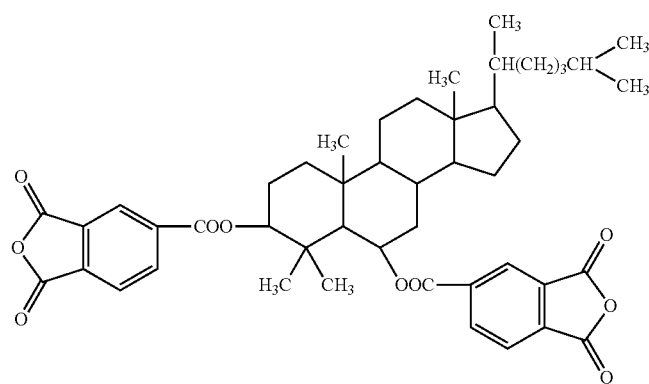 (b-1)
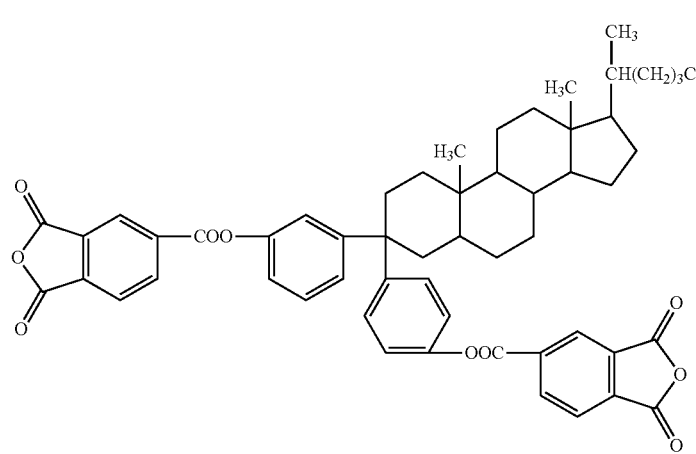 (b-2)

-continued

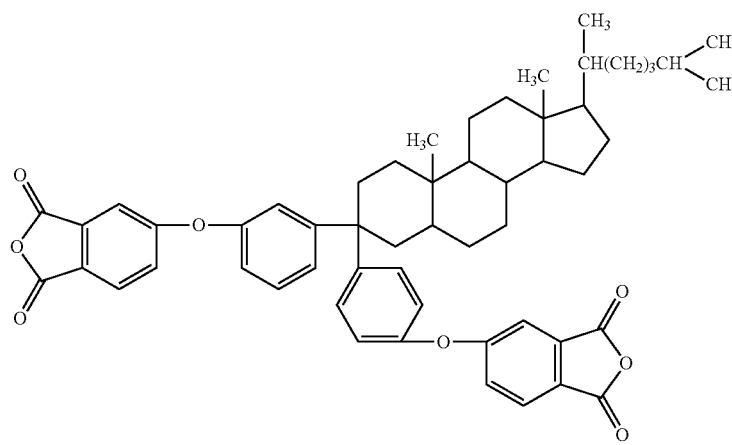

(b-3)

In addition, in the case where the polyamic acid as the polymer compound precursor is synthesized in such a manner that the pre-alignment compound has the group shown in the formula (1) together with a cross-linkable functional group, a compound having a group capable of coming to lie along the liquid crystal molecules 41 such as those represented by the following formulas (C-1) to (C-20) may be used as a diamine compound, other than the above-mentioned compound having a cross-linkable functional group.

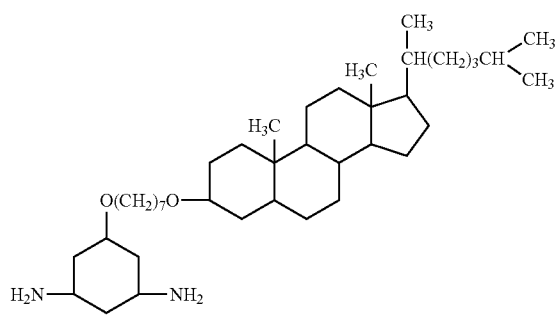

(C-1)

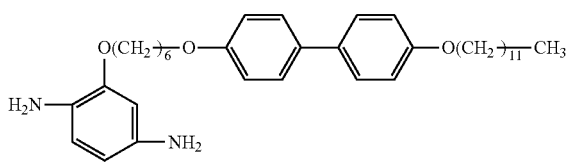

(C-2)

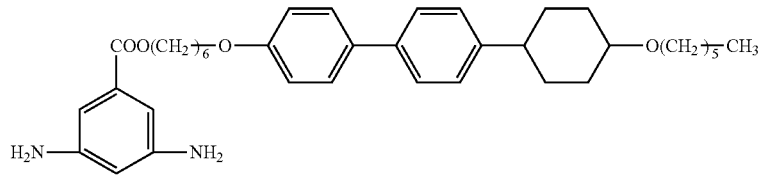

(C-3)

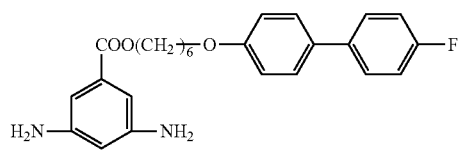

(C-4)

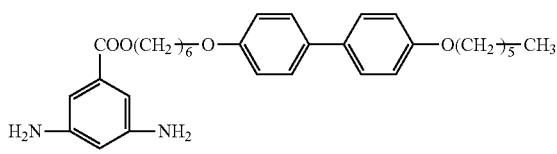

(C-5)

-continued
(C-6)
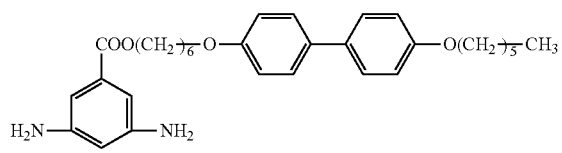
(C-7)
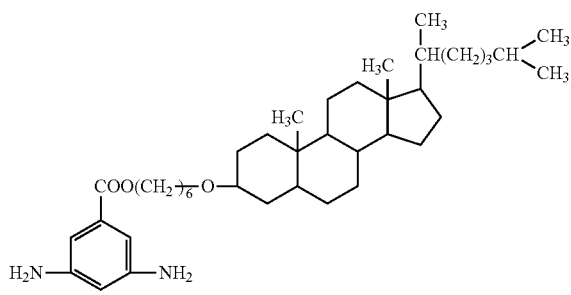
(C-8)
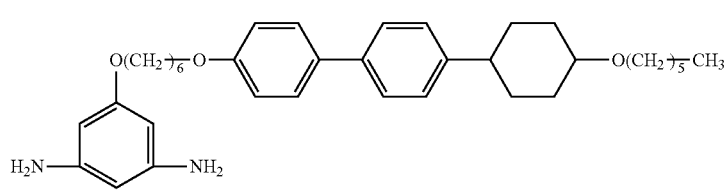
(C-9)
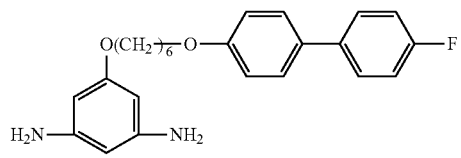
(C-10)
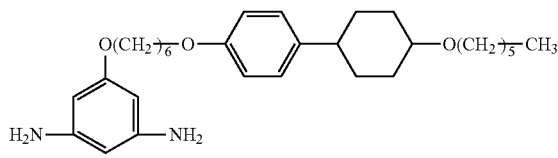
(C-11)
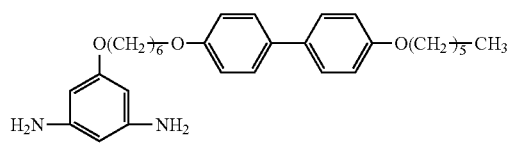
(C-12)
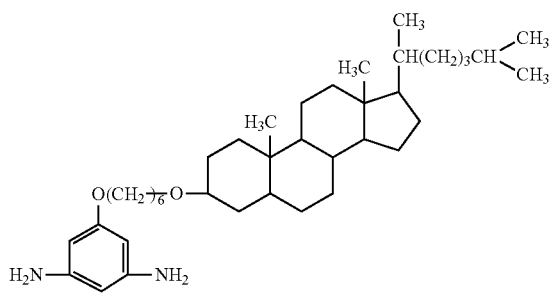
(C-13)
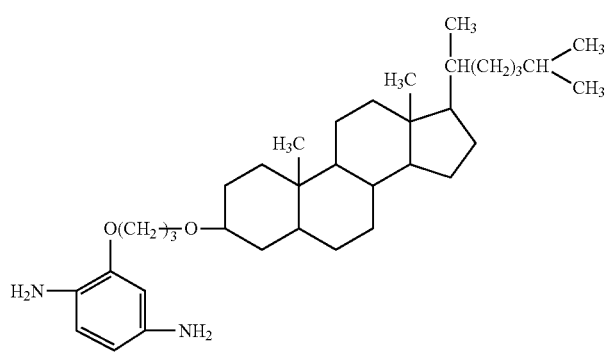
(C-14)
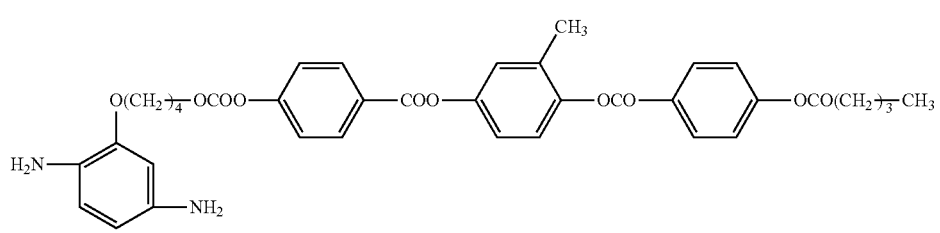

-continued

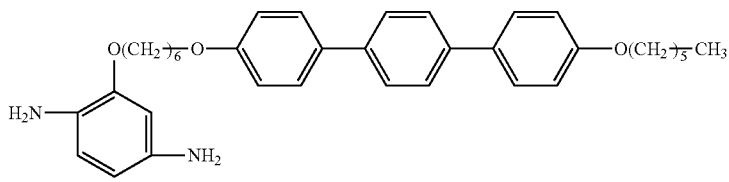
(C-15)

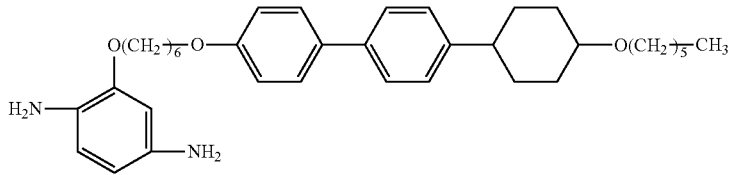
(C-16)

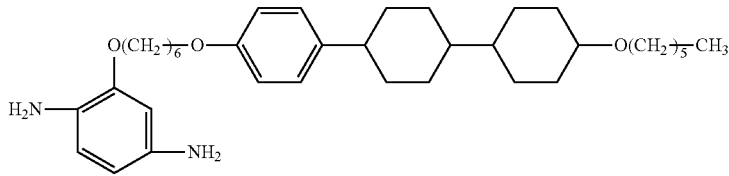
(C-17)

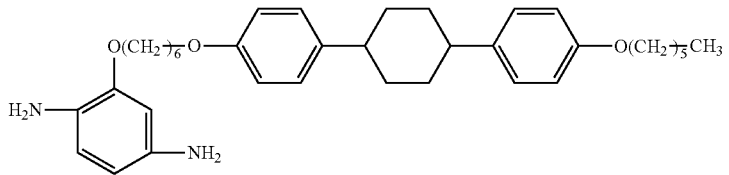
(C-18)

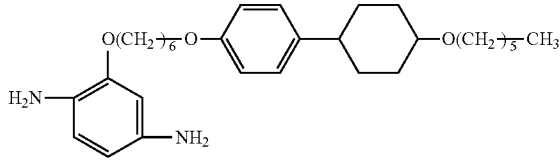
(C-19)

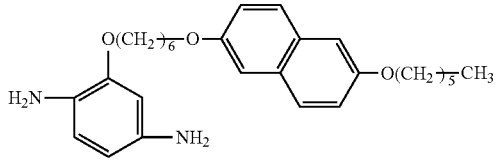
(C-20)

Besides, in the case where the polyamic acid as the polymer compound precursor is synthesized in such a manner that the pre-alignment compound has the group shown in the formula (2), a compound having a group capable of coming to lie along the liquid crystal molecules 41 such as those represented by the following formulas (D-1) to (D-7) may be used as a diamine compound, other than the above-mentioned compound having a cross-linkable functional group.

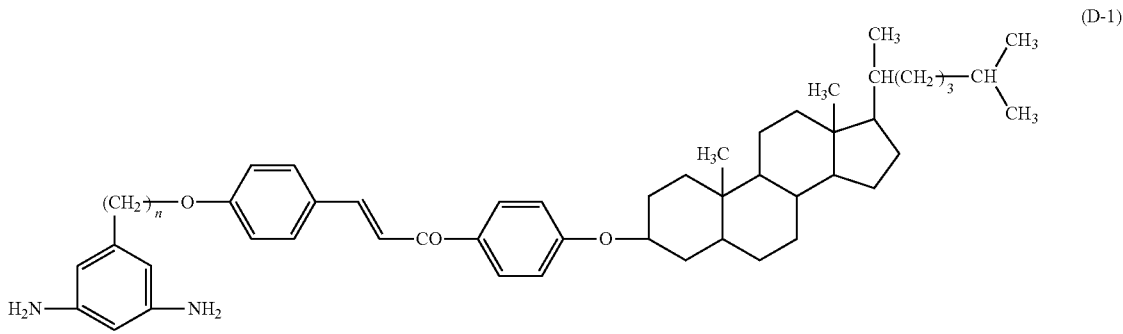
(D-1)

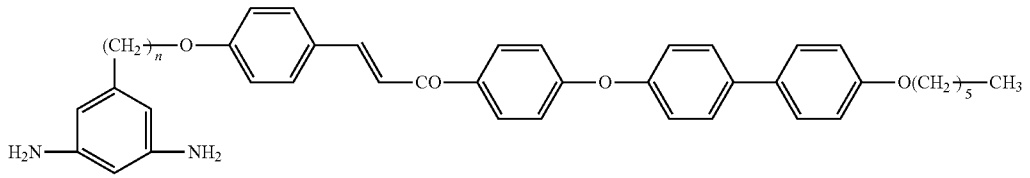
(D-2)

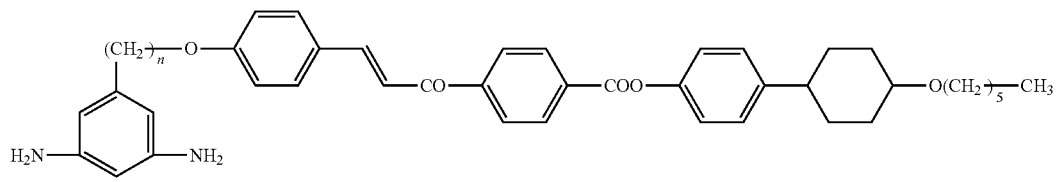
(D-3)

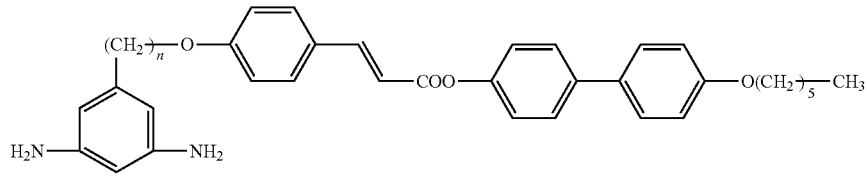
(D-4)

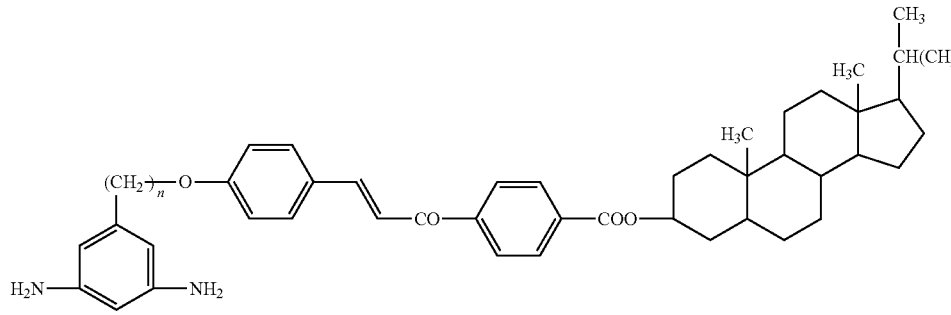
(D-5)

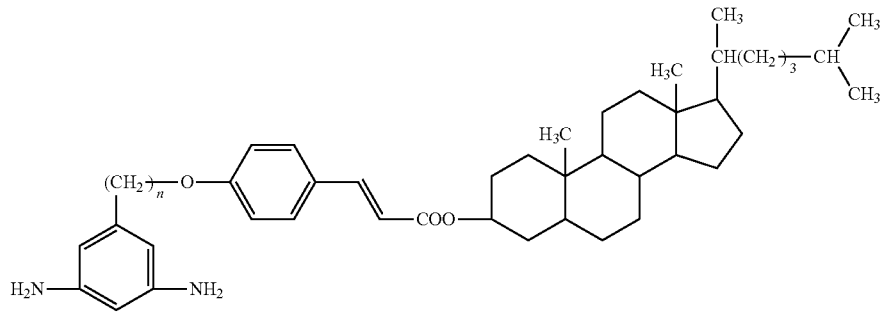
(D-6)

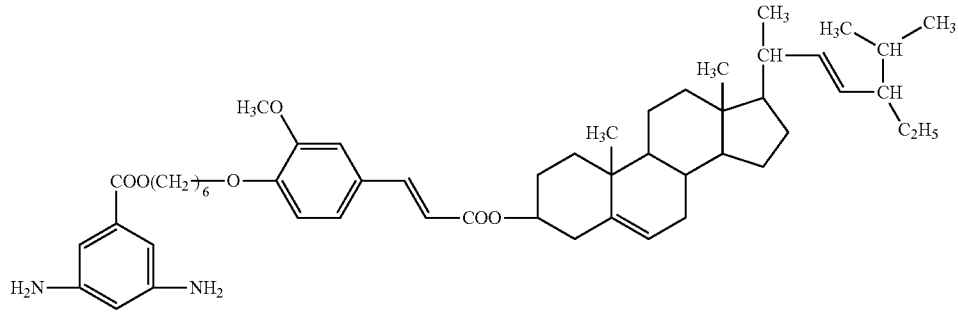
(D-7)

where n is an integer of 3 to 20.

Furthermore, in the case where the polyamic acid as the polymer compound precursor is synthesized in such a manner that the pre-alignment compound includes two types of structures constituting a structure including a vertical alignment inducing structure portion as R2 in the formula (3) and a structure including a cross-linkable functional group, for example, the diamine compound and the tetracarboxylic acid dianhydride are selected in the following manner. At least one of the compounds having a cross-linkable functional group represented by the formulas (A-1) to (A-15), at least one of the compounds having a vertical alignment inducing structure portion represented by the formulas (B-1) to (B-36) and the formulas (b-1) to (b-3), and at least one of the tetracarboxylic acid dianhydrides represented by the following formulas (E-1) to (E-28), are used. Incidentally, R1 and R2 in the formula (E-23) are identical or different alkyl groups, alkoxy groups or halogen atoms, wherein the kinds of the halogen atoms are arbitrary.

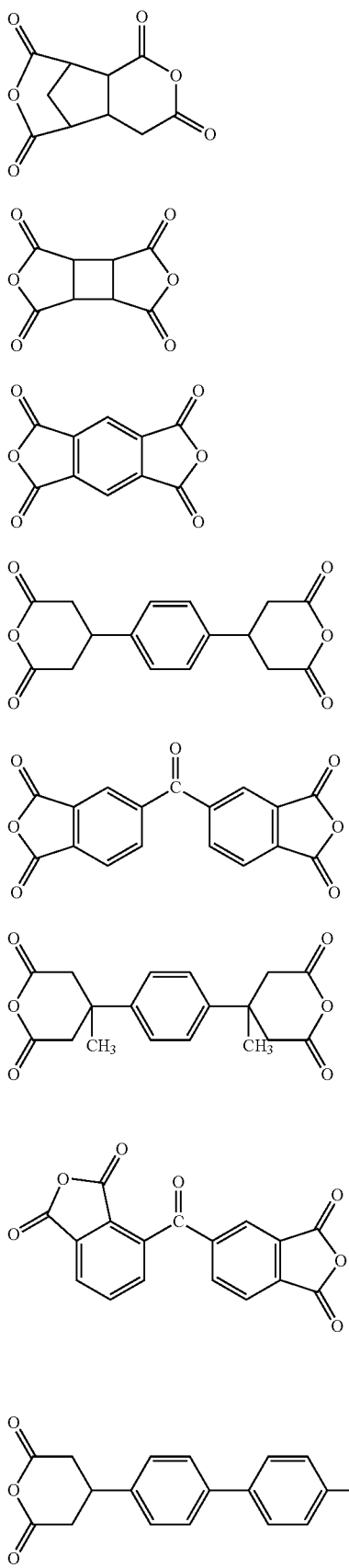
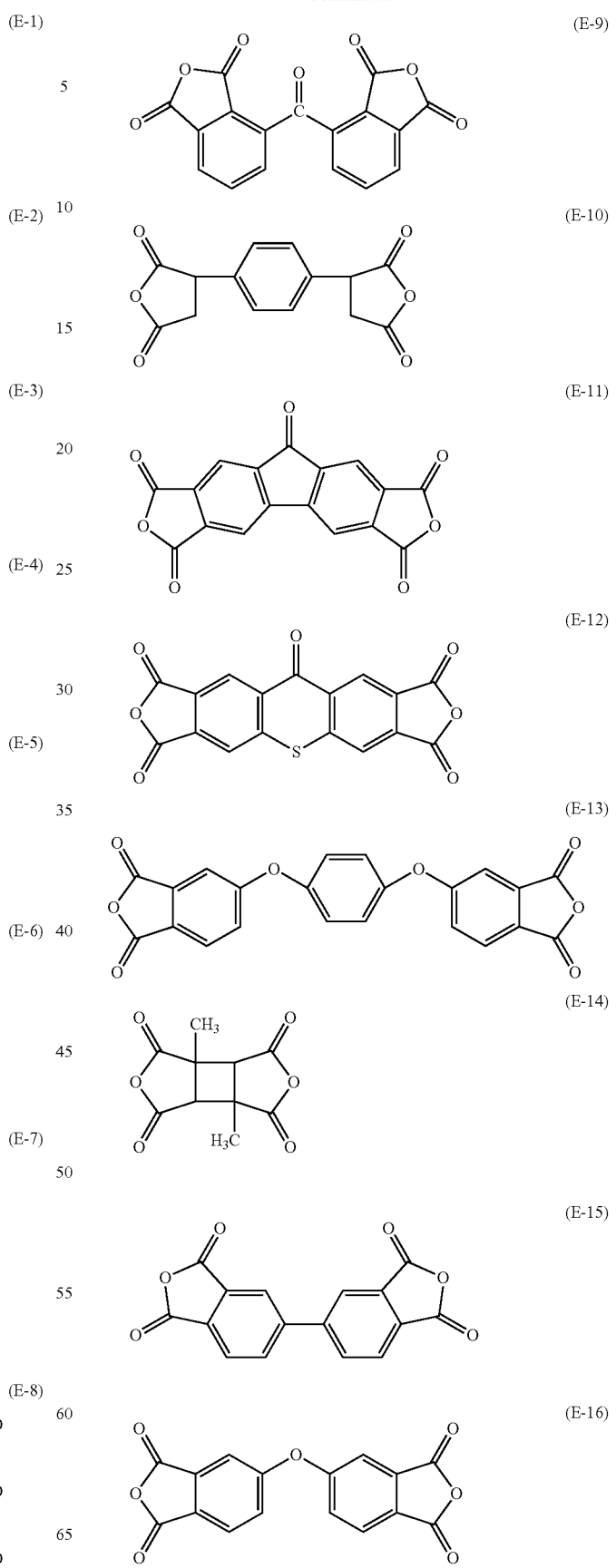

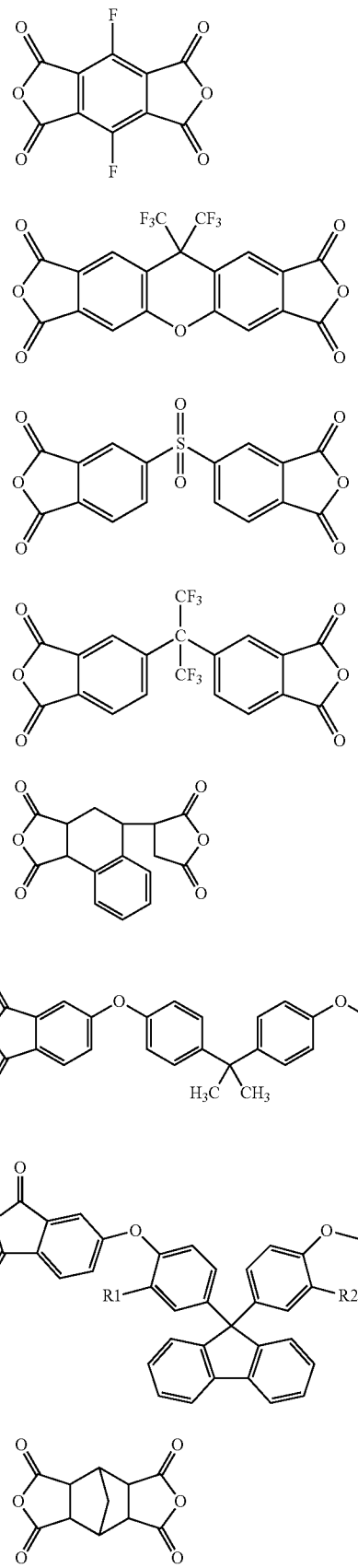

(E-17)
(E-18)
(E-19)
(E-20)
(E-21)
(E-22)
(E-23)
(E-24)

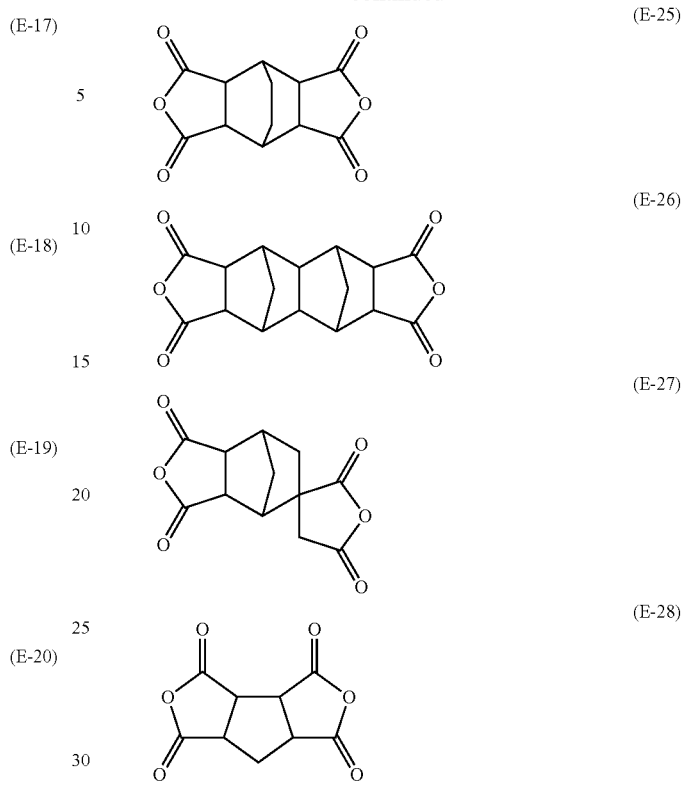

(E-25)
(E-26)
(E-27)
(E-28)

where R1 and R2 are each an alkyl group, an alkoxy group or a halogen atom.

In addition, in the case where the polyamic acid as the polymer compound precursor is synthesized in such a manner that the pre-alignment compound includes two types of structures having a structure including the group shown in the formula (1) as R2 in the formula (3) and a structure including a cross-linkable functional group, for example, the diamine compound and the tetracarboxylic acid dianhydride are selected in the following manner. At least one of the compounds having a cross-linkable functional group represented by the formulas (A-1) to (A-15), at least one of the compounds represented by the formulas (C-1) to (C-20), and at least one of the tetracarboxylic acid dianhydrides represented by the formulas (E-1) to (E-28), are used.

Besides, in the case where the polyamic acid as the polymer compound precursor is synthesized in such a manner that the pre-alignment compound includes two types of structures constituting a structure including the group shown in the formula (2) as R2 in the formula (3) and a structure including a cross-linkable functional group, for example, the diamine compound and the tetracarboxylic acid dianhydride are selected in the following manner. At least one of the compounds having a cross-linkable functional group represented by the formulas (A-1) to (A-15), at least one of the compounds represented by the formulas (D-1) to (D-7), and at least one of the tetracarboxylic acid dianhydrides represented by the formulas (E-1) to (E-28), are used.

The content of the precursor of the polymer compound as the pre-alignment compound or post-alignment compound in the alignment film material is preferably 1 to 30 wt %, more preferably 3 to 10 wt %. Besides, the alignment film material may be admixed with a photo-polymerization initiator and the like, as required.

Then, the alignment film material thus prepared is applied or printed onto the TFT substrate 20 and the CF substrate 30 so as to cover the pixel electrode 20B and the slit portions 21 and the counter electrode 30B, followed by a heating treatment. The temperature for the heating treatment is preferably not lower than 80° C., more preferably in the range of 150 to 200° C. In addition, the heating treatment may be carried out by gradually varying the heating temperature. As a result of this, the solvent contained in the alignment film material thus applied or printed is evaporated off, whereby the alignment films 22 and 32 containing the polymer compound (pre-alignment compound) having the cross-linkable functional group as a side chain are formed. Thereafter, such a treatment as rubbing may be applied to the alignment films 22 and 32, if necessary.

Here, the pre-alignment compound in the alignment films 22 and 32 is considered to be in a state as shown in FIG. 4. Specifically, the pre-alignment compound includes a main chain Mc (Mc1 to Mc3) and cross-linkable functional groups A introduced as side chains to the main chain Mc, and the main chains Mc1 to Mc3 are not interlinked. In this state, the cross-linkable functional groups A are oriented in random directions, due to thermal motion.

Next, the TFF substrate 20 and the CF substrate 30 are so disposed that the alignment film 22 and the alignment film 32 face each other, and a liquid crystal layer 40 including liquid crystal molecules 41 and the molecules having the spacer is formed in a sealed-off state between the alignment film 22 and the alignment film 32 (Step S102). Specifically, a spacer projection material, for example, plastic beads, for securing a cell gap is scattered onto that side of one of the TFT substrate 20 and the CF substrate 30 on which the alignment film 22 of 32 is formed, and a seal portion is formed on that side by, for example, a screen printing method using an epoxy adhesive or the like. Thereafter, as shown in FIG. 5, the TFT substrate 20 and the CF substrate 30 are adhered to each other so that the alignment films 22 and 32 face each other, with the spacer projection material and the seal portion therebetween, and a liquid crystal material containing the liquid crystal molecules 41 and the molecules having the spacer is poured into the cell gap between the alignment films 22 and 32. Thereafter, the seal portion is cured (hardened) by heating or the like, to enclose the liquid crystal material in a sealed-off state between the TFT substrate 20 and the CF substrate 30. FIG. 5 shows a sectional configuration of the liquid crystal layer 40 formed in the sealed-off state between the alignment film 22 and the alignment film 32.

Subsequently, as shown in FIG. 6, a voltage V1 is impressed between the pixel electrodes 20B and the counter electrode 30B by use of a voltage applying device 1 (Step S103). The voltage V1 is, for example, 5 to 30 V. As a result, an electric field in a direction of a predetermined angle relative to the surfaces of the glass substrates 20A and 30A is generated, whereby the liquid crystal molecules 41 etc. are oriented (aligned) in the state of being inclined from the direction perpendicular to the glass substrates 20A and 30A into a predetermined direction. In this instance, the azimuth angle (deflection angle) of the liquid crystal molecules 41 etc. is determined by the direction of the electric field, whereas the polar angle (zenith angle) of the liquid crystal molecules 41 etc. is determined by the intensity of the electric field. Besides, the inclination angle of the liquid crystal molecules 41 etc. is substantially equal to the pre-tilts $\theta 1$ and $\theta 2$ given (in the step described later) respectively to the liquid crystal molecules 41A etc. held by the alignment film 22 in the vicinity of the interface between the liquid crystal layer 40 and the alignment film 22 and to the liquid crystal molecules 41B etc. held by the alignment film 32 in the vicinity of the interface between the liquid crystal layer 40 and the alignment film 32. Accordingly, by appropriately regulating the value of the voltage V1, it is possible to control the values of the pre-tilts $\theta 1$ and $\theta 2$ of the liquid crystal molecules 41A, 41B etc.

Furthermore, as shown in FIG. 7A, in the condition where the voltage V1 is kept impressed, the alignment films 22 and 32 are irradiated with energy rays (specifically, ultraviolet rays UV) from the outer side of the TFT substrate 20, for example. Specifically, irradiation with ultraviolet rays is conducted while applying an electric field to the liquid crystal layer so that the liquid crystal molecules 41 etc. are aligned (oriented) in an oblique direction relative to the surfaces of the pair of the substrates 20 and 30. By this process, the cross-linkable functional groups possessed by the pre-alignment compound in the alignment films 22 and 32 are reacted with each other, to cross-link the pre-alignment compound (Step S104). In this way, the direction into which the liquid crystal molecules 41 etc. are to respond is memorized by the post-alignment compound, and the pre-tilts are given to the liquid crystal molecules 41 etc. in the vicinity of the alignment films 22 and 32. As a result, the post-alignment compound is formed in the alignment films 22 and 32, and, in the non-driving state, the pre-tilts $\theta 1$ and $\theta 2$ are given to the liquid crystal molecules 41A, 41B etc. located in the vicinity of the interfaces between the liquid crystal layer 40 and the alignment films 22 and 32. As the ultraviolet rays UV, ultraviolet rays containing a light component with a wavelength of around 365 nm in a high proportion are preferably used. This is because, if ultraviolet rays containing a light component in a short wavelength region in a high proportion are used, the liquid crystal molecules 41 etc. may be photo-decomposed and deteriorated. While the ultraviolet rays UV are radiated from the outer side of the TFT substrate 20 here, the ultraviolet rays may be radiated from the outer side of the CF substrate 30, or may be radiated from both the outer side of the TFT substrate 20 and the outer side of the CF substrate 30. In this case, it is preferable to radiate the ultraviolet rays UV from the side of the substrate higher in transmittance. In addition, in the case where the ultraviolet rays UV are radiated from the outer side of the CF substrate 30, the ultraviolet rays UV may be absorbed by the color filter, depending on the wavelength region of the ultraviolet rays UV. Such absorption would make it difficult to effect the cross-linking reaction. In view of this, it is preferable to radiate the ultraviolet rays UV from the outer side of the TFT substrate 20 (from the side of the substrate provided with the pixel electrodes).

Figure 7B:
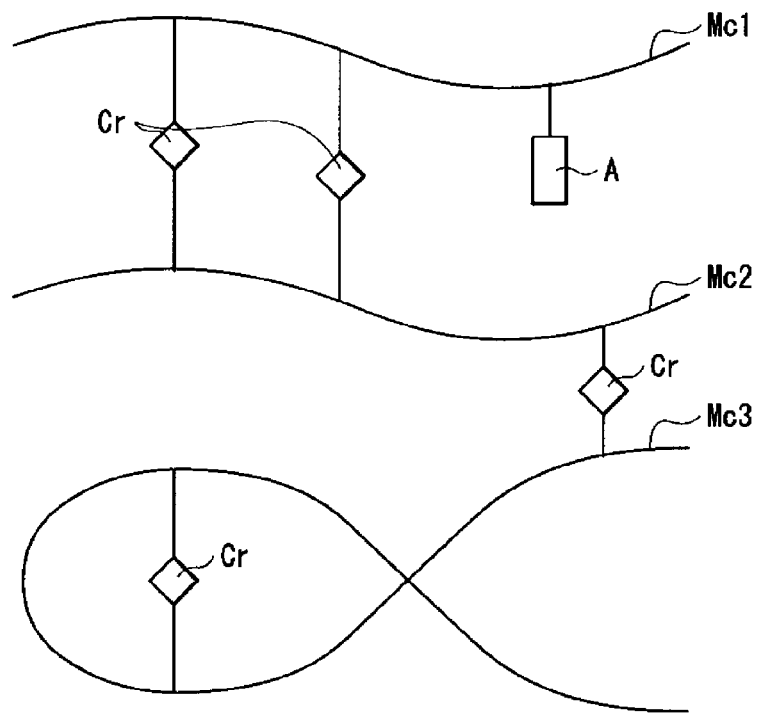
FIG. 7B is a schematic illustration of the state of the polymer compound (post-alignment compound) in the alignment film.

Here, the post-alignment compound in the alignment films 22 and 32 is in the state as shown in FIG. 7B. Specifically, the orientation of the cross-linkable functional group A introduced into the main chain Mc of the pre-alignment compound is varied according to the alignment (orientation) direction of the liquid crystal molecules 41 etc., and the cross-linkable functional groups A spaced by a short physical distance react with each other, to form a cross-link portion Cr. It is considered that, by the post-alignment compound thus formed, the alignment films 22 and 32 give the pre-tilt $\theta 1$ and $\theta 2$ to the liquid crystal molecules 41A, 41B etc. Incidentally, the cross-link portion Cr may be formed between the molecules of the pre-alignment compound, or may be formed within a molecule of the pre-alignment compound. Specifically, as shown in FIG. 7B, the cross-link portion Cr may, for example, be formed through a reaction between a cross-linkable functional group A of the pre-alignment compound having a main chain Mc1 and a cross-linkable functional group A of the pre-alignment compound having a main chain Mc2. Or, alternatively, the cross-link portion Cr may be, for example, formed through a reaction between cross-linkable functional groups A introduced to the same main chain Mc3, as in the polymer compound having the main chain Mc3.

By the above-mentioned steps, the liquid crystal display (liquid crystal display element) shown in FIG. 1 can be completed.

In operation of the liquid crystal display (liquid crystal display element), when the driving voltage is impressed on the pixel 10 selected, the orientation state of the liquid crystal molecules 41 etc. contained in the liquid crystal layer 40 in the region of the pixel 10 is changed according to a potential difference between the pixel electrode 20B and the counter electrode 30B. Specifically, in the liquid crystal layer 40, when the driving voltage is impressed starting from the condition before application of the driving voltage shown in FIG. 1, the liquid crystal molecules 41A, 41B etc. located in the vicinity of the alignment films 22 and 32 fall down in the inclination directions of their own, and the falling motions are propagated to the other liquid crystal molecules 41C etc. As a result, the liquid crystal molecules 41 etc. respond so as to assume postures of being substantially horizontal (parallel) relative to the TFT substrate 20 and the CF substrate 30. This ensures that optical characteristics of the liquid crystal layer 40 are changed, incident light entering the liquid crystal display element is converted into modulated outgoing light, and a gradation is expressed based on the outgoing light, whereby a video image is displayed.

Here, in a liquid crystal display element in which the pre-tilting treatment has not been conducted at all and in a liquid crystal display including the liquid crystal display element, even if the substrate is provided with the orientation-regulating portion such as slit portions for regulating the orientation (alignment) of the liquid crystal molecules, application of the driving voltage results in that the liquid crystal molecules having been aligned (oriented) in the vertical direction relative to the substrate are caused to fall down in such a manner that their directors are oriented in arbitrary directions in the substrate plane (a plane parallel to the substrate). In the liquid crystal molecules responding to the driving voltage in this manner, the directors of the liquid crystal molecules are non-uniform in azimuth, and the alignment of the liquid crystal molecules in the pixel as a whole is disturbed. This leads to a lowered response speed and a degraded response characteristic, resulting in worsening of display characteristics. In addition, when driving is conducted such that an initial driving voltage is set higher than the driving voltage in a displaying state (over-drive type driving), some liquid crystal molecules respond but others do not substantially respond to the initial driving voltage, resulting in that a large difference in director inclination is generated between the two kinds of liquid crystal molecules. When the driving voltage for the displaying state is impressed thereafter, the liquid crystal molecules having responded to the initial driving voltage is brought to a director inclination corresponding to the driving voltage for the display state, before their motions are little propagated to other liquid crystal molecules, and this inclination is propagated to the other liquid crystal molecules. Consequently, in the pixel as a whole, a luminance for the displaying state is reached upon the application of the initial driving voltage, but the luminance is then lowered, and thereafter the luminance for the displaying state is again reached. Thus, when the over-drive type driving is conducted, the apparent response speed is enhanced as compared with ordinary driving (driving without over-drive), but it is difficult to obtain a sufficient display quality. These problems are peculiar to the liquid crystal display element in the VA mode, and are rarely generated in the liquid crystal display elements in the IPS (In Plane Switching) mode or the FFS (Fringe Field Switching) mode.

On the other hand, in the liquid crystal display (liquid crystal display element) and the method of manufacturing the same in Mode 1, the above-mentioned alignment films 22 and 32 give the predetermined tilts θ1 and θ2 to the liquid crystal molecules 41A, 41B etc. This ensures that the problem generated where the pre-tilting treatment has not been conducted is restrained from occurring, the speed of response to the driving voltage is largely enhanced, and the display quality in the case of the over-drive type driving is also enhanced. Moreover, since at least one of the TFT substrate 20 and the CF substrate 30 is provided with the slit portions 21 or the like as the orientation-regulating portion for regulating the orientation (alignment) of the liquid crystal molecules 41 etc., display characteristics such as viewing angle characteristic are secured, and, accordingly, response characteristic is enhanced while maintaining good display characteristics.

In addition, in the method of manufacturing a liquid crystal display according to the related art (light alignment film technique), the alignment film is formed by a method in which a precursor film containing a predetermined polymer material and provided on a substrate surface is irradiated with linearly polarized light or with light in an oblique direction relative to the substrate surface (this light will hereinafter be referred to as "oblique light"), whereby a pre-tilting treatment is carried out. Therefore, a large type light irradiation equipment such as an apparatus for irradiation with linearly polarized light or an apparatus for irradiating with oblique light is required for forming the alignment film. Besides, formation of pixels having multiple domains for realizing a wider viewing angle requires a larger type equipment and involves a complicated manufacturing process. Particularly, in the case of forming an alignment film by use of oblique light, if projection-and-recess patterns or structures such as spacers are present on the substrate, regions shaded from the oblique light by the structures or the like would be generated, and application of desired orientation regulation to the liquid crystal molecules would be difficult to achieve in such shaded regions. In this case, for example, in order to irradiate with oblique light by use of a photomask for providing multiple domains in each of pixels, it may be necessary to design the pixels while taking into account the turning-around of the light. In other words, in the case of forming the alignment film by use of oblique light, it is difficult to form pixels in high precision.

Furthermore, in the light alignment film technique according to the related art, specifically, in the case of using a cross-linkable polymer compound as a polymer material, the cross-linkable functional groups contained in the cross-linkable polymer compound in a precursor film are oriented in random azimuths (directions), so that the probability of shortening of the physical distance between the cross-linkable functional groups is low. Moreover, in the case of irradiation with random light (non-polarized light), the reaction is effected due to the shortening of the physical distance between the cross-linkable functional groups, but, on the other hand, the cross-linkable functional groups to be brought into reaction by irradiation with linearly polarized light make it necessary for the polarization direction and the direction of reacting parts to be aligned in a predetermined direction. Besides, as compared with vertical light, the oblique light leads to a widened irradiation area and, accordingly, to a lowered irradiation per unit area. In other words, the proportion of the cross-linkable functional groups brought into reaction by the linearly polarized light or oblique light, based on all the cross-linkable functional groups present, is lower than that in the case of irradiation with random light (non-polarized light) from the vertical direction relative to the substrate plane. Consequently, the cross-link density (the degree of cross-linking) in the alignment film formed is liable to be lower, in the case of irradiation with linearly polarized light or oblique light.

On the other hand, in Mode 1, the alignment films 22 and 32 containing the pre-alignment compound are formed and, thereafter, the liquid crystal layer 40 is formed in a sealed-off state between the alignment film 22 and the alignment film 32. Next, the pre-alignment compound in the alignment films 22 and 32 is cross-linked under the condition wherein the liquid crystal molecules 41 etc. are kept in a predetermined orientation and the direction of the cross-linkable functional groups are kept regulated (in other words, the direction of the terminal structure portions in the side chains relative to the substrate or the electrode(s) is kept regulated) by the liquid crystal molecules 41 etc., by impressing a voltage on the liquid crystal layer 40. As a result, the alignment films 22 and 32 for giving the pre-tilts $\theta$ to the liquid crystal molecules 41A, 41B etc. can be formed. Thus, according to the liquid crystal display (liquid crystal display element) and the method of manufacturing the same according to Mode 1, response characteristic can be enhanced easily, without using a large type equipment. Moreover, in cross-linking the pre-alignment compound, the pre-tilt $\theta$ can be given to the liquid crystal molecules 41 etc., without dependence on the direction of irradiation with ultraviolet rays; therefore, pixels with high precision can be formed. Furthermore, the post-alignment compound is formed in the condition where the orientations of the cross-linkable functional groups in the pre-alignment compound are ordered, so that the degree of cross-linking in the post-aligned compound is considered to be higher than that in the alignment films formed by the above-mentioned manufacturing method according to the related art. Therefore, even when the liquid crystal display (liquid crystal display element) in Mode 1 is driven for a long time, new formation of cross-linked structures during driving is not liable to occur, so that the pre-tilts $\theta 1$ and $\theta 2$ of the liquid crystal molecules 41A, 41B etc. are maintained in the state upon the manufacture; consequently, the reliability of the liquid crystal display (liquid crystal display element) can also be enhanced.

In this case, in Mode 1, the liquid crystal layer 40 is formed in a sealed-off state between the alignment films 22 and 32 and, thereafter, the pre-alignment compound in the alignment films 22 and 32 is cross-linked. Therefore, the transmittance at the time of driving of the liquid crystal display element can be varied so as to increased continuously.

Figure 9A:
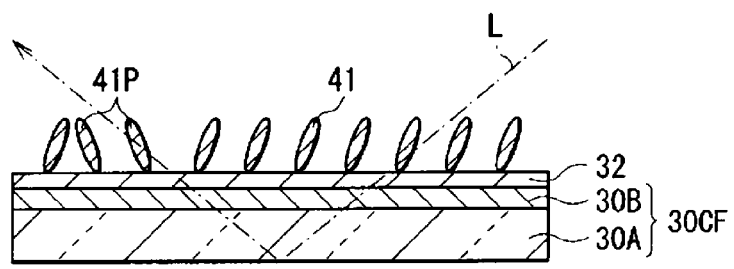
FIGS. 9A and 9B are sectional schematic views for illustrating an order parameter.

More specifically, in the case where the light alignment film technique according to the related art is used, as shown in FIG. 9A, the oblique light L radiated for carrying out a pre-tilting treatment is partly reflected by the back surface of the glass substrate 30, so that the direction of the pre-tilt is disturbed in some (41P) of the liquid crystal molecules 41. In this case, the pre-tilt direction of some of the liquid crystal molecules 41 is deviated from the pre-tilt direction of the other liquid crystal molecules 41, and, accordingly, the order parameter as an indicator of the aligned (oriented) state of the liquid crystal molecules 41 (the degree of uniformity of the aligned state) is lowered. As a result, in the beginning period of driving of the liquid crystal display element, some liquid crystal molecules 41P with the deviated pre-tilt direction behave differently from the other liquid crystal molecules 41, and are oriented (aligned) in a different direction as compared with the other liquid crystal molecules 41, whereby transmittance is raised. Thereafter, however, the some liquid crystal molecules 41P tend to be oriented (aligned) just like the other liquid crystal molecules 41. Therefore, the direction of the director of the momentarily inclined liquid crystal molecules 41P becomes vertical to the substrate plane, and is thereafter aligned to the direction of the director of the other liquid crystal molecules 41. Accordingly, the transmittance of the liquid crystal display element tends to decrease locally, without increasing continuously.

Figure 9B:
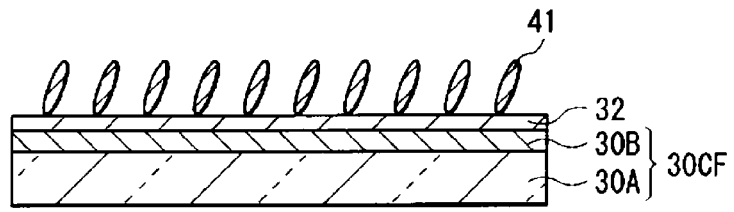

On the other hand, in Mode 1 wherein the pre-tilting treatment is effected by the cross-linking reaction of the pre-alignment compound after the liquid crystal layer 40 is formed in a sealed-off state, the orientation-regulating portion for regulating the orientation (alignment) of the liquid crystal molecules 41 etc. such as the slit portions 21 ensures that the pre-tilt is given according to the orientation (alignment) direction of the liquid crystal molecules 41 etc. at the time of driving. Therefore, as shown in FIG. 9B, the direction of the pre-tilt of the liquid crystal molecules 41 etc. is liable to be uniform, so that the order parameter increases (approaches one). Consequently, at the time of driving of the liquid crystal display element, the liquid crystal molecules 41 etc. behave in a uniform manner and, therefore, transmittance increases continuously.

In this case, particularly, when the pre-alignment compound has the group shown in the formula (1) together with the cross-linkable functional group, when if the pre-alignment compound has the group shown in the formula (2) as the cross-linkable functional group, it becomes easier to give the pre-tilt $\theta$ to the alignment films 22 and 32. As a result, the response speed can be more enhanced.

Furthermore, in the method of manufacturing a liquid crystal display element according to the related art, after the liquid crystal layer is formed by use of a liquid crystal material containing a photo-polymerizable monomer and the like, the liquid crystal layer with the monomer contained therein is irradiated with light while orienting (aligning) the liquid crystal molecules in a predetermined direction, to polymerize the monomer. The polymer formed in this way functions to give a pre-tilt to the liquid crystal molecules. However, the liquid crystal display element thus manufactured has a problem that an unreacted photo-polymerizable monomer remains in the liquid crystal layer, leading to a lowered reliability. In addition, in order to reduce the amount of the unreacted monomer which would remain in the liquid crystal layer, the irradiation with time has to be continued for a prolonged time, which leads to the problem that the time required for the manufacture (tact time) is prolonged.

On the other hand, in Mode 1, reliability can be enhanced, without forming the liquid crystal layer by use of a liquid crystal material containing the monomer added thereto as above-mentioned, since the alignment films 22 and 32 give the pre-tilts $\theta 1$ and $\theta 2$ to the liquid crystal molecules 41A, 41B etc. in the liquid crystal layer 40. Further, the tact time can be restrained from becoming longer. Furthermore, the pre-tilt $\theta$ can be favorably given to the liquid crystal molecules 41A, 41B etc., without using a related-art technique for giving a pre-tilt to liquid crystal molecules, such as a rubbing treatment. Therefore, the method according to Mode 1 is free from the problems involved in the rubbing treatment, such as a lowering in contrast due to flaws given to the alignment film during rubbing, breakage of conductors due to static electricity generated during rubbing, or a lowering in reliability or the like due to foreign matter.

While the case where the alignment films 22 and 32 containing the pre-alignment compound having a main chain including a polyimide structure mainly has been described in Mode 1, the main chain possessed by the pre-alignment compound is not restricted to such a polyimide structure-containing chain. For instance, the main chain may contain a polysiloxane structure, a polyacrylate structure, a polymethacrylate structure, a maleimide polymer structure, a styrene polymer structure, a styrene/maleimide polymer structure, a polysaccharide structure, a polyvinyl alcohol structure or the like, and a pre-alignment compound having a main chain including a polysiloxane structure is preferable, among others. In addition, the glass transition temperature $T_g$ of the compound constituting the main chain is desirably not lower than 200° C. The polymer compound having such a polysiloxane structure-containing main chain with such a glass transition temperature $T_g$ produces an effect similar to that of the above-mentioned polymer compound including the polyimide structure. Examples of the pre-alignment compound having a polysiloxane structure-containing main chain include polymer compound including a polysilane structure represented by the formula (9) below. While R10 and R11 in the formula (9) may each be any univalent group that contains carbon, it is preferable that one of R10 and R11 includes a cross-linkable functional group as a side chain, since such a configuration permits the post-alignment compound to easily exhibit a sufficient orientation-regulating ability. Examples of the cross-linkable functional group in this case include the groups shown in the formula (41) above.

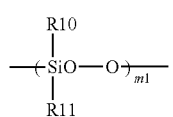

(9)

where R10 and R11 are each a univalent organic group, and m1 is an integer of not less than one.

Furthermore, while the pixel electrodes 20B have been provided with the slit portions 21 so as to divide the orientation and thereby to enhance viewing angle characteristic in Mode 1, this is not a restrictive configuration. For instance, projections as an orientation-regulating portion may be provided between the pixel electrodes 20B and the alignment film 22, in place of the slit portions 21. By providing the projections, also, it is possible to obtain an effect equivalent to that of the slit portions 21. Further, projections as an orientation-regulating portion may be provided between the alignment film 32 and the counter electrode 30B of the CF substrate 30. In this case, the projections on the TFT substrate 20 and the projections on the CF substrate 30 are so arranged as not to face each other. In this case, also, an effect equivalent to the above-mentioned effect can be obtained.

Now, other modes of carrying out the present disclosure will be described below, wherein the same components as those in Mode 1 will be denoted by the same reference signs as used above, and detailed description of the same components will be omitted. Besides, descriptions of the same operations or effects as those in Mode 1 will also be omitted, where appropriate. Furthermore, a variety of technical items described in Mode 1 are applied also to other modes, as appropriate.

[Mode 2]

Mode 2 is a modification of Mode 1. In Mode 1, description has been made of the liquid crystal display (liquid crystal display element) wherein the alignment films 22 and 32 are so formed that the pre-tilts θ1, θ2 of the liquid crystal molecules 41A, 41B etc. located in the vicinity of the alignment films 22 and 32 are substantially the same. In Mode 2, on the other hand, the pre-tilt θ1 and the pre-tilt θ2 are set to be different.

Specifically, in Mode 2, first, a TFT substrate 20 having an alignment film 22 and a CF substrate 30 having an alignment film 32 are produced in the same manner as in the above-mentioned Step S101. Next, a liquid crystal layer 40 with, for example, a UV absorber contained therein is formed in a sealed-off state. Subsequently, a predetermined voltage is impressed between pixel electrodes 20B and a counter electrode 30B, and ultraviolet rays are radiated from the side of the TFT substrate 20, to cross-link a pre-alignment compound in the alignment film 22. In this instance, since the UV absorber is contained in the liquid crystal layer 40, the ultraviolet rays incident from the side of the TFT substrate 20 are absorbed by the UV absorber in the liquid crystal layer 40 and, therefore, rarely reach the CF substrate 30 side. Accordingly, a post-alignment compound is produced in the alignment film 22. Subsequently, a voltage different from the above-mentioned predetermined voltage is impressed between the pixel electrodes 20B and the counter electrode 30B, and ultraviolet rays are radiated from the side of the CF substrate 30, to bring a pre-alignment compound in the alignment film 32 into reaction, thereby producing a post-alignment compound. By these steps, the pre-tilts θ1, θ2 of the liquid crystal molecules 41A, 41B etc. located in the vicinities of the alignment films 22 and 32 can be set according to the voltage impressed in the case of irradiation with ultraviolet rays from the TFT substrate 20 side and the voltage impressed in the case of irradiation with ultraviolet rays from the CF substrate 30 side. Therefore, the pre-tilt θ1 and the pre-tilt θ2 can be set to be different from each other. It is to be noted here, however, that since the TFT substrate 20 is provided with TFT switching elements and various bus lines, a variety of transverse electric fields are generated at the time of driving. In view of this, it is desirable to form the alignment film 22 on the side of the TFT substrate 20 so that the pre-tilt θ1 of the liquid crystal molecules 41A etc. located in the vicinity of the alignment film 22 will be greater than the pre-tilt θ2 of the liquid crystal molecules 41B etc. located in the vicinity of the alignment film 32. By this it is possible to effectively reduce the disturbance in the orientation (alignment) of the liquid crystal molecules 41A etc. due to the transverse electric fields.

[Mode 3]

Figure 10:
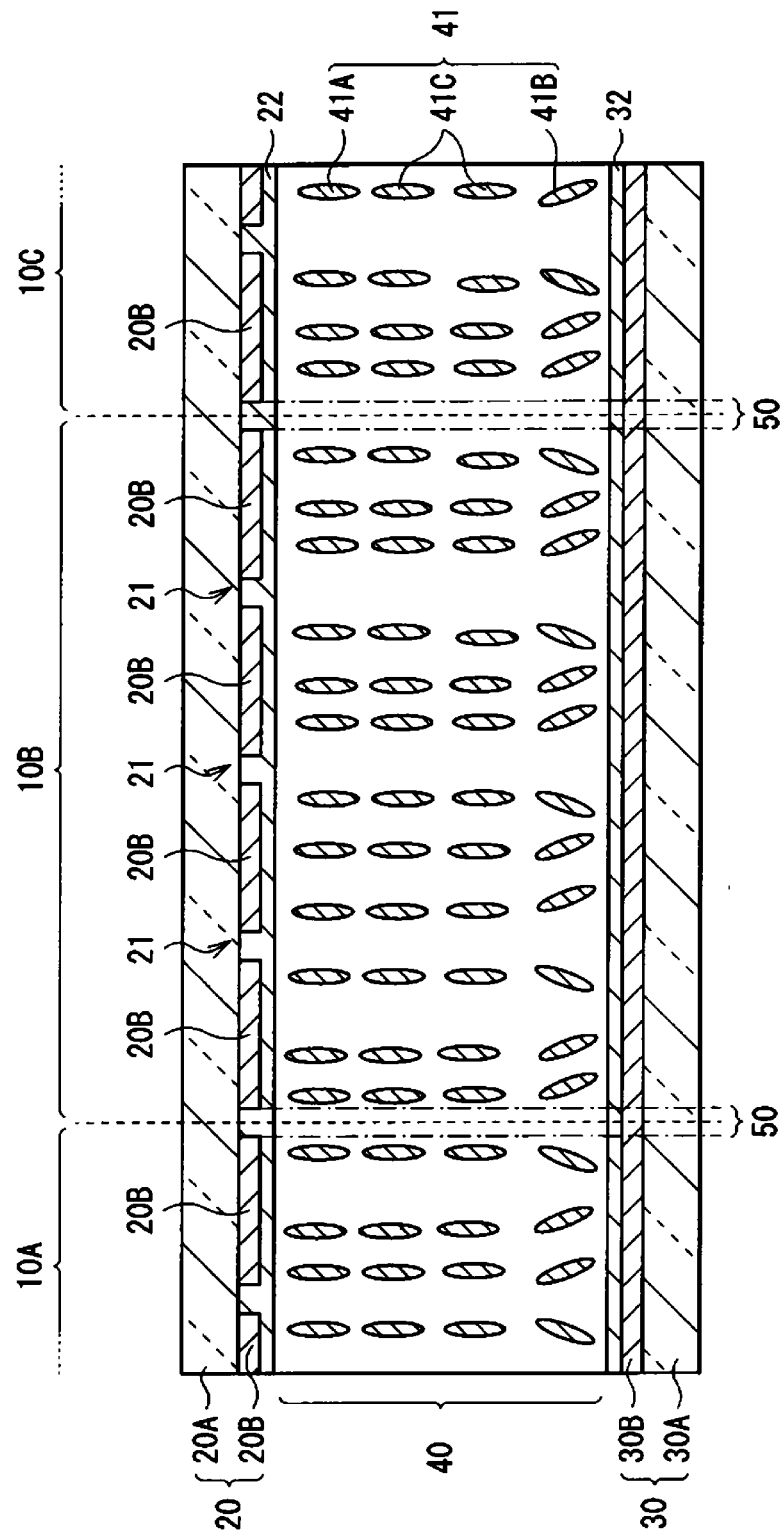
FIG. 10 is a schematic partial sectional view of a modification of the liquid crystal display in an embodiment of the present disclosure.

Mode 3 is a modification of Modes 1 and 2. A schematic partial sectional view of a liquid crystal display (liquid crystal display element) according to Mode 3 is shown in FIG. 10. In Mode 3, unlike in Mode 1, an alignment film 22 is configured not to contain a post-alignment compound. Specifically, in Mode 3, on the one hand, the pre-tilt θ2 of the liquid crystal molecules 41B etc. located in the vicinity of the alignment film 32 is set to be greater than 0°, and, on the other hand, the pre-tilt θ1 of the liquid crystal molecules 41A etc. located in the vicinity of the alignment film 22 is set to 0°.

Here, the alignment film 22 has, for example, the above-mentioned other vertical alignment agent.

Figure 3:
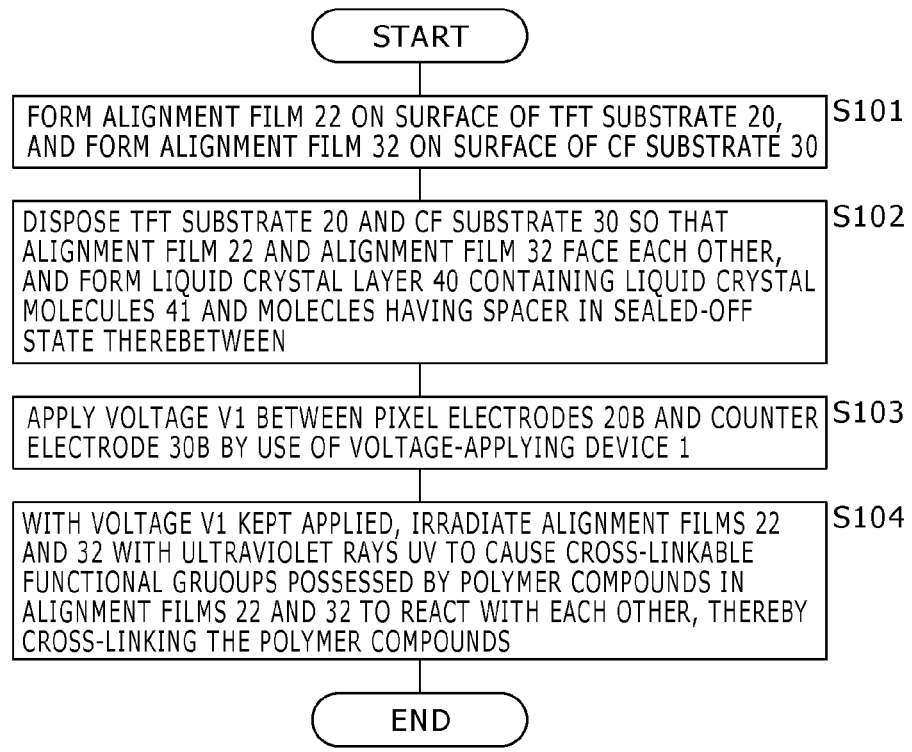
FIG. 3 is a flow chart for illustrating a method of manufacturing the liquid crystal display shown in FIG. 1.

The liquid crystal display (liquid crystal display element) in Mode 3 can be manufactured by using the above-mentioned other vertical alignment agent, in place of the pre-alignment compound or the precursor of the polymer compound as the pre-alignment compound, in forming the alignment film 22 on the TFT substrate 20 (Step S101 in FIG. 3).

In the liquid crystal display (liquid crystal display element) in Mode 3, in the liquid crystal layer 40, the pre-tilt θ1 of the liquid crystal molecules 41A etc. is 0°, and the pre-tilt θ2 of the liquid crystal molecules 41B etc. is greater than 0°. This makes it possible to largely enhance the speed of response to the driving voltage, as compared with a liquid crystal display element in which a pre-tilting treatment has not been conducted. Further, since the liquid crystal molecules 41A etc. are oriented (aligned) in a direction close to the normal direction relative to the glass substrates 20A and 30A, the amount of light transmitted in black display can be reduced, so that contrast can be enhanced as compared with the liquid crystal displays (liquid crystal display elements) in Modes 1 and 2. Thus, in this liquid crystal display (liquid crystal display element), it is possible, for example, to enhance the response speed by setting the pre-tilt $\theta 2$ of the liquid crystal molecules 41B etc. located on the CF substrate 30 side to be greater than 0°, while enhancing contrast by setting the pre-tilt $\theta 1$ of the liquid crystal molecules 41A etc. located on the TFT substrate 20 side. Accordingly, both the speed of response to the driving voltage and contrast can be enhanced in good balance.

In addition, according to the liquid crystal display (liquid crystal display element) and the method of manufacturing the same in Mode 3, the alignment film 22 not containing any pre-alignment compound is formed on the TFT substrate 20, and the alignment film 32 containing a pre-alignment compound is formed on the CF substrate 30. Next, the liquid crystal layer 40 is formed in a sealed-off state between the TFT substrate 20 and the CF substrate 30, and thereafter the pre-alignment compound in the alignment film 32 is put into reaction, to produce a post-alignment compound. Therefore, the alignment film 32 for giving a pre-tilt $\theta 2$ to the liquid crystal molecules 41B etc. can be formed, without using any large type light irradiation equipment; accordingly, response characteristic can be enhanced easily. Besides, higher reliability can be secured, as compared, for example, with the case where a photo-polymerizable monomer is polymerized after a liquid crystal layer is formed in a sealed-off state by use of a liquid crystal material containing the photo-polymerizable monomer.

The other effects obtained in Mode 3 are the same as in Mode 1.

Figure 11:
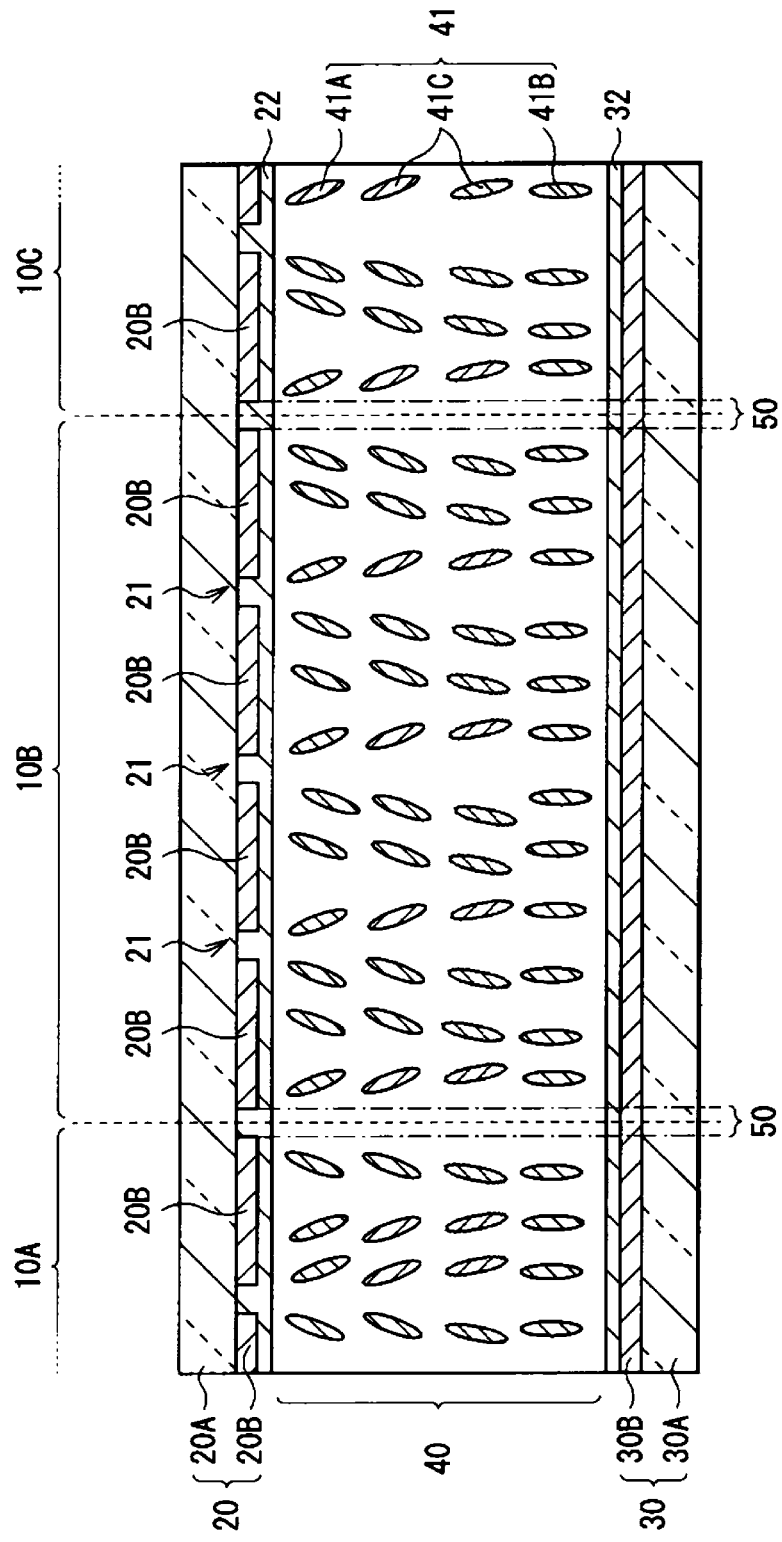
FIG. 11 is a schematic partial sectional view of the modification of the liquid crystal display shown in FIG. 10.

Incidentally, while the configuration wherein the alignment film 32 covering the CF substrate 30 contains the post-alignment compound and those liquid crystal molecules 41B etc. in the liquid crystal layer 40 which are located on the side of the CF substrate 30 are given the pre-tilt $\theta 2$, as shown in FIG. 10, has been adopted in Mode 3, this is not a restrictive configuration. Thus, a configuration may be adopted wherein, as shown in FIG. 11, the alignment film 32 does not contain any post-alignment compound, the alignment film 22 covering the TFT substrate 20 contains a post-alignment compound, and those liquid crystal molecules 41A etc. in the liquid crystal layer 40 which are located on the side of the TFT substrate 20 are given a pre-tilt $\theta 1$. In this case, also, an operation and effects equivalent to those in Mode 3 can be obtained. It is to be noted here, however, that since a variety of transverse electric fields are generated at the TFT substrate 20 at the time of driving, as above-mentioned, it is desirable to form the alignment film 22 on the side of the TFT substrate 20 so as to give a pre-tilt $\theta 1$ to the liquid crystal molecules 41A etc. located in the vicinity of the alignment film 22. By this it is possible to effectively reduce the disturbance in the orientation (alignment) of the liquid crystal molecules 41A etc. due to the transverse electric fields.

[Mode 4]

Figure 12:
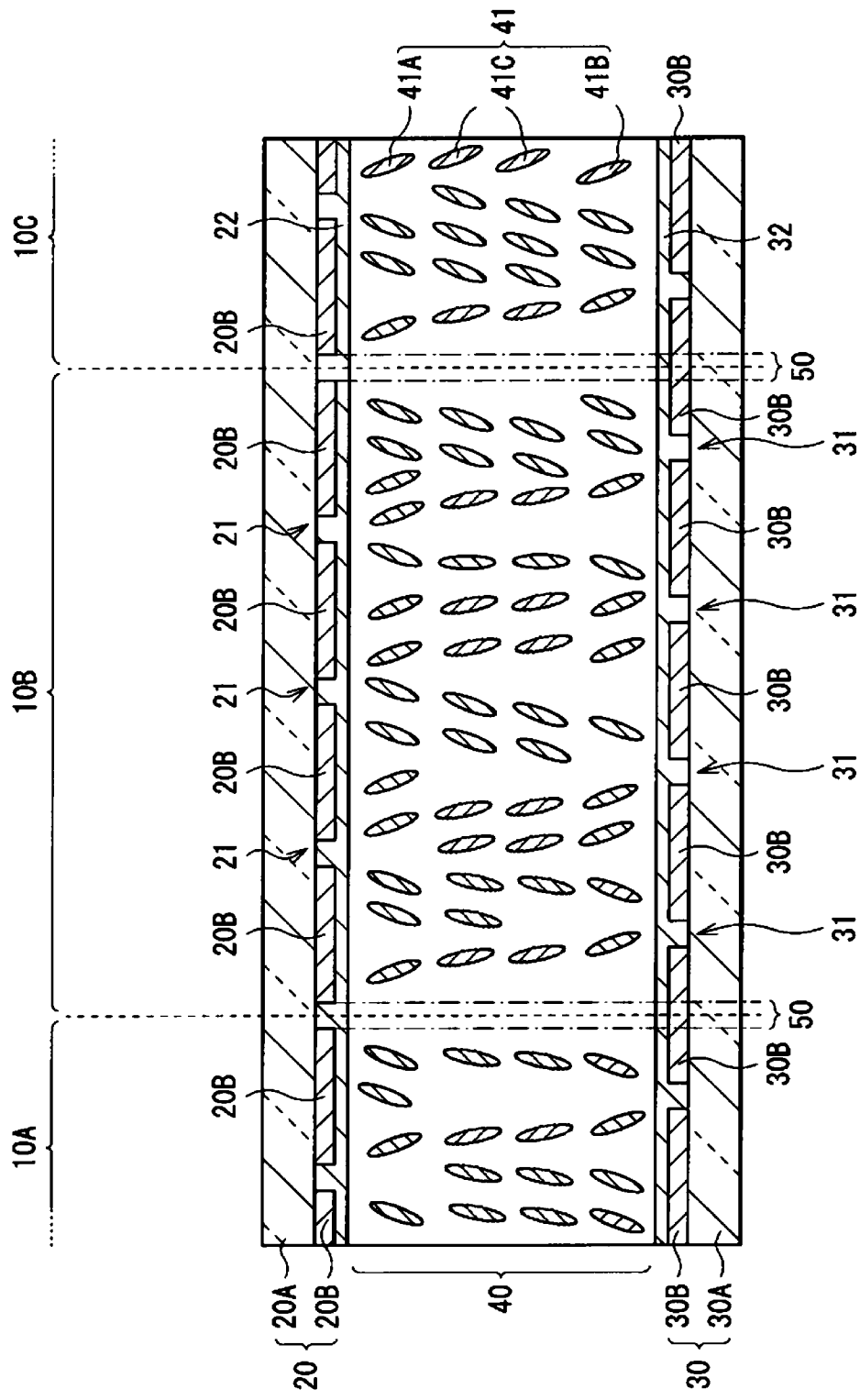
FIG. 12 is a schematic partial sectional view of another modification of the liquid crystal display in an embodiment of the present disclosure.

Mode 4 also is a modification of Modes 1 and 2. A schematic partial sectional view of a liquid crystal display (liquid crystal display element) according to Mode 4 is shown in FIG. 12. In Mode 4, the same configuration as that of the liquid crystal display (liquid crystal display element) in Modes 1 and 2 is adopted, except for a difference in the configuration of the counter electrode 30B possessed by the CF substrate 30.

Specifically, the counter electrode 30B is provided, in each of pixel regions, with slit portions 31 in the same pattern as in the pixel electrode 20B. The slit portions 31 in the counter electrode 30B are arranged so as not to face with the slit portions 21 in the pixel electrodes 20B. This ensures that when a driving voltage is impressed, oblique electric fields relative to the directors of the liquid crystal molecules 41 etc. are applied, whereby the speed of response to the driving voltage is enhanced. In addition, since regions differing in orientation (alignment) direction are formed in each pixel (division of orientation), viewing angle characteristic is enhanced.

The liquid crystal display (liquid crystal display element) in Mode 4 can be manufactured by a method wherein the substrate in which the counter electrode 30B having the predetermined slit portions 31 is provided on a color filter of a glass substrate 30A is used as the CF substrate 30 in Step S101 in FIG. 3.

According to the liquid crystal display (liquid crystal display element) and the method of manufacturing the same in Mode 4, alignment films 22 and 32 each containing an un-crosslinked polymer compound are formed and, thereafter, a liquid crystal layer 40 is formed in a sealed-off state between the alignment film 22 and the alignment film 32. Next, the un-crosslinked polymer compound in the alignment films 22 and 32 put into reaction, to form a cross-linked polymer compound. By this, predetermined pre-tilts $\theta 1$, $\theta 2$ are given to liquid crystal molecules 41A, 41B etc. Therefore, the speed of response to a driving voltage can be largely enhanced, as compared with a liquid crystal display element in which a pre-tilting treatment has not been conducted. As a result, the alignment films 22 and 32 for giving the pre-tilt $\theta$ to the liquid crystal molecules 41 etc. can be formed, without using any large type light irradiation equipment. Accordingly, response characteristic can be enhanced easily. Furthermore, higher reliability can be secured as compared, for example, with the case wherein a pre-tilting treatment is conducted by polymerizing a photo-polymerizable monomer after a liquid crystal layer is formed in a sealed-off state by use of a liquid crystal material containing the photo-polymerizable monomer.

Operations and effects of the liquid crystal display (liquid crystal display element) and the method of manufacturing the same according to Mode 4 are equivalent to those in Modes 1 and 2.

Incidentally, while the alignment films 22 and 32 have been so formed as to give the pre-tilts $\theta 1$, $\theta 2$ to the liquid crystal molecules 41A, 41B etc. located in the vicinities of the alignment films 22 and 32 in Mode 4, a pre-tilt $\theta$ may be given to the liquid crystal molecules 41 etc. located in the vicinity of one of the alignment films 22 and 32 by use of the same method as the manufacturing method described in Mode 3 above. In this case, also, operations and effects equivalent to those in Mode 3 can be obtained.

[Mode 5]

In Modes 1 to 4, after the liquid crystal layer 40 is provided, the pre-alignment compound in at least one of the alignment films 22 and 32 is put into reaction to produce the post-alignment compound, thereby giving the pre-tilt to the liquid crystal molecules 41 etc. located in the vicinity of the at least one alignment film. In Mode 5, on the other hand, after a liquid crystal layer 40 is provided, a structure of a polymer compound is decomposed in at least one of alignment films 22 and 32, thereby giving a pre-tilt to liquid crystal molecules 41 etc. located in the vicinity of the at least one alignment film.

In other words, the liquid crystal display (liquid crystal display element) in Mode 5 is configured in the same manner as in Modes 1 to 4 above, except for the difference in the method of forming the alignment films 22 and 32.

The liquid crystal display (liquid crystal display element) in Mode 5, in the case wherein the liquid crystal molecules 41A, 41B etc. have predetermined pre-tilts θ1, θ2, is manufactured, for example, in the following manner. First, alignment films 22 and 32 each containing a polymer compound such as the above-mentioned other vertical alignment agent, for example, are formed respectively on a TFT substrate 20 and a CF substrate 30. Next, the TFT substrate 20 and the CF substrate 30 are disposed so that the alignment film 22 and the alignment film 32 face each other, and the liquid crystal layer 40 is formed in a sealed-off state between the alignment films 22 and 32. Subsequently, a voltage is impressed between pixel electrodes 20B and a counter electrode 30B, and, while the voltage is kept impressed, the alignment films 22 and 32 are irradiated with ultraviolet rays UV containing a light component in a short wavelength region of around 250 nm in a larger proportion than that contained in the above-mentioned ultraviolet rays UV. In this case, by the ultraviolet rays UV in the short wavelength region, the polymer compound in each of the alignment films 22 and 32 is changed in structure through decomposition, for example. As a result, predetermined pre-tilt θ1 and θ2 can be given respectively to the liquid crystal molecules 41A etc. located in the vicinity of the alignment film 22 and to the liquid crystal molecules 41B etc. located in the vicinity of the alignment film 32.

Examples of the polymer compound contained in the alignment films 22 and 32 before forming the liquid crystal layer 40 in a sealed-off state include polymer compounds having a polyimide structure represented by the formula (10) below. The polyimide structure shown in the formula (10) undergoes, when irradiated with ultraviolet rays UV, cleavage of the cyclobutane structure in the formula (10), as represented by the following reaction formula (1), to be a structure represented by the following formula (11).

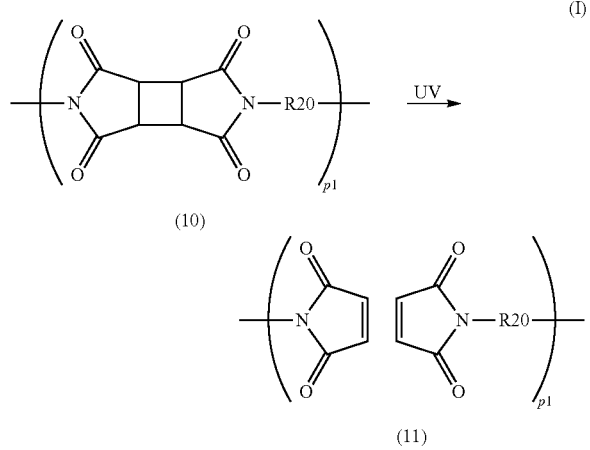

(I)

(10)

(11)

where R20 is a bivalent organic group, and p1 is an integer of not less than one.

In Mode 5, the liquid crystal molecules 41A etc. located in the vicinity of the alignment film 22 and the liquid crystal molecules 41B etc. located in the vicinity of the alignment film 32 are provided with the predetermined pre-tilts θ1 and θ2, respectively. This ensures that response speed is greatly enhanced, as compared with a liquid crystal display element in which a pre-tilting treatment has not been conducted. In addition, at least one of the alignment films 22 and 32 which is capable of giving the pre-tilt θ to the liquid crystal molecules 41 etc. can be formed, without using any large type equipment. Accordingly, response characteristic can be enhanced easily. It is to be noted here, however, that the ultraviolet rays with which the alignment films 22 and 32 are irradiated may bring about, for example, decomposition of the liquid crystal molecules 41 etc.; therefore, higher reliability is easily secured in Modes 1 to 4 than in Mode 5.

[Mode 6]

Mode 6 relates to the liquid crystal display according to the second embodiment of the present disclosure and the method of manufacturing a liquid crystal display according to the second and third embodiments of the present disclosure.

In Modes 1 to 4, the post-alignment compound is obtained by cross-linking the cross-linkable functional group in the pre-alignment compound having the cross-linkable functional group as a side chain. In Mode 6, on the other hand, a post-alignment compound is obtained based on a pre-alignment compound which has, as a side chain, a photo-sensitive functional group accompanied by deformation through irradiation with energy rays.

Figure 14:
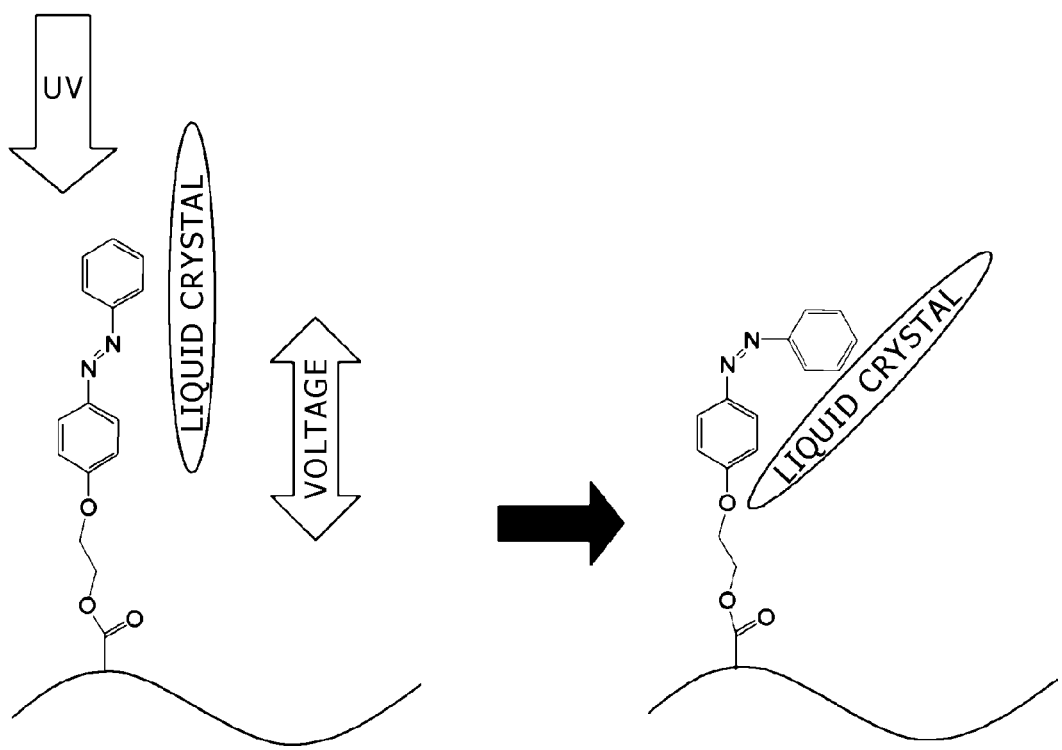
FIG. 14 is a conceptual illustration of the relationship between a deformed polymer compound and a liquid crystal molecule.

In Mode 6, also, alignment films 22 and 32 are configured to contain at least one polymer compound (post-alignment compound) having a photo-sensitive functional group in a side chain. Then, the liquid crystal molecules 41 etc. are given a pre-tilt by the deformed compound. Here, a post-alignment compound is produced by a method wherein the alignment films 22 and 32 are formed in the state of each containing at least one polymer compound (pre-alignment compound) having a main chain and the side chain, thereafter a liquid crystal layer 40 is provided, and the polymer compound is deformed or the polymer compound is irradiated with energy rays, more specifically, a photo-sensitive functional group contained in the side chain is deformed while applying an electric field or a magnetic field thereto. Incidentally, such a state is shown in a conceptual illustration in FIG. 14. Incidentally, in FIG. 14, the direction of arrow "UV" and the direction of "Voltage" do not indicate the direction of irradiation with the energy rays and the direction of the electric field applied. Besides, the post-alignment compound includes a structure by which the liquid crystal molecules 41 etc. are aligned in a predetermined direction (specifically, an oblique direction) relative to a pair of substrates (specifically, a TFT substrate 20 and a CF substrate 30). Thus, by deforming the polymer compound or by irradiating the polymer compound with the energy rays, the post-alignment compound is contained in the alignment films 22 and 32, whereby the pre-tilt can be given to the liquid crystal molecules 41 etc. located in the vicinities of the alignment films 22 and 32. As a result, response speed is enhanced, and display characteristics are enhanced.

Examples of the photo-sensitive functional group include azobenzene compounds having an azo group, compounds having an imine and an aldimine in a skeleton (referred to as "aldiminebenzene," for convenience of description), and compounds having a styrene skeleton (referred to as "stilbene," for convenience of description). These compounds each undergo deformation in response to the energy rays (e.g., ultraviolet rays), or undergo transition from a trans state to a cis state, thereby being able to give a pre-tilt to the liquid crystal molecules 41 etc.

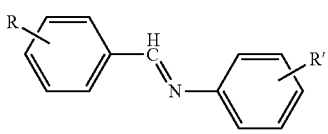

Aldiminebenzene

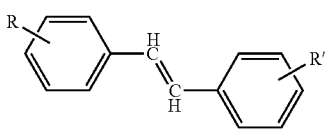

Stilbene

Specific examples of "X" in the azobenzene compounds represented by the formula (AZ-0) include the following formulas (AZ-1) to (AZ-9).

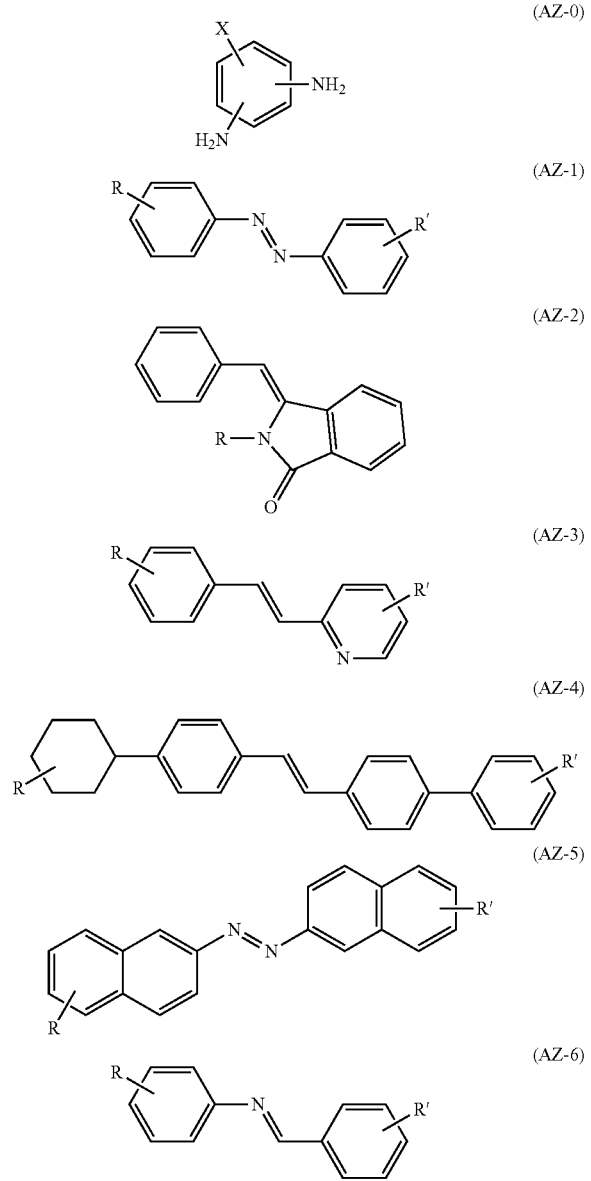

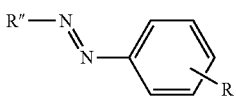

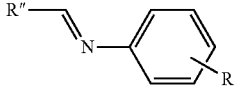

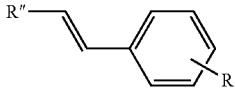

where either one of R and R" is linked to a benzene ring including a diamine, while the other constitutes a terminal group, each of R, R' and R" is a hydrogen atom, a halogen atom, an alkyl group, an alkoxy group, a univalent group having carbonate group, or a derivative thereof, and R" is linked directly to the benzene ring including a diamine.

The liquid crystal display and the method of manufacturing the same in Mode 6 may be basically and substantially the same as the liquid crystal display and the method of manufacturing the same as described in Modes 1 to 4, except that the pre-alignment compound having the photo-sensitive functional group accompanied by deformation through irradiation with energy rays (specifically, ultraviolet rays) is used. Therefore, detailed description of the liquid crystal display and the method of manufacturing the same in Mode 6 are omitted.

Example 1

Example 1A

Example 1 relates to the liquid crystal display (liquid crystal display element) and the method of manufacturing the same according to the first embodiment of the present disclosure and to the liquid crystal display (liquid crystal display element) and the method of manufacturing the same according to the third embodiment of the present disclosure. In Example 1A, the liquid crystal display (liquid crystal display element) shown in FIG. 11 was fabricated in the following procedure.

First, a TFT substrate 20 and a CF substrate 30 were prepared. As the TFT substrate 20, there was used a substrate formed, on one side of a 0.7 mm-thick glass substrate 20A, with pixel electrodes 20B formed of ITO and having a slit pattern (line width: 60 μm, line interval: 10 μm; slit portions 21). As the CF substrate 30, there was used a substrate formed, on a color filter of a 0.7 mm-thick glass substrate 30A formed with the color filter, with a counter electrode 30B formed of ITO and having a slit pattern (line width: 60 μm, line interval: 10 μm; slit portions 31). The slit patterns formed in the pixel electrodes 20B and the counter electrode 30B ensure that oblique electric fields are impressed between the TFT substrate 20 and the CF substrate 30. Subsequently, spacer projections of 3.5 μm in height were formed on the TFT substrate 20.

On the other hand, an alignment film material was prepared. In this case, first, 1 mol of a compound having a cross-linkable functional group shown in the formula (A-7) as a diamine compound, 1 mol of a compound having a vertical alignment inducing structure portion shown in the formula (B-6), and 2 mol of a tetracarboxylic acid dianhydride shown in the formula (E-2) were dissolved in N-methyl-2-pyrrolidone (NMP). Next, the resulting solution was put into reaction at 60° C. for six hours, and a large excess of pure water was poured to the solution after the reaction, to precipitate the reaction product. Subsequently, the precipitated solid matter was separated, was washed with pure water, and was dried at a reduced pressure at 40° C. for 15 hours, whereby a polyamic acid which is a precursor of a polymer compound as the post-alignment compound was synthesized. Finally, 3.0 g of the polyamic acid thus obtained was dissolved in NMP, to obtain a solution with a solid matter concentration of 3 wt %, which was filtered through a 0.2 μm filter.

Then, the TFT substrate 20 and the CF substrate 30 were each coated with the thus prepared alignment film material by use of a spin coater, and the coating films were dried by use of a hot plate at 80° C. for 80 seconds. Subsequently, the TFT substrate 20 and the CF substrate 30 were heated in a nitrogen gas atmosphere in an oven at 200° C. for one hour. In this manner, 90 nm-thick alignment films 22 and 32 were formed respectively on the pixel electrodes 20B and the counter electrode 30B.

Subsequently, along the peripheral border of the pixel region on the CF substrate 30, a seal portion was formed by applying an ultraviolet-curing resin containing silica particles with a particle diameter of 3.5 μm. Then, a liquid crystal material containing MLC-7026 (made by Merck Ltd.), which is a negative-type liquid crystal having a negative dielectric anisotropy, and molecules having ring structures and a spacer linking the ring structures (molecules having the spacer), or, in other words, molecules having a mesogenic skeleton and a spacer connecting the ring structures in the mesogenic skeleton, specifically, molecules having a spacer having a negative dielectric anisotropy represented by the structural formula below (negative-type liquid crystal molecules), was poured dropwise into the region surrounded by the seal portion. Incidentally, the molecules having the spacer were added in an amount of 30 wt %, based on the total amount of the MLC-7026 and the molecules having the spacer. Thereafter, the TFT substrate 20 and the CF substrate 30 were adhered to each other in such a manner that the centers of the line portions of the pixel electrodes 20B faced the slit portions 31 of the counter electrode 30B, and the seal portion was cured. Subsequently, heating was conducted in an oven at 120° C. for one hour, to completely cure the seal portion. As a result, the liquid crystal layer 40 was sealed off, and a liquid crystal cell could be completed.

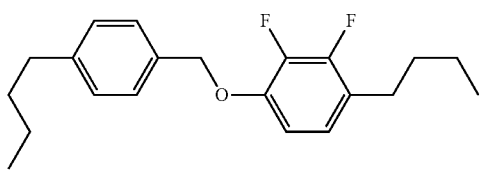 [SMILES: CCCCc1ccc(COc2ccc(CCCC)c(F)c2F)cc1]

Then, in the condition wherein a rectangular-wave AC field (60 Hz) having a predetermined effective voltage was impressed on the thus fabricated liquid crystal cell, the liquid crystal cell was irradiated with 500 mJ (measured at a wavelength of 365 nm) of uniform ultraviolet rays, to bring the pre-alignment compound in the alignment films 22 and 32 into reaction. As a result, the alignment films 22 and 32 containing the post-alignment compound were formed respectively on the TFT substrate 20 and the CF substrate 30. In this manner, a liquid crystal display (liquid crystal display element) shown in FIG. 12 wherein the liquid crystal molecules 41A, 41B and the molecules having the spacer on the sides of the TFT substrate 20 and the CF substrate 30 were given the pre-tilt could be completed. Finally, a pair of polarizing plates were adhered to the outside surfaces of the liquid crystal display in such a manner that the absorption axes of the polarizing plates were orthogonal to each other.

Example 1B

In Example 1B, the same procedure as in Example 1A was followed, except that an imidated polymer obtained by putting the polyamic acid to dehydration ring closure was used in place of the polyamic acid as the alignment film material. In this case, the polyamic acid synthesized in Example 1A was dissolved in N-methyl-2-pyrrolidone, then pyridine and acetic acid anhydride were added to the solution, and the mixed solution was brought into reaction at 110° C. for three hours, to effect dehydration ring closure. Subsequently, a large excess of pure water was poured into the mixed solution after the reaction, to precipitate the reaction product, then the precipitated solid matter was separated, and was washed with pure water. Thereafter, the washed solid matter was dried at a reduced pressure at 40° C. for 15 hours, to obtain an imidated polymer as the pre-alignment compound.

Example 1C

In Example 1C, the same procedure as in Example 1A was followed, except that a compound having a vertical alignment inducing structure portion represented by the following formula (B-37) was used in place of the compound having the vertical alignment inducing structure portion shown in the formula (B-6), in synthesizing a polyamic acid.

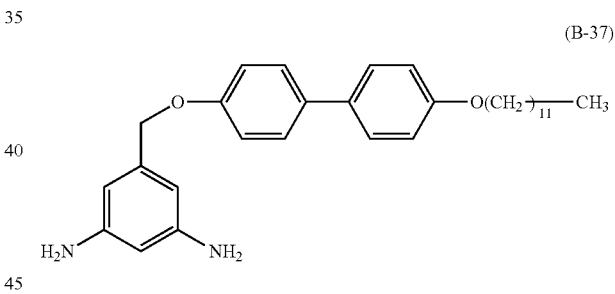

(B-37)

Example 1D

In Example 1D, the same procedure as in Example 1A was followed, except that a tetracarboxylic acid dianhydride shown in the formula (E-3) was used in place of the tetracarboxylic acid dianhydride shown in the formula (E-2), in synthesizing a polyamic acid.

Example 1E

In Example 1E, the same procedure as in Example 1A was followed, except that a tetracarboxylic acid dianhydride shown in the formula (E-1) was used in place of the tetracarboxylic acid dianhydride shown in the formula (E-2), in synthesizing a polyamic acid.

Example 1F

In Example 1F, the same procedure as in Example 1A was followed, except that the compound having the cross-linkable functional group shown in the formula (A-7) was not used as the diamine compound in synthesizing a polyamic acid and that the ultraviolet rays for irradiating the liquid crystal cell therewith were changed. Specifically, in synthesizing a polyamic acid, 2 mol of a compound having a vertical alignment inducing structure portion shown in the formula (B-6) was used as a diamine compound. In addition, in the condition wherein a rectangular wave AC field with a predetermined effective voltage was impressed on the liquid crystal cell, the liquid crystal cell was irradiated with 100 mJ (measured at a wavelength of 250 nm) of uniform ultraviolet rays.

Comparative Examples 1A to 1F

In Comparative Examples 1A to 1F, the same procedures as in Examples 1A to 1F were followed respectively, except that the addition of the molecules having the spacer was omitted.

For the liquid crystal displays (liquid crystal display elements) obtained in Examples 1A to 1F and Comparative Examples 1A to 1F, respective effective voltages for obtaining the same response time were determined. As a result, it was found that in Examples 1A to 1F, the same response time was obtainable at effective voltages corresponding to an average of 50% of the effective voltages required in Comparative Examples 1A to 1F. In other words, it was possible to achieve a further lowering in the voltage to be impressed at the time of giving the pre-tilt to the liquid crystal molecules, in manufacturing a liquid crystal display.

Example 2

Example 2A

Example 2 also relates to the liquid crystal display (liquid crystal display element) and the method of manufacturing the same according to the first embodiment of the present disclosure and to the method of manufacturing the liquid crystal display (liquid crystal display element) according to the third embodiment of the present disclosure. In Example 2A, unlike in Example 1A, a liquid crystal display (liquid crystal display element) shown in FIG. 1 was manufactured, and response characteristic thereof was examined.

Specifically, first, a TFT substrate 20 and a CF substrate 30 were prepared. As the TFT substrate 20, there was used a substrate formed, on one side of a 0.7 mm-thick glass substrate 20A, with pixel electrodes 20B formed of ITO and having a slit pattern (line width: 4 μm, line interval: 4 μm; slit portions 21). As the CF substrate 30, there was used a substrate formed, on the whole surface of a color filter of a 0.7 mm-thick glass substrate 30A formed with the color filter, with a counter electrode 30B formed of ITO. The slit pattern formed in the pixel electrodes 20B ensures that oblique electric fields are impressed between the TFT substrate 20 and the CF substrate 30. Subsequently, spacer projections of 3.5 μm in height were formed on the TFT substrate 20 by use of a photo-sensitive acrylic resin PC-335 (made by JSR Corporation).

On the other hand, an alignment film material was prepared. In this case, first, a compound having a cross-linkable functional group shown in the formula (A-8) as a diamine compound, a compound having a vertical alignment inducing structure portion shown in the formula (B-6), a compound shown in the formula (C-1), and a tetracarboxylic acid dianhydride shown in the formula (E-2) were dissolved in NMP in the proportions set forth in Table 1 below. Next, the resulting solution was put into reaction at 60° C. for four hours, and a large excess of methanol was poured to the solution after the reaction, to precipitate the reaction product. Subsequently, the precipitated solid matter was separated, was washed with methanol, and was dried at a reduced pressure at 40° C. for 15 hours, whereby a polyamic acid which is a precursor of a polymer compound as the post-alignment compound was synthesized. Finally, 3.0 g of the polyamic acid thus obtained was dissolved in NMP, to obtain a solution with a solid matter concentration of 3 wt %, which was filtered through a 0.2 μm filter.

Then, the TFT substrate 20 and the CF substrate 30 were each coated with the thus prepared alignment film material by use of a spin coater, and the coating films were dried by use of a hot plate at 80° C. for 80 seconds. Subsequently, the TFT substrate 20 and the CF substrate 30 were heated in a nitrogen gas atmosphere in an oven at 200° C. for one hour. In this manner, 90 nm-thick alignment films 22 and 32 were formed respectively on the pixel electrodes 20B and the counter electrode 30B.

Subsequently, like in Example 1A, along the peripheral border of the pixel region on the CF substrate 30, a seal portion was formed by applying an ultraviolet-curing resin, and the same liquid crystal material as in Example 1A was poured dropwise into the region surrounded by the seal portion. Thereafter, the TFT substrate 20 and the CF substrate 30 were adhered to each other, and the seal portion was cured. Subsequently, the assembly was heated in an oven at 120° C. for one hour, and the seal portion was completely cured. As a result, the liquid crystal layer 40 was sealed off, and a liquid crystal cell could be completed.

Then, in the condition wherein a rectangular-wave AC field (60 Hz) having a predetermined effective voltage was impressed on the thus fabricated liquid crystal cell, the liquid crystal cell was irradiated with 500 mJ (measured at a wavelength of 365 nm) of uniform ultraviolet rays, to bring the pre-alignment compound in the alignment films 22 and 32 into reaction. As a result, the alignment films 22 and 32 containing the post-alignment compound were formed respectively on the TFT substrate 20 and the CF substrate 30. In this manner, a liquid crystal display (liquid crystal display element) shown in FIG. 1 wherein the liquid crystal molecules 41A, 41B etc. on the sides of the TFT substrate 20 and the CF substrate 30 were given the pre-tilt could be completed. Finally, a pair of polarizing plates where adhered to the outside surfaces of the liquid crystal display in such a manner that the absorption axes of the polarizing plates were orthogonal to each other.

Example 2B

In Example 2B, the same procedure as in Example 2A was followed, except that the compound having the vertical alignment inducing structure portion shown in the formula (B-6) was not used in synthesizing a polyamic acid.

Example 2C

In Example 2C, the same procedure as in Example 2A was followed, except that a compound shown in the formula (C-2) was used in place of the compound shown in the formula (C-1) in synthesizing a polyamic acid.

Examples 2D and 2E

In Examples 2D and 2E, the same procedure as in Example 2A was followed, except that a compound having the group shown in the formula (D-7) and a compound represented by the formula (G-1) were used in the proportions set forth in Table 1 in place of the compound having the cross-linkable functional group shown in the formula (A-8), the compound having the vertical alignment inducing structure portion shown in the formula (B-6) and the compound shown in the formula (C-1), in synthesizing a polyamic acid.

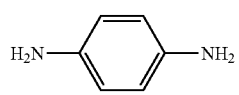

(G-1)

Comparative Examples 2A to 2E

In Comparative Examples 2A to 2E, the same procedures as in Examples 2A to 2E were followed, except that the addition of the molecules having the spacer was omitted.

For the liquid crystal displays (liquid crystal display elements) obtained in Examples 2A to 2E and Comparative Examples 2A to 2E, respective effective voltages for obtaining the same response time were determined. As a result, it was found that in Examples 2A to 2E, the same response time was obtainable at effective voltages corresponding to an average of 40% of the effective voltages required in Comparative Examples 2A to 2E. In other words, it was possible to achieve a further lowering in the voltage to be impressed at the time of giving the pre-tilt to the liquid crystal molecules, in manufacturing a liquid crystal display.

TABLE 1

| | Materials of alignment film (mol ratio:%) |
|---|---|
| Example 2A | Formula (A-8):Formula (B-6):Formula (C-1):Formula (E-2) 12.5:2.5:35:50 |
| Example 2B | Formula (A-8):Formula (C-1):Formula (E-2) 32.5:17.5:50 |
| Example 2C | Formula (A-8):Formula (B-6):Formula (C-2):Formula (E-2) 32.5:2.5:15:50 |
| Example 2D | Formula (D-7):Formula (F-1):Formula (E-2) 25:25:50 |
| Example 2E | Formula (D-7):Formula (F-1):Formula (E-2) 12.5:37.5:50 |

Example 3

Example 3 also relates to the liquid crystal display (liquid crystal display element) and the method of manufacturing the same according to the first embodiment of the present disclosure and to the method of manufacturing a liquid crystal display (liquid crystal display element) according to the third embodiment of the present disclosure.

In Example 3, specifically, a diamine compound and a tetracarboxylic acid dianhydride were reacted with each other, to obtain a polyamic acid. Next, the polyamic acid was put to an imidating reaction, followed by dehydration ring closure, and the resulting product was dissolved in NMP. In this manner, a polyimide shown in the formula (F-1) was obtained. Then, in Example 3, alignment films 22 and 32 were obtained in the same manner as in Example 2A, and, further, a liquid crystal cell was completed based on fundamentally the same method as described in Example 2A. It is to be noted here, however, that the height of the spacer projections was set to 3.5 μm, and silica particles with a particle diameter of 3.5 μm were used to form a seal portion. In addition, the thicknesses of the alignment films 22 and 32 on pixel electrodes 20B and a counter electrode 30B were set to 90 nm.

Then, in the condition wherein a rectangular-wave AC field (60 Hz) having an effective voltage of 20 V was impressed on the thus fabricated liquid crystal cell, the liquid crystal cell was irradiated with 500 mJ (measured at a wavelength of 365 nm) of uniform ultraviolet rays, to bring the pre-alignment compound in the alignment films 22 and 32 into reaction. As a result, the alignment films 22 and 32 containing the post-alignment compound were formed respectively on the TFT substrate 20 and the CF substrate 30. In this way, a liquid crystal display (liquid crystal display element) shown in FIG. 1 wherein the liquid crystal molecules 41A, 41B etc. on the sides of the TFT substrate 20 and the CF substrate 30 were given the pre-tilt could be completed. Finally, a pair of polarizing plates were adhered to the outside surfaces of the liquid crystal display in such a manner that the absorption axes of the polarizing plates were orthogonal to each other.

For the liquid crystal display (liquid crystal display element) thus fabricated, the pre-tilt of the liquid crystal molecules and the response speed were measured. The results are set forth in Table 2 below.

The pre-tilt θ of the liquid crystal molecules 41 etc. was measured by a crystal rotation method using He—Ne laser light according to a known method (the method described in T. J. Scheffer et al., J. Appl. Phys., vol. 19, p. 2013 (1980)). Incidentally, as above-described and shown in FIG. 2, the pre-tilt θ is the inclination angle of the director D of the liquid crystal molecules 41 (41A, 41B) relative to the Z-direction, which is the direction (normal direction) perpendicular to the surfaces of the glass substrates 20A and 30A, in the state where the driving voltage is OFF.

The response time was measured as follows. Using LCD5200 (made by Otsuka Electronics Co., Ltd.) as a measuring apparatus, a driving voltage (7.5 V) is impressed between the pixel electrode 20B and the counter electrode 30B, and the time from the moment when the luminance is 10% to the moment when a luminance of 90% of the gradation according to the driving voltage is reached is measured.

TABLE 2

| | |
|---|---|
| Effective voltage | 20 V |
| Pre-tilt angle | 1.5 degrees |
| Response time | 9.7 msec |

Example 4

Example 4 relates to the liquid crystal display (liquid crystal display element) and the method of manufacturing the same according to the second embodiment of the present disclosure, and to the method of manufacturing a liquid crystal display (liquid crystal display element) according to the third embodiment of the present disclosure. In Example 4, pre-alignment compounds/post-alignment compounds having a photo-sensitive functional group were used. Specifically, liquid crystal displays fundamentally the same in configuration and structure as those shown in FIG. 12 and described in Example 1A were fabricated while using azobenzene compounds shown in the following formulas (AZ-11) to (AZ-17) as the pre-alignment compound having a photo-sensitive functional group and the response characteristic thereof was examined.

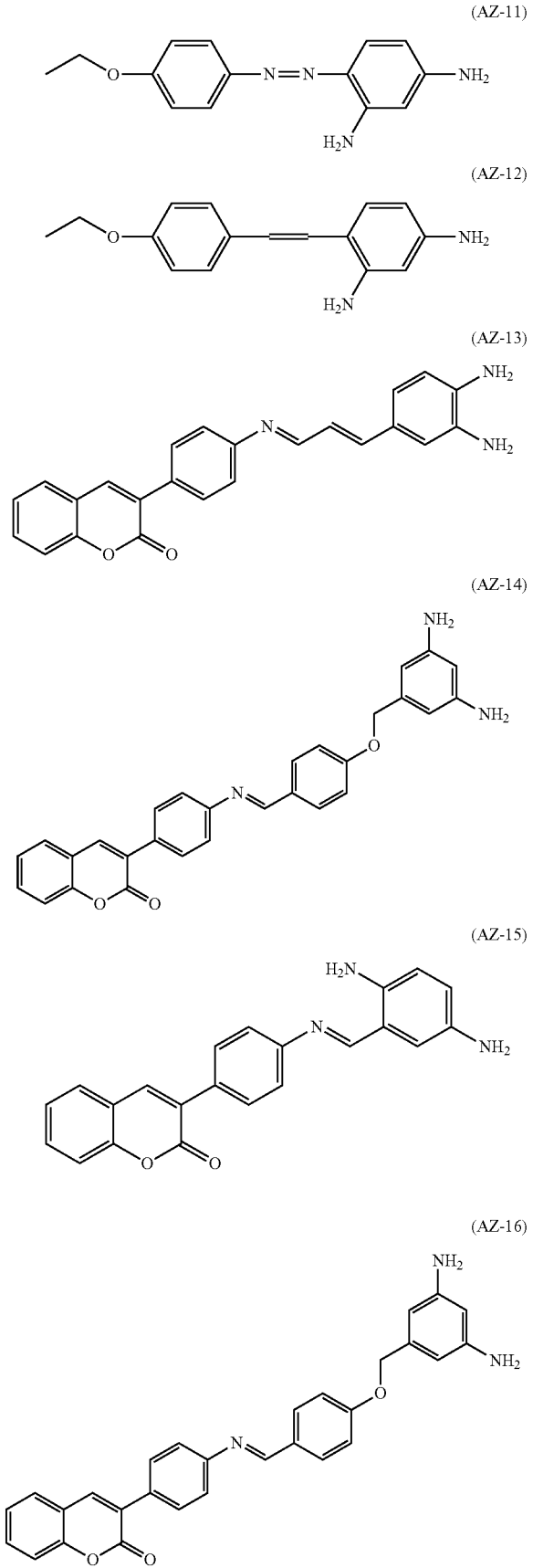

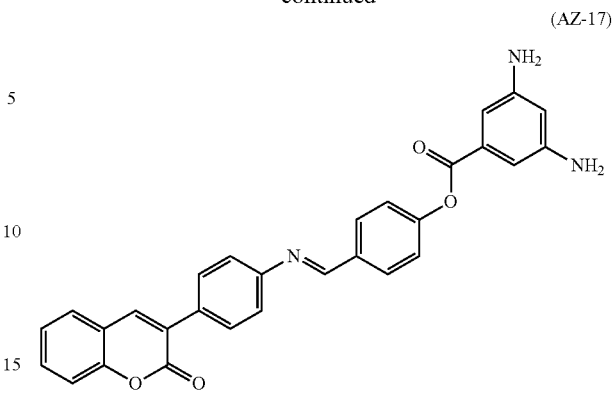

In Example 4, each of a TFT substrate 20 and a CF substrate 30 was coated with a polyimide material wherein a 9:1 (weight ratio) mixture of a compound shown in the formula (AZ-11) and a compound of the formula (C-1) was used as a diamine material and a tetracarboxylic acid dianhydride shown in the formula (E-2) was used as an acid dianhydride, by use of a spin coater, and the coating films were dried by use of a hot plate at 80° C. for 80 seconds. Subsequently, the TFT substrate 20 and the CF substrate 30 were heated in a nitrogen gas atmosphere in an oven at 200° C. for one hour. As a result, 90 nm-thick alignment films 22 and 32 were formed respectively on pixel electrode 20B and a counter electrode 30B.

Then, like in Example 1A, along the peripheral border of the pixel region on the CF substrate 30, a seal portion was formed by applying an ultraviolet-curing resin containing silica particles having a particle diameter of 3.5 μm, and the same liquid crystal material as in Example 1A was poured dropwise into the region surrounded by the seal portion. Thereafter, the TFT substrate 20 and the CF substrate 30 were adhered to each other in such a manner that centers of the line portions of the pixel electrodes 20B faced the slit portions 31 of the counter electrode 30B, and the seal portion was cured. Subsequently, the assembly was heated in an oven at 120° C. for one hour, to completely cure the seal portion. In this manner, the liquid crystal layer 40 was sealed off, and a liquid crystal cell (Example 4A) could be completed.

Subsequently, in the condition wherein a rectangular-wave AC field (60 Hz) having a predetermined effective voltage was impressed on the thus fabricated liquid crystal cell, the liquid crystal cell was irradiated with 500 mJ (measured at a wavelength of 365 nm) of uniform ultraviolet rays, to deform the pre-alignment compound in the alignment films 22 and 32. By this, the alignment films 22 and 32 containing the post-alignment compound (the deformed polymer compound) were formed respectively on the TFT substrate 20 and the CF substrate 30. In this manner, a liquid crystal display (liquid crystal display element) wherein liquid crystal molecules 41A, 41B on the sides of the TFT substrate 20 and the CF substrate 30 were given the pre-tilt could be completed. Finally, a pair of polarizing plates were adhered to the outside surfaces of the liquid crystal display in such a manner that the absorption axes of the polarizing plates were orthogonal to each other.

Liquid crystal displays (liquid crystal display elements) of Examples 4B to 4G were completed in the same manner as above-described, except that compounds shown in the formulas (AZ-12) to (AZ-17) were respectively used in place of the compound shown in the formula (AZ-11).

Comparative Examples 4A to 4G

In Comparative Examples 4A to 4G, the same procedures as in Examples 4A to 4G were respectively followed, except that the addition of the molecules having the spacer was omitted.

For the liquid crystal displays (liquid crystal display elements) obtained in Examples 4A to 4G and Comparative Examples 4A to 4G, respective effective voltages for obtaining the same response time were determined. As a result, it was found that in Examples 4A to 4G, the same response time was obtainable at effective voltages corresponding to an average of 40% of the effective voltages required in Comparative Examples 4A to 4G. In other words, it was possible to achieve a further lowering in the voltage to be impressed at the time of giving the pre-tilt to the liquid crystal molecules, in manufacturing a liquid crystal display.

While the present disclosure has been described above by showing preferable Modes and Examples, the present disclosure is not limited to these Modes and Examples, and various modifications are possible. For instance, while the liquid crystal displays (liquid crystal display elements) in the VA mode have been described in the Modes and Examples, the present disclosure is not restricted to the VA mode but is applicable also to other modes such as the TN mode, IPS mode, FFS mode and OCB (Optically Compensated Bend) mode. In these cases, also, effects equivalent to the above-mentioned can be obtained. It should be noted here, however, that a particularly higher improving effect on response characteristic can be exhibited in the VA mode than in the IPS mode and FFS mode, as compared with the liquid crystal displays (liquid crystal display elements) in which the pre-tilting treatment has not been conducted.

In addition, while the liquid crystal displays (liquid crystal display elements) of the transmission type were described in the above Modes and Examples, the present disclosure is not necessarily restricted to the transmission type but may be applied, for example, to the reflection type. In the case of the reflection type, pixel electrodes are formed by use of a light-reflective electrode material such as aluminum.

Incidentally, the present disclosure may assume the following configurations.

[1]
<The Liquid Crystal Display According to the First Embodiment of the Present Disclosure>

A liquid crystal display having a liquid crystal display element, the liquid crystal display element including:

a pair of alignment films provided on mutually facing sides of a pair of substrates; and a liquid crystal layer which is provided between the pair of alignment films and contains a liquid crystal molecule having a negative dielectric anisotropy, wherein at least one of the pair of alignment films contains a cross-linked compound obtained by cross-linking a polymer compound having a cross-linkable functional group as a side chain, the liquid crystal layer further contains a molecule which has a ring structure and a spacer linking the ring structure, and the liquid crystal molecule is given a pre-tilt by the cross-linked compound.

[2]
<The Liquid Crystal Display According to the Second Embodiment of the Present Disclosure>

A liquid crystal display having a liquid crystal display element, the liquid crystal display element including:

a pair of alignment films provided on mutually facing sides of a pair of substrates; and a liquid crystal layer which is provided between the pair of alignment films and contains a liquid crystal molecule having a negative dielectric anisotropy, wherein at least one of the pair of alignment films contains a deformed compound obtained by deforming a polymer compound having a photo-sensitive functional group as a side chain, the liquid crystal layer further contains a molecule which has a ring structure and a spacer linking the ring structure, and the liquid crystal molecule is given a pre-tilt by the deformed compound.

[3]
The liquid crystal display according to the above paragraph [1] or [2], wherein the molecule which has the ring structure and the spacer linking the ring structure includes a nematic liquid-crystalline material or low-molecular material which has a negative or neutral dielectric anisotropy and contains at least one compound represented by the following formula:

R1-A1-X1-A2-R2 where

R1 and R2 are each an alkyl group of 1 to 10 carbon atoms or an alkenyl group of 2 to 10 carbon atoms, wherein one $CH_2$ group or non-adjacent two or more $CH_2$ groups in the alkyl or alkenyl group may be replaced by an oxygen atom and/or a sulfur atom, and at least one hydrogen atom in the alkyl or alkenyl group may be replaced by a fluorine atom or a chlorine atom;

A1 and A2 are each independently trans-1,4-cyclohexylene group (wherein one $CH_2$ group or non-adjacent two $CH_2$ groups may be replaced by an oxygen atom or a sulfur atom), or 1,4-phenylene group (wherein one or more CH groups may be replaced by a nitrogen atom), or a group selected from the group including 1,4-cyclohexenylene group, 1,4-bicyclo[2,2,2]octylene group, pyperidin-1,4-diyl group, naphthalen-2,6-diyl group, decahydronaphthalen-2,6-diyl group, and 1,2,3,4-tetrahydronaphthalen-2,6-diyl group, provided that hydrogen atoms in A1 and A2 may be replaced by CN or halogen; and X1 is —$CH_2CH_2$—, —CH=CH—, —$CH(CH_3)CH_2$—, —$CH_2CH(CH_3)$—, —$CH(CH_3)CH(CH_3)$—, —$CF_2CF_2$—, —CF=CF—, —$CH_2O$—, —$OCH_2$—, —$OCH(CH_3)$—, —$CH(CH_3)$—O—, —$(CH_2)_4$—, —$(CH_2)_3O$—, —$O(CH_2)_3$—, —C≡C—, —$CF_2O$—, —$OCF_2$—, —COO—, —COO—, —COS—, —SCO—, —O—, or —C—.

[4]
The liquid crystal display according to any of the above paragraphs [1] to [3], wherein the mass ratio of the molecule which has the ring structure and the spacer linking the ring structure to the total mass of the liquid crystal molecule and the molecule which has the ring structure and the spacer linking the ring structure is in the range of 1 to 50% by mass.

[5]
The liquid crystal display according to any of the above paragraphs [1] to [4], wherein the compound constituting at least one of the pair of alignment films includes a compound which further has, as a side chain, a group represented by the following formula (1):

$$-R1-R2-R3 \quad (1)$$

where R1 is a straight chain or branched bivalent organic group of at least 3 carbon atoms and is linked to a main chain of the polymer compound, R2 is a bivalent organic group including a plurality of ring structures, wherein one of the atoms constituting the ring structures is linked to R1, and R3 is a hydrogen atom, a halogen atom, an alkyl group, an alkoxy group, a univalent group having a carbonate group, or a derivative thereof.

[6]

The liquid crystal display according to any of the above paragraphs [1] to [4], wherein the compound constituting at least one of the pair of alignment films includes a compound which has, as a side chain, a group represented by the following formula (2):

—R11-R12-R13-R14    (2)

where R11 is a straight chain or branched bivalent organic group of 1 to 20 carbon atoms, preferably 3 to 12 carbon atoms, which may include an ether group or an ester group and which is linked to a main chain of the polymer compound, or R11 is an ether group or an ester group and is linked to the main chain of the polymer compound, R12 is an ethynylene group or a bivalent group including one type of structure selected from among chalcone, cyannamate, cyannamoyl, coumarin, maleimide, benzophenone, norbornene, oryzanol, and chitosan structures, R13 is a bivalent organic group including a plurality of ring structures, and R14 is a hydrogen atom, a halogen atom, an alkyl group, an alkoxy group, a univalent group having a carbonate group, or a derivative thereof.

[7]

The liquid crystal display according to the above paragraph [1], wherein the cross-linked compound obtained by cross-linking the polymer compound includes a side chain, and a main chain supporting the side chain on the substrate;

the side chain includes a cross-linked portion which is linked to the main chain and in which the side chain is partly cross-linked, and a terminal structure portion linked to the cross-linked portion; and the liquid crystal molecule is given the pre-tilt by being set along the terminal structure portion or being clamped by the terminal structure portion.

[8]

The liquid crystal display according to the above paragraph [2], wherein the deformed compound obtained by deforming the polymer compound includes a side chain, and a main chain supporting the side chain on the substrate;

the side chain includes a deformed portion which is linked to the main chain and in which the side chain is partly deformed, and a terminal structure portion linked to the deformed portion; and the liquid crystal molecule is given the pre-tilt by being set along the terminal structure portion or being clamped by the terminal structure portion.

[9]

The liquid crystal display according to the above paragraph [1], wherein the cross-linked compound obtained by cross-linking the polymer compound includes a side chain, and a main chain supporting the side chain on the substrate; and the side chain includes a cross-linked portion which is linked to the main chain and in which the side chain is partly cross-linked, and a terminal structure portion which is linked to the cross-linked portion and has a mesogenic group.

[10]

The liquid crystal display according to the above paragraph [2], wherein the deformed compound obtained by deforming the polymer compound includes a side chain, and a main chain supporting the side chain on the substrate; and the side chain includes a deformed portion which is linked to the main chain and in which the side chain is partly deformed, and a terminal structure portion which is linked to the deformed portion and has a mesogenic group.

[11]

The liquid crystal display according to any of the above paragraphs [1] to [10], wherein at least one of the pair of alignment films has a surface roughness Ra of not more than 1 nm.

[12]

The liquid crystal display according to any of the above paragraphs [1] to [11], wherein the pair of alignment films have a same composition.

[13]

The liquid crystal display according to any of the above paragraphs [1] to [12], further including an orientation-regulating portion which includes a slit formed in an electrode or a projection provided on the substrate.

[14]

<The Method of Manufacturing a Liquid Crystal Display According to the First Embodiment of the Present Disclosure>

A method of manufacturing a liquid crystal display, including:

forming on one of a pair of substrates a first alignment film which includes a polymer compound having a cross-linkable functional group as a side chain;

forming a second alignment film on the other of the pair of substrates;

disposing the pair of substrates so that the first alignment film and the second alignment film face each other, and forming, in a sealed-off state between the first alignment film and the second alignment film, a liquid crystal layer which contains a liquid crystal molecule having a negative dielectric anisotropy and a molecule having a ring structure and a spacer linking the ring structure; and after the formation of the liquid crystal layer in the sealed-off state, cross-linking the polymer compound so as to give a pre-tilt to the liquid crystal molecule.

[15]

<The Method of Manufacturing a Liquid Crystal Display According to the Second Embodiment of the Present Disclosure>

A method of manufacturing a liquid crystal display, including:

forming on one of a pair of substrates a first alignment film which includes a polymer compound having a photo-sensitive functional group as a side chain;

forming a second alignment film on the other of the pair of substrates;

disposing the pair of substrates so that the first alignment film and the second alignment film face each other, and forming, in a sealed-off state between the first alignment film and the second alignment film, a liquid crystal layer which contains a liquid crystal molecule having a negative dielectric anisotropy and a molecule having a ring structure and a spacer linking the ring structure; and after the formation of the liquid crystal layer in the sealed-off state, deforming the polymer compound so as to give a pre-tilt to the liquid crystal molecule.

[16]
<The Method of Manufacturing a Liquid Crystal Display According to the Third Embodiment of the Present Disclosure>

A method of manufacturing a liquid crystal display, including:

forming on one of a pair of substrates a first alignment film which includes a polymer compound having a cross-linkable functional group or a photo-sensitive functional group as a side chain;

forming a second alignment film on the other of the pair of substrates;

disposing the pair of substrates so that the first alignment film and the second alignment film face each other, and forming, in a sealed-off state between the first alignment film and the second alignment film, a liquid crystal layer which contains a liquid crystal molecule having a negative dielectric anisotropy and a molecule having a ring structure and a spacer linking the ring structure; and after the formation of the liquid crystal layer in the sealed-off state, irradiating the polymer compound with energy rays so as to give a pre-tilt to the liquid crystal molecule.

The present disclosure contains subject matter related to that disclosed in Japanese Priority Patent Application JP 2011-144650 filed in the Japan Patent Office on Jun. 29, 2011, the entire content of which is hereby incorporated by reference.

What is claimed is:

1. A liquid crystal display having a liquid crystal display element, the liquid crystal display element comprising:
   a pair of alignment films provided on mutually facing sides of a pair of substrates; and
   a liquid crystal layer which is provided between the pair of alignment films and contains a liquid crystal molecule having a negative dielectric anisotropy mixed with a molecule which has a ring structure and a spacer linking the ring structure,
   wherein at least one of the pair of alignment films contains a cross-linked compound obtained by cross-linking a polymer compound having a cross-linkable functional group as a side chain,
   wherein the mixture of the liquid crystal molecule and the molecule which has the ring structure and the spacer linking the ring structure is given a pre-tilt by the cross-linked compound,
   wherein the pre-tilt of the liquid crystal molecule and the molecule which has the ring structure and the spacer linking the ring structure increases a response speed to a driving voltage, and
   wherein the liquid crystal molecule and the molecule which has the ring structure and the spacer linking the ring structure is

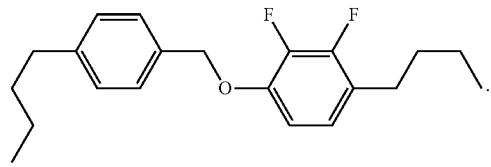 [SMILES: CCCCc1ccc(COc2ccc(CCCC)c(F)c2F)cc1]

2. The liquid crystal display according to claim 1, wherein the mass ratio of the molecule which has the ring structure and the spacer linking the ring structure to the total mass of the liquid crystal molecule and the molecule which has the ring structure and the spacer linking the ring structure is in the range of 1 to 50% by mass.

* * * * *